United States Patent
Matsushita et al.

(10) Patent No.: US 8,427,957 B2
(45) Date of Patent: Apr. 23, 2013

(54) COMMUNICATION TERMINAL AND COMMUNICATION METHOD

(75) Inventors: Yosuke Matsushita, Osaka (JP); Yuki Fujiwara, Osaka (JP); Hideki Homma, Tokyo (JP); Naoki Morita, Fukuoka (JP)

(73) Assignee: Panasonic Corporation, Osaka (JP)

( * ) Notice: Subject to any disclaimer, the term of this patent is extended or adjusted under 35 U.S.C. 154(b) by 286 days.

(21) Appl. No.: 12/747,689

(22) PCT Filed: Sep. 14, 2009

(86) PCT No.: PCT/JP2009/004552
§ 371 (c)(1),
(2), (4) Date: Jun. 11, 2010

(87) PCT Pub. No.: WO2010/044187
PCT Pub. Date: Apr. 22, 2010

(65) Prior Publication Data
US 2010/0290393 A1 Nov. 18, 2010

(30) Foreign Application Priority Data
Oct. 15, 2008 (JP) ................................. 2008-266815

(51) Int. Cl.
*H04L 12/28* (2006.01)
(52) U.S. Cl.
USPC ........................................................ 370/237
(58) Field of Classification Search ..... 370/351–395.41, 370/229–240
See application file for complete search history.

(56) References Cited

U.S. PATENT DOCUMENTS

| | | | | |
|---|---|---|---|---|
| 6,957,265 | B2 * | 10/2005 | Porotsky | 709/231 |
| 2004/0029602 | A1 | 2/2004 | Kunihiro | |
| 2005/0053007 | A1 | 3/2005 | Bernhardt et al. | |
| 2006/0098608 | A1 | 5/2006 | Joshi | |
| 2007/0195715 | A1 * | 8/2007 | Yamano et al. | 370/254 |
| 2008/0153443 | A1 * | 6/2008 | Takusagawa et al. | 455/187.1 |
| 2008/0170550 | A1 * | 7/2008 | Liu et al. | 370/338 |

FOREIGN PATENT DOCUMENTS

| | | |
|---|---|---|
| CN | 101175022 A | 5/2008 |
| JP | 2004-7457 | 1/2004 |
| JP | 2007-221564 | 8/2007 |
| JP | 2007-221568 | 8/2007 |
| WO | 2006/098723 | 9/2006 |

OTHER PUBLICATIONS

International Search Report issued Dec. 15, 2009 in corresponding International Application No. PCT/JP2009/004552.

(Continued)

*Primary Examiner* — Mark Rinehart
*Assistant Examiner* — Mang Yeung
(74) *Attorney, Agent, or Firm* — Wenderoth, Lind & Ponack, L.L.P.

(57) ABSTRACT

Provided is a communication terminal that is capable of securing a route having the finest state while suppressing a bandwidth that is consume by a transmission of a control packet at a low level, when applied in an ad-hoc network which uses an electrical power line. The communication terminal included in the ad-hoc network acquires a plurality of route candidates at the beginning of a data transmission by conducting a broadcast transmission of a route creation packet, and acquires a route having the finest state by conducting an unicast transmission of a route estimation packet to each of the route candidates in each predetermined period.

19 Claims, 45 Drawing Sheets

OTHER PUBLICATIONS

T. Clausen et al., "Optimized Link State Routing Protocol (OLSR)", Request for Comments: 3626, p. 1, Oct. 2003 (English abstract).

R. Ogier et al., "Topology Dissemination Based on Reverse-Path Forwarding (TBRPF)", Request for Comments: 3684, p. 1, Feb. 2004 (English abstract).

C. Perkins et al., "Ad hoc On-Demand Distance Vector (AODV) Routing", Request for Comments: 3561, p. 1, Jul. 2003 (English abstract).

D. Johnson et al., "The Dynamic Source Routing Protocol (DSR) for Mobile Ad Hoc Networks for IPv4", Request for Comments: 4728, p. 1, Feb. 2007 (English abstract).

Extended European Search Report issued Jan. 27, 2012 in corresponding European Application No. 09 82 0366.4.

Office Action issued Jan. 21, 2013 in corresponding Chinese Application No. 200980101366.5 (with English translation).

* cited by examiner

F I G. 4B

404

| FINAL DESTINATION | NEXT DESTINATION | BANDWIDTH INFORMATION | DELAY INFORMATION | PRIORITY (BANDWIDTH) | PRIORITY (DELAY) | OPTION |
|---|---|---|---|---|---|---|
| D | B | 100 | 2 | 1 | 2 | VALID |
| D | E | 50 | 1 | 2 | 1 | |
| J | K | 60 | 3 | 1 | 1 | INVALID |
| J | L | 40 | 5 | 2 | 2 | |

ROUTE REQUEST

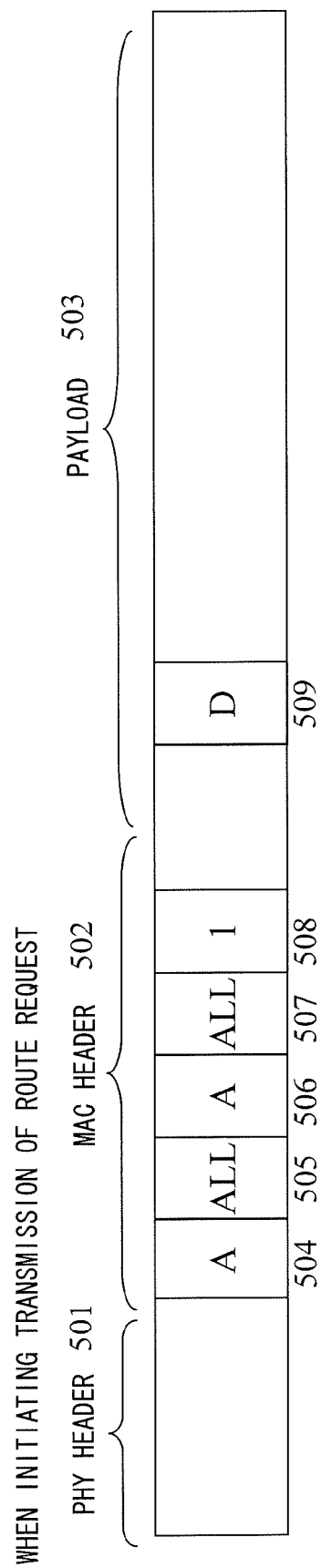

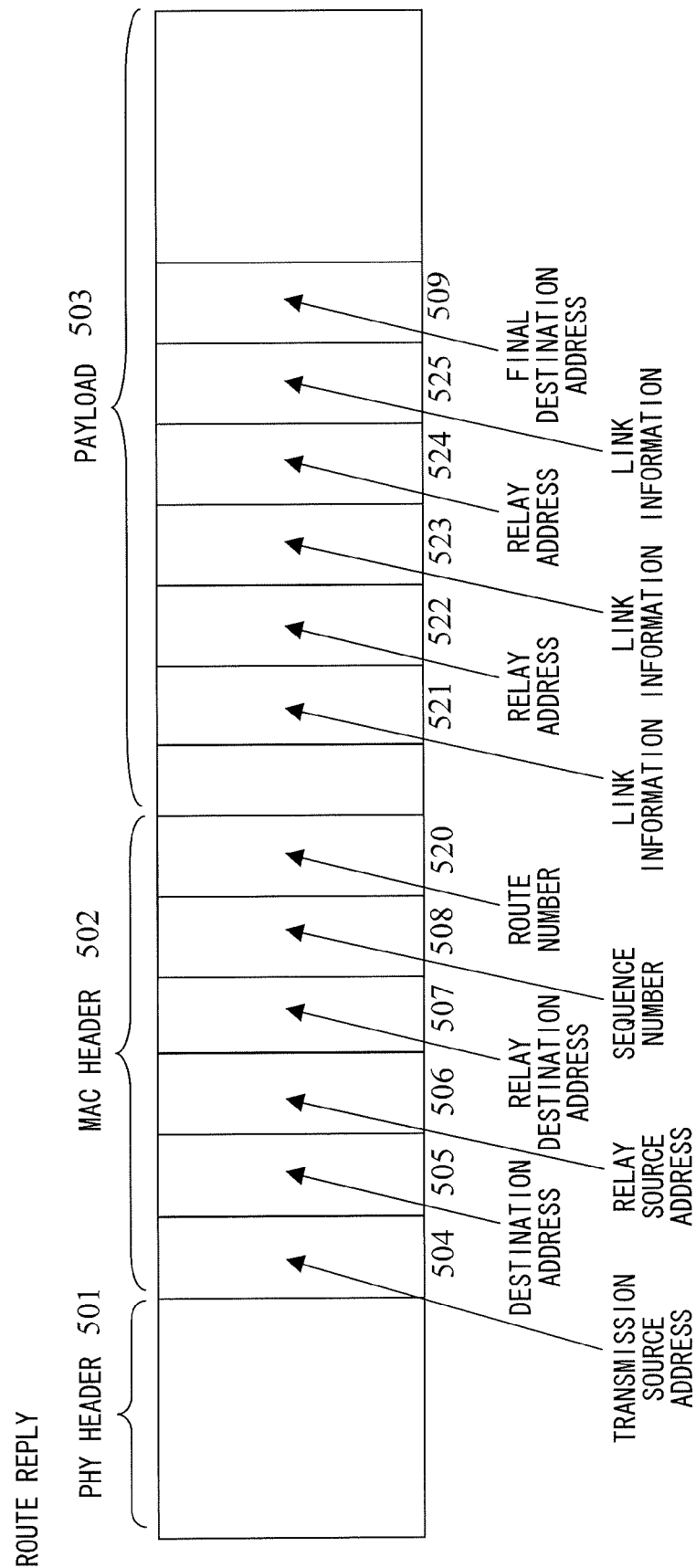

WHEN INITIATING TRANSMISSION OF ROUTE REPLY

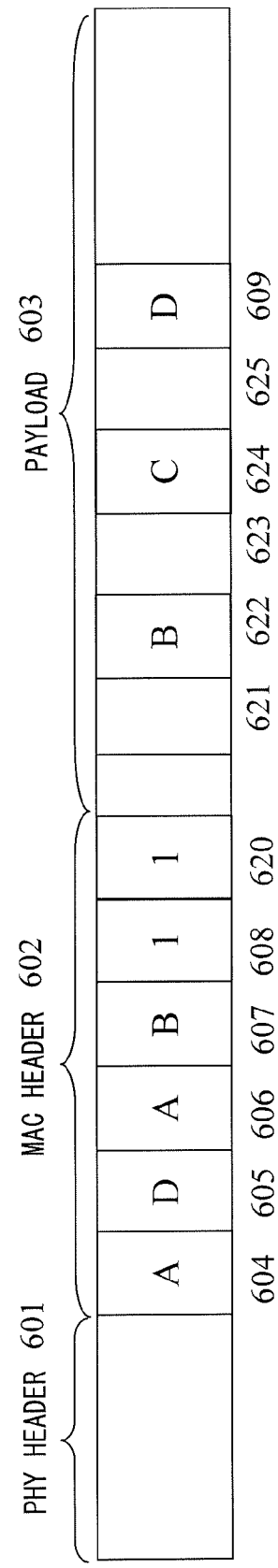

WHEN INITIATING TRANSMISSION OF ROUTE ESTIMATION REPLY

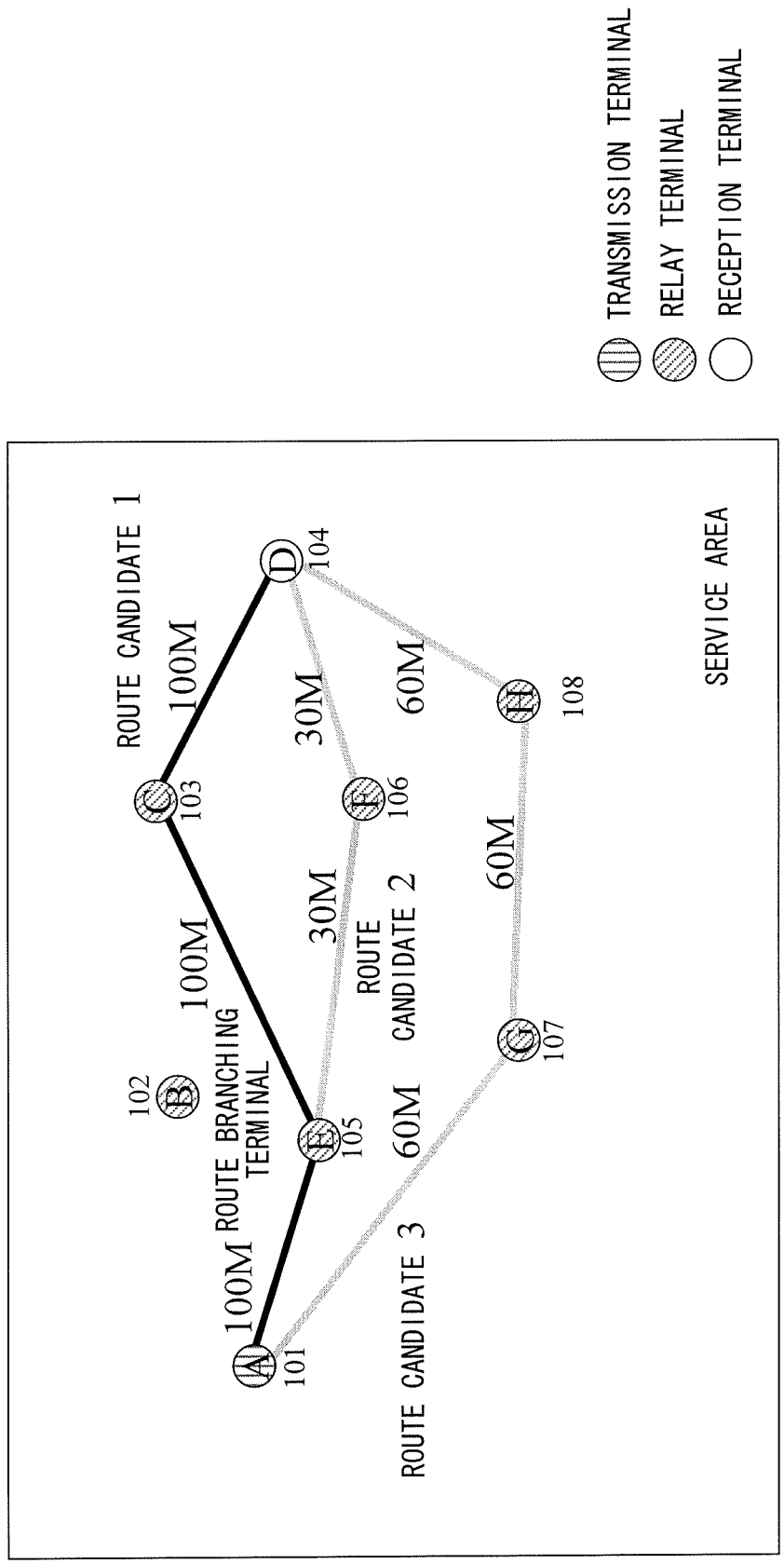

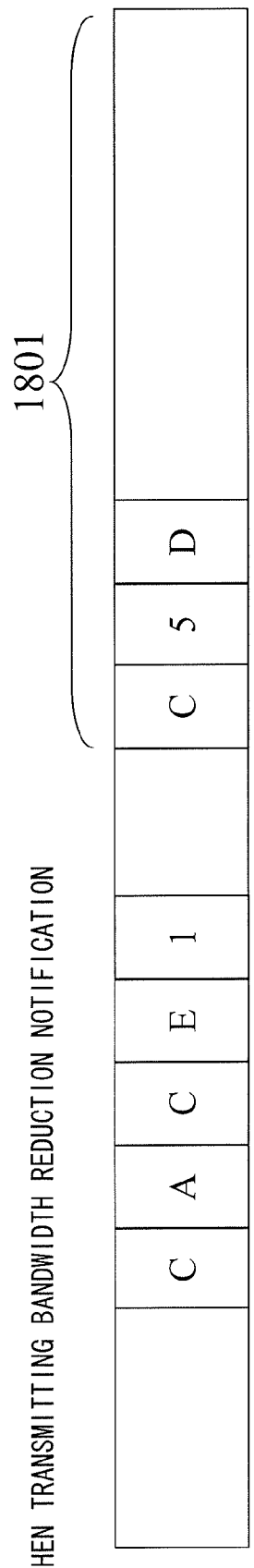

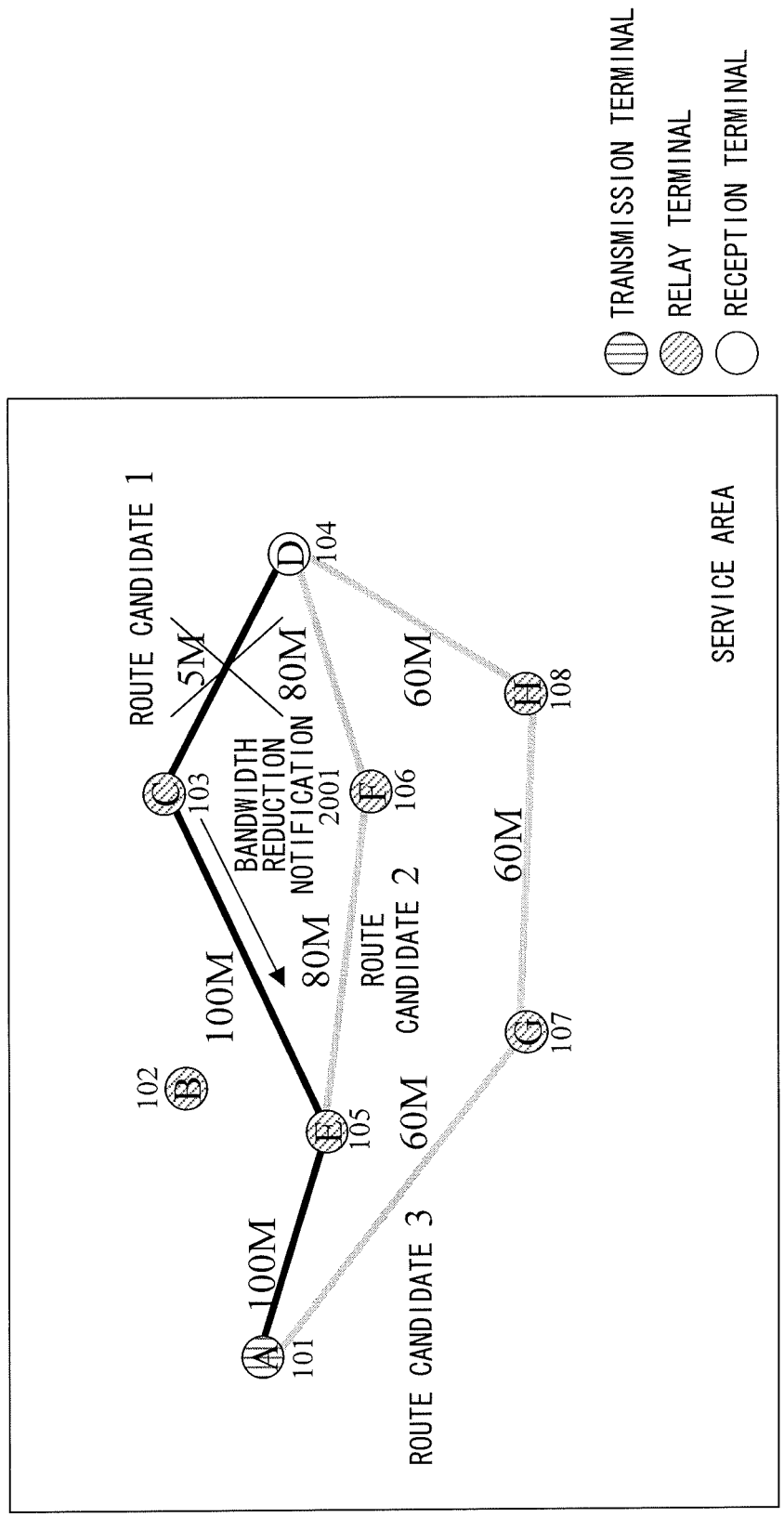
F I G. 1 9

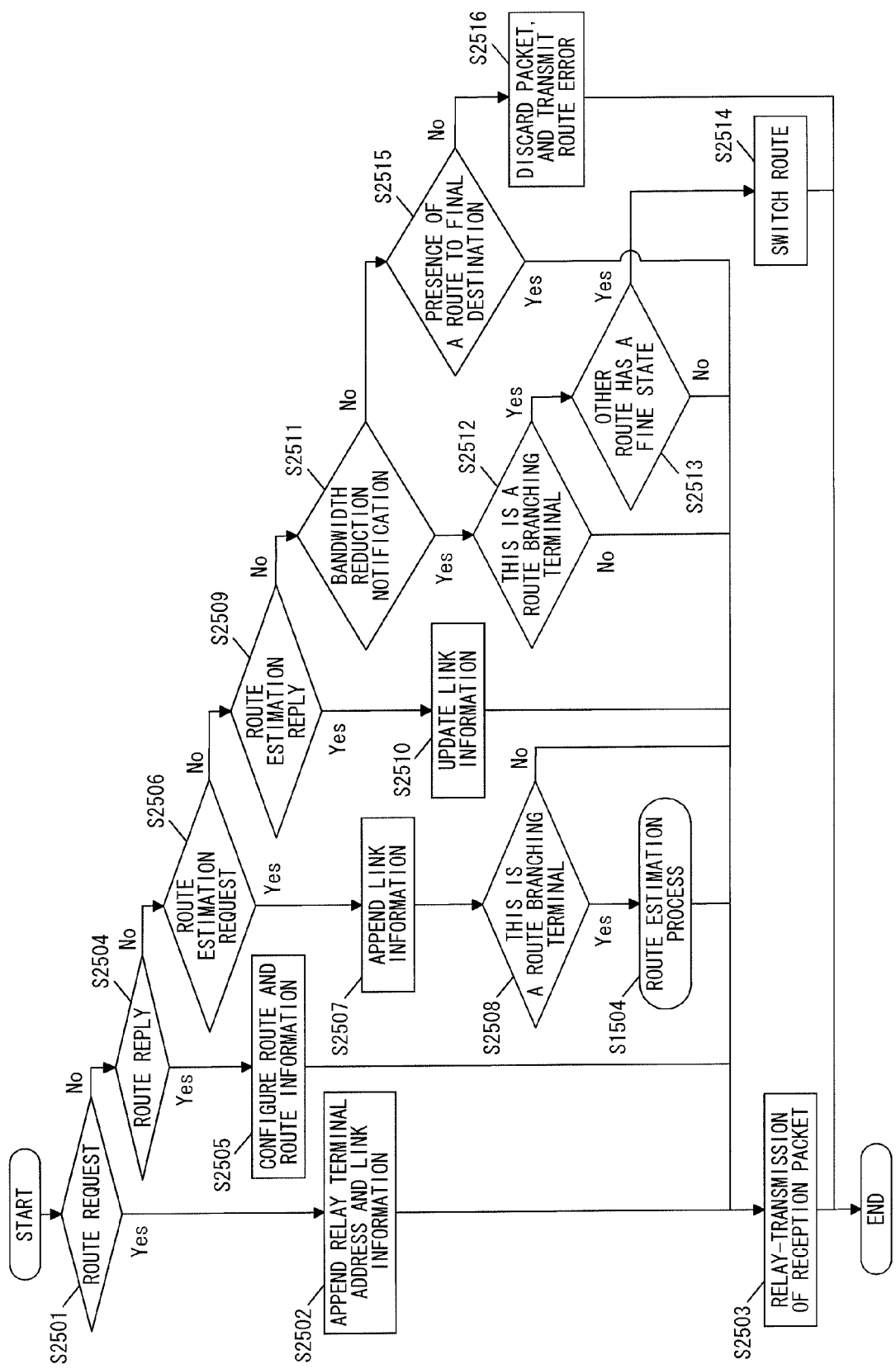
F I G. 25

FIG. 33A
WHEN RECEIVING ROUTE ESTIMATION REPLY

| D | A | F | G | 1 | 3 | | 100 | G | 60 | H | 60 | D | |
|---|---|---|---|---|---|---|-----|---|----|---|----|---|---|

WHEN TRANSMITTING ROUTE ESTIMATION REPLY

| D | A | G | A | 1 | 3 | | 100 | | G | 100 | F | 80 | D | |

3311 3312 3313

COMMUNICATION TERMINAL AND COMMUNICATION METHOD

TECHNICAL FIELD

The present invention relates to a communication terminal and a communication method, which create information of routes between terminals that are included in an ad-hoc communication system.

BACKGROUND ART

In recent years in the fields of wireless LAN and PLC (Power Line Communication), instead of a mode in which the whole communication system is managed by a single base station, an ad-hoc network that expands its communication range in association with a size-increase of the communication system by allowing each terminal included in the system to conduct a relay for other terminals is adopted.

With the ad-hoc network, it is necessary to create a communication route indicating through which terminals a communication packet is relayed, for a transmission of the communication packet to a desired final destination. A proactive protocol (e.g., refer to Non Patent Literature 1, 2) and a reactive protocol (e.g., refer to Non Patent Literature 3, 4) are existing protocols for creating the communication route.

In the proactive protocol, each of the terminals in the system periodically transmits a route creation packet to each other through broadcast. Each of the terminals in the system writes information of a destination of its own terminal in the route creation packet received from other terminals, and transfers the packet to other terminals. Then, each of the terminals in the system creates a route, based on information of the destinations of the multiple terminals, which is included in the received route creation packet. An advantage of the proactive protocol is that a load at the time of a transmission of the communication packet is small, since a route creation is conducted beforehand independently of the transmission of the communication packet. On the other hand, a disadvantage of the proactive protocol is that a load on the whole system is large because of the amount of the route creation packets occupying a communication network is large, since the route creation packet is transmitted regardless of presence or absence of the transmission of the communication packet.

In the reactive protocol, when conducting a communication, a terminal in the system confirms a route to a desired final destination by transmitting a route creation packet through broadcast only prior to the communication. An advantage of the reactive protocol is that a load on the whole system is small, because the route creation packet is transmitted only when necessary, resulting in a small amount of route creation packets occupying the communication network. On the other hand, an advantage is that a load at the time of the transmission of the communication packet is large, since it is necessary to always conduct a route creation prior to the transmission of the communication packet.

As a result of taking into consideration of the advantages and the disadvantages of the proactive protocol and the reactive protocol described above, there is a general tendency to adopt the proactive protocol for a communication system with frequent communications, and to adopt the reactive protocol for a communication system with infrequent communications.

CITATION LIST

[Patent Literature]
  [PTL 1] Japanese Laid-Open Patent Publication No. 2007-221568 [Non Patent Literature]
  [NPL 1] Request For Comments 3626: Optimized Link State Routing Protocol (OLSR)
  [NPL 2] Request For Comments 3684: Topology Dissemination Based on Reverse-Path Forwarding (TBRPF)
  [NPL 3] Request For Comments 3561: Ad hoc On-Demand Distance Vector (AODV) Routing
  [NPL 4] Request For Comments 4728: The Dynamic Source Routing Protocol (DSR) for Mobile Ad Hoc Networks for IPv4

SUMMARY OF INVENTION

Problems to be Solved by the Invention

However, the above-described conventional technologies have the following problems. When a communication terminal is in a stationary state and when communication is conducted with a communication partner by continuously using the same route, a communication volume through a wireless communication is relatively stable as long as an obstacle does not shield the route that is currently in use. On the other hand, when the communication terminal moves, the communication volume through the route that is currently in use gradually deteriorates as the distance from a relay terminal included in the route that is currently in use increases (refer FIG. 35A). Therefore, if the communication volume becomes lower than a predetermined threshold f1, the communication terminal transmits a route creation packet to the communication partner, reconfigures the route, and switches to the reconfigured route. In this manner, the communication terminal prevents interruption of the communication.

However, when a PLC is used, a situation of a bandwidth greatly fluctuates depending on a usage situation of other terminals connected to the PLC. For example, the communication can be interrupted the moment a switch of a vacuum cleaner is turned on (refer FIG. 35B). As described here, when the PLC is used, unlike the case with the usage of the wireless communication, a problem arises where it is impossible to predict an interruption of the communication beforehand and to reconfigure the route.

In order to deal with such a problem, there are technologies (e.g., patent literature 1) where the communication terminal prepares an alternate route in advance, and switches to the alternate route prepared in advance when a state of the present route deteriorates beyond a predetermined requirement that is necessary for a normal communication.

However, the technology in patent literature 1 has a problem where it is not obvious whether or not the alternate route can satisfy the predetermined requirement that is necessary for a normal communication at switching timing. Therefore, continuation of the communication becomes difficult for the communication terminal when the alternate route prepared in advance does not satisfy the predetermined requirement necessary for a normal communication at the switching timing.

Moreover, as an improvement to the technology of patent literature 1, in order to prevent interruption of the communication, it is also conceivable to transmit a route creation packet through broadcast in each predetermined cycle, and reconfigure the alternate route to prepare for an interruption of the communication.

However, unlike the case with the wireless communication where the communication volume gradually deteriorates, when the PLC is used, an interruption of the communication cannot be predicted in advance, since the communication is suddenly interrupted. Therefore, when an interruption of the communication does not occur, there is a problem where the route creation packet is needlessly broadcasted, and the limited bandwidth becomes needlessly used by the route creation packet. In addition, since an interruption of the communication cannot be predicted in advance, if the predetermined cycle for transmitting the route creation packet is too long, a problem arises where a time between an interruption of the communication and a restart of the communication becomes lengthy. On the other hand, if the predetermined cycle for transmitting the route creation packet is shortened, an interruption of the communication may not occur, however, there is a problem where the route creation packet is needlessly broadcasted and the limited bandwidth becomes largely occupied by needless route creation packets.

Therefore, an objective of the present invention, which has been achieved in view of the above described problem, is to provide a communication terminal and a communication method, which can prevent interruption of a communication when a communication volume through a route that is currently in use instantaneously reduces to a level where the communication cannot be continued, without allowing a control packet such as a route creation packet and the like to needlessly occupy a bandwidth.

Solution to Problem

In order to solve the above-described problem, the present invention is directed toward a communication terminal that is included in an ad-hoc network. The communication terminal acquires a plurality of route candidates by conducting a broadcast transmission of a route creation packet at the beginning of a data transmission, and acquires a route having the finest state by conducting a unicast transmission of a route estimation packet to each of the route candidates.

In one mode of the present invention, the communication terminal includes: a communication section that communicates a data packet to a reception terminal via at least one relay terminal; and a control section, which broadcasts, prior to a communication of the data packet, a first control packet that is used for creating routes that lead to the reception terminal, and which selects, in a descending order of communication states of the routes and based on a response result of the first control packet, a predetermined number of routes that lead to the reception terminal, and which unicasts, during the communication of the data packet, a second control packet that is used to confirm a change of a communication state of each relay terminal that is included in the predetermined number of routes selected in each predetermined time interval, and which continues the communication of the data packet by switching, based on a response result of the second control packet, a route used by the communication of the data packet to a route that has the finest communication state among the selected predetermined number of routes.

Furthermore, in one mode of the present invention, the control section defines a route having a broad bandwidth as a route having a fine communication state. Alternatively, the control section may define a route having a small delay time as a route having a fine communication state.

In one mode of the present invention, the ad-hoc network is connected by using a PLC.

When the PLC is used, unlike with the case of using the wireless communication, a communication terminal is fixed instead of being mobile. Therefore, unlike with the case of using the wireless communication, reconfiguration of a route becomes necessary not because of a movement of the communication terminal. Instead, when the PLC is used, a route of the communication terminal is influenced by a usage state of a home electric appliance which is fixed and which is connected near the route that is currently in use. Thus, even when a switch of the home electric appliance is turned ON and the state of the bandwidth of the route that is currently in use deteriorates, if the switch of the home electric appliance is turned OFF, there is a possibility that the state of the bandwidth of the route will return to the original state. If this were the case with the usage of the wireless communication, because the communication terminal is mobile, it is not necessarily obvious whether the state of the used route will be restored again, since this depends on whether or not the communication terminal returns to the original position. On the other hand, when the PLC is used, because of having the communication terminal fixed, there is an extremely high possibility that the state of the used route will be restored again if the usage state of the other terminal returns to the original state.

Therefore, in the present mode, route candidates are prepared in advance, by broadcasting, prior to a communication of the data packet, the first control packet that is used for creating routes, and by selecting, in a descending order of the communication states of the routes and based on a response result of the first control packet, a predetermined number of routes that lead to the reception terminal. Then, switching is conducted by selecting a route among the route candidates. With this, broadcasting of the first control packet that is used for creating routes can be limited to the one time before the communication, and it is possible to largely reduce the quantity of the control packets occupying the bandwidth.

In addition, during the communication of the data packet, the communication terminal unicasts the second control packet that is used to confirm increases and decreases of the bandwidth to each relay terminal that is included in the predetermined number of routes selected in each predetermined time interval. With this, it is possible to suppress a usage amount of the control packet to a minimum, and to largely lower the ratio of the control packet occupying the bandwidth.

Furthermore, based on the response result of the second control packet, the communication terminal continues the communication of the data packet by switching to a route that has the finest communication state among the selected predetermined number of routes. With this, an occurrence of an interruption of the communication can be prevented, since switching to a route having the broadest bandwidth is conducted in each predetermined time interval, instead of continuing to use the route determined at the beginning and re-creating a communication route when the bandwidth is equal to or less than a predetermined threshold. As a result, the possibility of an interruption of the communication can be largely reduced even when used in the PLC in which an interruption of the communication cannot be predicted beforehand.

In one mode of the present invention, the communication terminal conducts, when the bandwidth of the route that is used for the communication of the data packet is equal to or less than a predetermined value within the predetermined time interval, switching to a route having the next broadest bandwidth among the selected predetermined number of routes.

In the present mode, when the bandwidth of a route used in the communication of the data packet is equal to or less than a predetermined value within the predetermined time interval, switching to the route having the next broadest bandwidth among the selected predetermined number of routes is conducted. With this, even when the bandwidth of a route that is currently in use becomes narrow within the predetermined time interval to a state in which the communication cannot be continued, interruptions of the communication can be eliminated by preparing a plurality of route candidates in advance and immediately switching to another route candidate having a broad bandwidth among the route candidates.

In one mode of the present invention, the communication section receives, from a relay terminal included in the route that is used for the communication of the data packet, a bandwidth reduction notification which notifies that at least one part of the bandwidth of the route used for the communication is equal to or less than a predetermined value. When the bandwidth reduction notification is received via the communication section, the control section for the communication judges that the bandwidth of the route used in the communication of the data packet is equal to or less than a predetermined value, based on the bandwidth reduction notification.

During the communication of the data packet, the communication terminal can monitor increases and decreases of the bandwidth between adjacent communication terminals. Thus, in the present mode, the communication terminal which is a transmission source can instantaneously judge that the bandwidth of the route used in the communication of the data packet is equal to or less than a predetermined value, by receiving the bandwidth reduction notification which notifies about an instance of the bandwidth between adjacent communication terminals becoming equal to or less than a predetermined value, when the instance occurs. With this, when the bandwidth of the route used for the communication of the data packet is equal to or less than a predetermined value, it is possible to conduct switching to the route having the next broadest bandwidth among the selected predetermined number of routes. As a result, interruptions of the communication can be eliminated.

In one mode of the present invention, the control section of the communication terminal: unicasts, after switching to the route having the next broadest bandwidth among the selected predetermined number of routes, the second control packet to each relay terminal included in the selected predetermined number of routes within a current predetermined time interval; selects, based on the response result of the second control packet, a route which is used in a next predetermined time interval and which has the broadest bandwidth among the predetermined number of routes; and continues, at the start of the next predetermined interval, the communication of the data packet by switching to the selected route having the broadest bandwidth.

In the present mode, even after switching to the route having the next broadest bandwidth among the predetermined number of routes within the current predetermined time interval, a high quality of communication can be maintained while eliminating interruptions of the communication since a period in which the route having the next broadest bandwidth is used can be made shorter than a predetermined period, as a result of continuing the communication by switching to a route having the broadest bandwidth at the start of the next predetermined time interval.

In one mode of the present invention, the predetermined time intervals are set for every selected predetermined number of routes, and the predetermined time intervals set for every selected predetermined number of routes are asynchronous to each other.

In one mode of the present invention, when a route used for a communication of the data packet is defined as a first route, the control section switches, when a bandwidth of a second route which is other than the first route is ascertained to be broader than that of the first route after elapsing of a predetermined time of the second route, the route use for the communication of the data packet to the second route after elapsing of the predetermined time of the second route.

According to the present mode, a communication can be conducted using a route that has the broadest bandwidth, as a result of selecting a route that has the broadest bandwidth at the timing when a predetermined period of each route has elapsed, by switching to the route that has the broadest bandwidth when a predetermined period of each route other than the first route has elapsed. As a result, time in which the communication is conducted at a state with the broadest bandwidth can be prolonged, and it is possible to maximally utilize the route having the broadest bandwidth throughout the whole communication.

In one mode of the present invention, the communication section receives, from a first relay terminal that is included in one route among the selected predetermined number of routes, a notification which notifies, in a case where a new route is created between the first relay terminal and a second relay terminal that have not been included in the one route, about additional routes for the one route that leads to the reception terminal. The control section replaces the one route with a substitute one route having the broadest bandwidth among the additional routes for the one route.

According to the present mode, during communication, when another route, which is a bypass, is created for one route among the predetermined number of routes selected prior to the communication, and when the one route will have a broader bandwidth if the other route, which is a bypass, is used, a change in routes that have occurred after the start of the communication is also taken into consideration, enabling a route that has the broadest bandwidth to be selected by substituting the one route with one that includes the other route, which is a bypass. With this, while maintaining the predetermined number of routes selected in advance and without broadcasting the first control packet again, the route can be updated to one having a bandwidth that is less likely to be equal to or less than a predetermined threshold.

In one mode of the present invention, the case where a new route is created between the first relay terminal and the second relay terminal that have not been included in the one route, is a case where another communication terminal, as a transmission source, creates a route to a transmission destination, which is identical to the reception terminal, via the first relay terminal and the second relay terminal.

According to the present mode, the case where a new route is created between the first relay terminal and the second relay terminal that have not been included in the one route, can be made as a case where another communication terminal, as a transmission source, creates a route to a transmission destination, which is identical to the reception terminal, via the first relay terminal and the second relay terminal.

In one mode of the present invention, the communication section receives a bandwidth reduction notification that notifies about an instance of a bandwidth between the first relay terminal and the second relay terminal becoming equal to or less than a predetermined value, when the instance occurs. When the bandwidth reduction notification is received via the communication section, the control section restores the one route to its original from the substitute one route.

According to the present mode, by restoring the one route to its original from the substitute one route when a bandwidth between the first relay terminal and the second relay terminal becomes equal to or less than a predetermined value, the number of the routes selected in advance can be maintained even after a reduction of the bandwidth of the one route, thus, the number of the routes can be secured as backups for switching, therefore, an occurrence of an interruption of the communication can be prevented.

In one mode of the present invention, the control section sets, when a bandwidth of a route among either one of the selected predetermined number of routes becomes equal to or less than a predetermined value, a predetermined time interval for unicasting the second control packet of the route to a predetermined minimum time interval.

When a bandwidth of a route among either one of the selected predetermined number of routes becomes equal to or less than a predetermined value, it can be estimated that the bandwidth of the route increases and decreases unstably. Therefore, according to the present mode, based on an assumption that the bandwidth of the route largely increases and decreases, the predetermined time interval for unicasting the second control packet for the route is set to the predetermined minimum time interval. Consequently, increases and decreases of the bandwidth of the route are frequently comprehended, and a route that has a possibility of a large bandwidth fluctuation can be discovered quickly. As a result, for example, in a case of transmitting continuous data such as a motion picture, the communication can be stabilized by removing, from route options, a route that has a possibility of a large bandwidth fluctuation.

In one mode of the present invention, for the route in which the predetermined time interval thereof for unicasting the second control packet is set to the predetermined minimum time interval, when the bandwidth of the route has not become equal to or less than the predetermined value in subsequent predetermined time intervals, the control section gradually restores the predetermined time interval.

According to the present mode, even when the predetermined time interval is set to the predetermined minimum time interval once, there might be a case where the bandwidth of the route has not become equal to or less than the predetermined value in subsequent predetermined time intervals (e.g., when the cause of the bandwidth fluctuation is due to a temporary cause, such as a switch of a vacuum cleaner being turned on). In such a case, by judging the route as a route that has a small bandwidth fluctuation, and by only allowing the predetermined time interval to be variable and gradually restoring the predetermined time interval, it can be judged whether or not the route is an unstable route in which the bandwidth of the route largely increases and decreases; therefore, a process of judging the stability of the route can be conducted easily.

In one mode of the present invention, for the route in which the predetermined time interval thereof for unicasting the second control packet is set to the predetermined minimum time interval, when the bandwidth of the route has become equal to or less than the predetermined value also in subsequent predetermined time intervals, the control section sets the predetermined time interval to the predetermined minimum interval again.

According to the present mode, when the bandwidth of the route has become equal to or less than the predetermined value also in subsequent predetermined time intervals, the predetermined time interval is set to the predetermined minimum time interval again. With this, not just the possibility of a large bandwidth fluctuation, but in fact, the route can be judged as one having a large bandwidth fluctuation. Therefore, by only allowing the predetermined time interval to be variable, a process of discovering an unstable route having a large bandwidth fluctuation can be conducted easily.

One mode of the present invention is a communication terminal included in an ad-hoc network, and is a communication terminal that relays a data packet between a transmission terminal and a reception terminal. In this case, a predetermined number of routes that lead to the reception terminal are selected by the transmission terminal in a descending order of communication states of the routes. Furthermore, the communication terminal of the present invention includes: a communication section that communicates the data packet; and a control section, which judges, during the communication of the data packet, whether or not the communication terminal is positioned at a branching point of two or more routes among the selected predetermined number of routes based on a control packet unicasted by the transmission terminal in each predetermined time interval, and which selects, when the communication terminal is positioned at the branching point of two or more routes among the selected predetermined number of routes and when a bandwidth used for the communication of the data packet has become equal to or less than a predetermined value, the route that has the finest communication state among other routes that go through the branching point, and which switches the route used for the communication of the data packet.

According to the present mode, the communication terminal operates as a relay terminal, and, when the communication terminal is positioned at a route branching point of a first route and a second route, the communication terminal selects and switches to a route having the broadest bandwidth among other routes that go through the branching point. With this, processes of the system as a whole can be simplified, since the process of notifying the communication terminal, which is a transmission source, about the bandwidth used for the communication of the data packet being equal to or less than the predetermined value can be omitted.

The present invention is also directed toward a communication method conducted by a communication terminal included in an ad-hoc network. And the communication method of the present invention includes the steps of: communicating a data packet to a reception terminal via at least one relay terminal; broadcasting, prior to the communicating of the data packet, a first control packet used for creating routes that lead to the reception terminal; selecting, in a descending order of communication states of the routes and based on a response result of the first control packet, a predetermined number of routes that lead to the reception terminal; unicasting, during the communicating of the data packet, a second control packet that is used to confirm a change of a communication state of each relay terminal that is included in the predetermined number of routes selected in each predetermined time interval; and continuing the communicating of the data packet by switching, based on a response result of the second control packet, to a route that has the finest communication state among the selected predetermined number of routes.

Furthermore, the present invention is also directed toward a communication method conducted by a communication terminal which is included in an ad-hoc network and which relays a data packet between a transmission terminal and a reception terminal. In this case, a predetermined number of routes that lead to the reception terminal are selected by the transmission terminal in a descending order of communication states of the routes. Furthermore, the communication method of the present invention includes the steps of: communicating the data packet; judging, during the communicating of the data packet, whether or not the communication terminal is positioned at a branching point of two or more routes among the selected predetermined number of routes based on a control packet unicasted by the transmission terminal in each predetermined time interval; and switching the route used for the communicating of the data packet after selecting, when the communication terminal is positioned at the branching point of two or more routes among the select predetermined number of routes and when a bandwidth used for the communicating of the data packet has become equal to or less than a predetermined value, the route that has the finest communication state among other routes that go through the branching point.

Advantageous Effects of Invention

With the above-described configuration, in an ad-hoc network that uses an electrical power line and the like, the present invention allows to acquire a route that has the finest bandwidth when selecting a route. Furthermore, it is possible to largely reduce a ratio of a bandwidth used for transmitting a route creation packet among the bandwidth used for the whole communication, and a transmission of data that is originally intended for transmission can be ensured.

BRIEF DESCRIPTION OF DRAWINGS

FIG. 4B is a figure showing one example of route candidates retained by a route candidate retain section 404.

FIG. 5B is a figure representing one specific example of the packet for route searching (route request) used in embodiment 1 of the present invention.

FIG. 5C is a figure representing a format of a packet for route searching (route reply) used in embodiment 1 of the present invention.

FIG. 6B is a figure representing one specific example of the packet for route estimation (route estimation request) used in embodiment 1 of the present invention.

FIG. 17 is a network configuration diagram in embodiment 2.

FIG. 18B is a figure representing one specific example of the bandwidth reduction notification packet used in embodiment 2 of the present invention.

FIG. 19 is a figure showing a state of the network at the time of transmitting the bandwidth reduction notification to a route-branching terminal according to embodiment 2.

FIG. 25 is a flowchart representing a process at a relay terminal according to embodiment 2.

FIG. 33A is a figure showing a route estimation reply used in embodiment.

FIG. 33B is a figure showing a route estimation reply used in embodiment 4.

DESCRIPTION OF EMBODIMENTS

Embodiment 1

Figure 1:
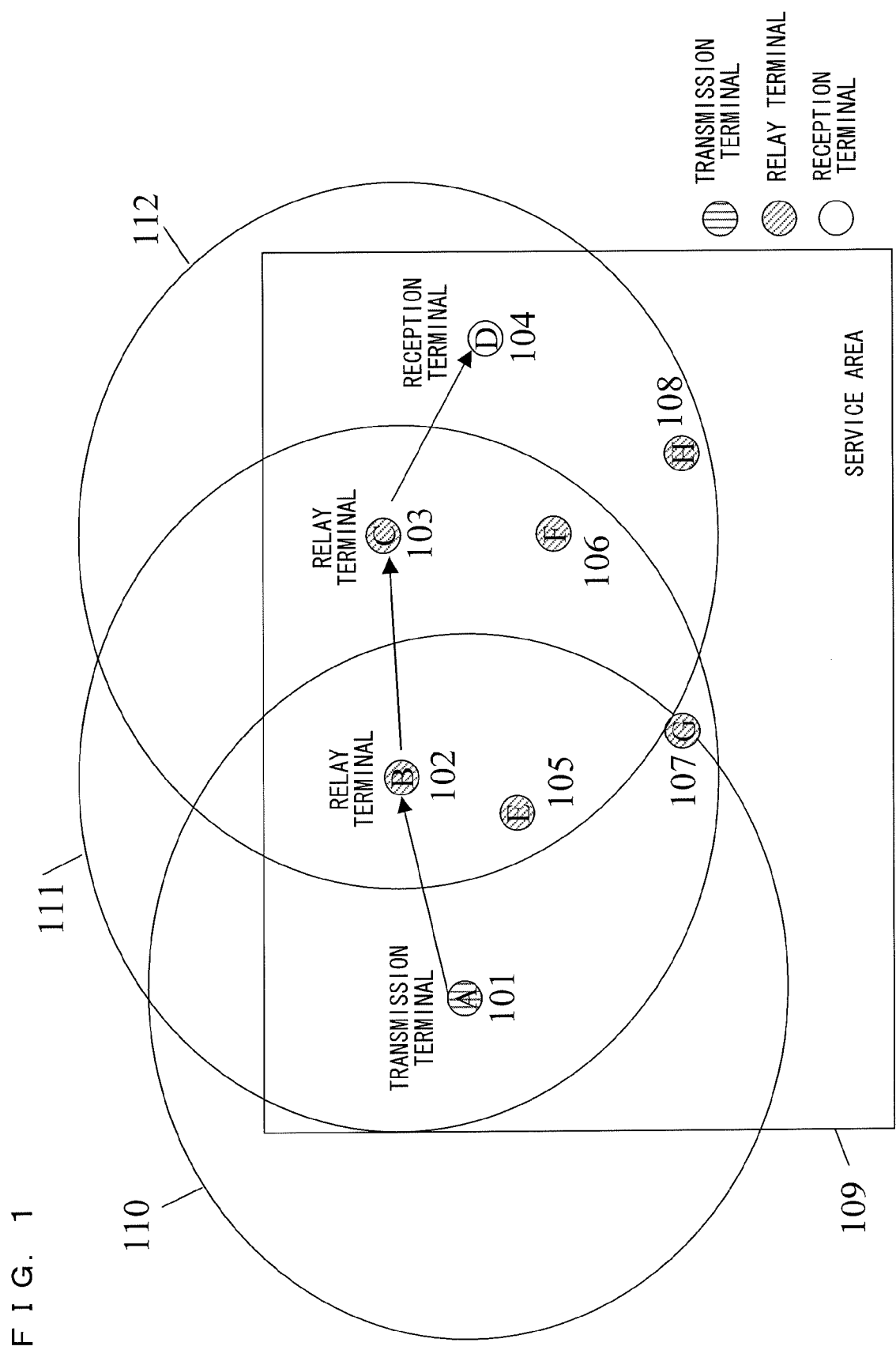
FIG. 1 is a configuration figure of a communication system according to embodiment 1 of the present invention.

FIG. 1 is a configuration figure of a communication system according to embodiment 1 of the present invention. In FIG. 1, the communication system of the present invention includes a plurality of communication terminals 101 to 108. Particularly, here, among the communication terminals 101 to 108, a terminal that transmits data will be called a transmission terminal, a terminal that relays data will be called a relay terminal, and a terminal that receives data will be called a reception terminal. Shown in an example in FIG. 1 is a state in which a transmission terminal A101 transmits data to a reception terminal D104 via a relay terminal B102 and a relay terminal C103. Although a network used here is envisioned as a PLC (Power Line Communication) network, it is also applicable as networks such as a wireless LAN, a wired LAN, and the like. A service area 109 in this system is larger than coverage areas 110, 111, and 112, which are respectively those of the communication terminals 101, 102, and 103 existing within the network. Therefore, the transmission terminal A101 and the reception terminal D104 are adopting an ad-hoc network in which a communication between each other is conducted via the relay terminal B102 and the relay terminal C103.

Figure 2:
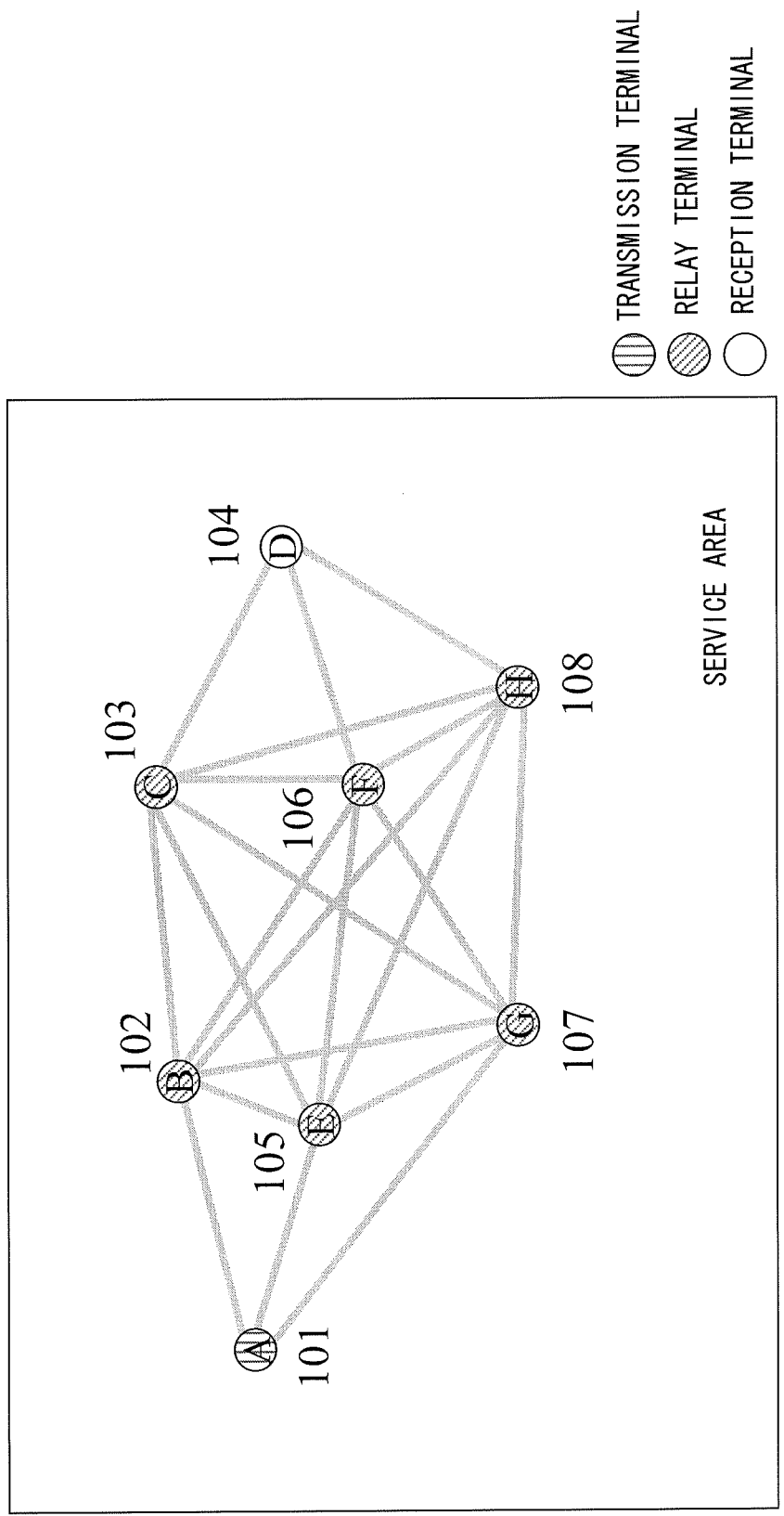
FIG. 2 is a configuration figure of a logical topology of the communication system according to embodiment 1 of the present invention.

FIG. 2 is a figure showing a logical topology of the communication system shown in FIG. 1. In FIG. 2, among communication terminals A-H/101-108, those that are connected to another by a line are those that can directly communicate with the other.

Figure 3:
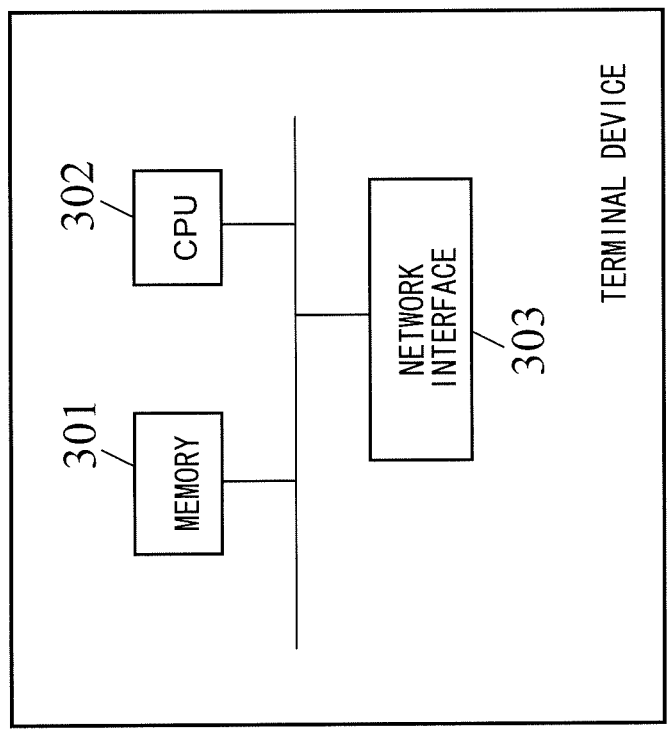
FIG. 3 is a figure showing a hardware configuration of the communication terminal according to embodiment 1 of the present invention.

FIG. 3 is a figure showing a hardware configuration of each of the communication terminals described above. In FIG. 3, the communication terminal includes: a memory 301 containing various control programs and work areas; a CPU 302 for controlling the whole communication terminal; and a network interface 303 which is connect to an electrical power line and which communicates various data via the electrical power line. The CPU 302 executes a program stored in the memory 301. In addition, the CPU 302 transmits data via the network interface 303, and, by deciphering data received via the network interface 303, receives the data.

Figure 4A:
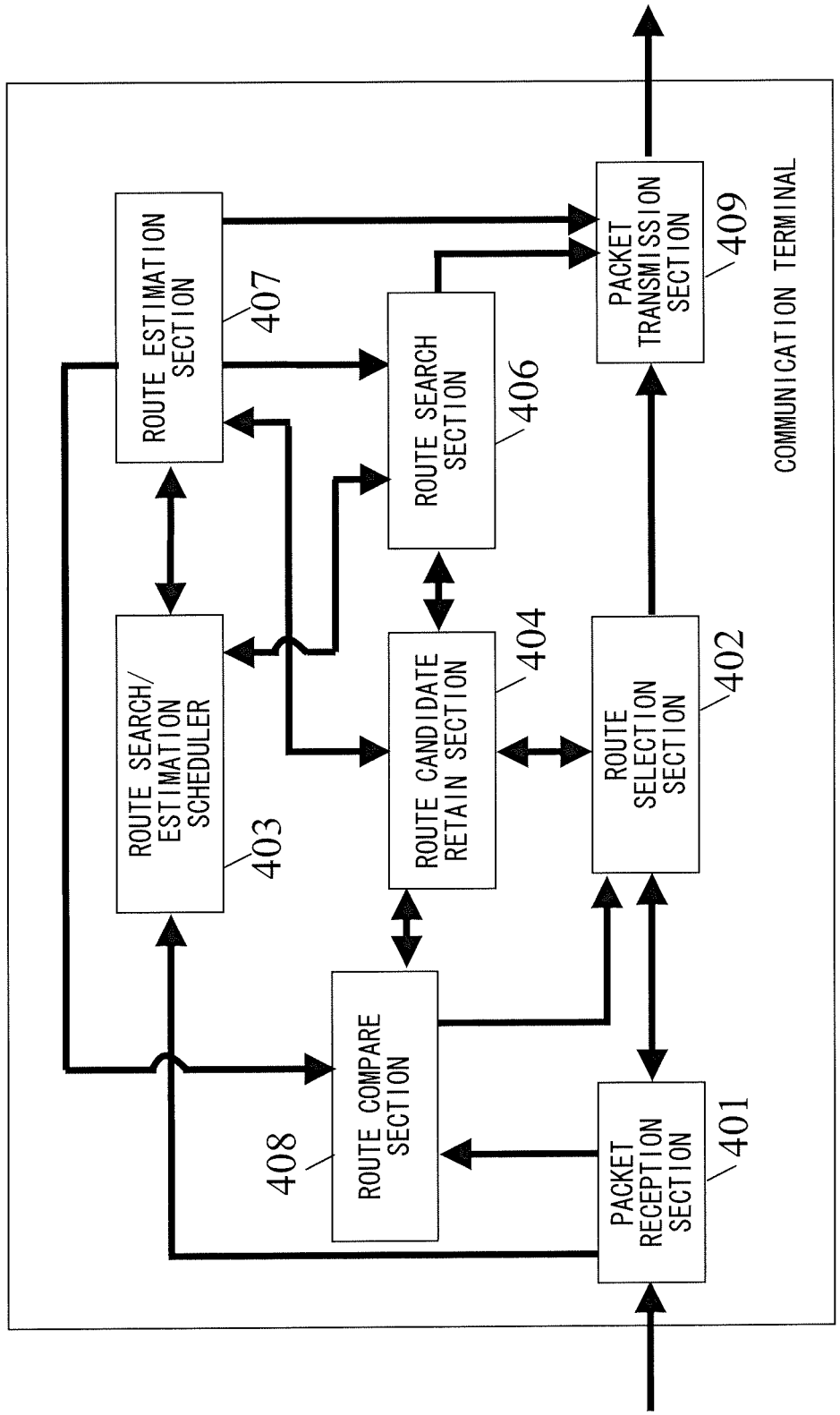
FIG. 4A is a functional block diagram of a terminal device according to embodiment 1 of the present invention.

FIG. 4A is a functional block diagram of a terminal device according to embodiment 1 of the present invention. In FIG. 4A, the terminal device includes: a packet reception section 401; a route selection section 402; a route search/estimation scheduler 403; a route candidate retain section 404; a route search section 406; a route estimation section 407; a route compare section 408; and a packet transmission section 409.

These functional blocks can be attained by the memory 301, the CPU 302, the network interface 303, and the like, which are described above.

The packet reception section 401 receives all packets that are receivable. When a packet is received, the packet reception section 401 inquires the route selection section 402 about presence or absence of a route candidate for transmitting a reception packet to a destination of the reception packet. The route selection section 402 refers to the route candidate retain section 404 which retains several route candidates to the destination of the reception packet, and confirms the presence or absence of a route candidate to the destination of the reception packet. The route candidates retained by the route candidate retain section 404 will be described later. If the route selection section 402 has confirmed a presence of a route to the destination of the reception packet, the packet reception section 401 relays the reception packet to the route selection section 402. On the other hand, if the route selection section 402 has confirmed an absence of a route candidate to the destination of the reception packet, the packet reception section 401 instructs the route search/estimation scheduler 403 to search for a route that leads to the destination of the reception packet.

The route selection section 402: causes the route compare section 408 to compare the plurality of route candidates, which are retained by the route candidate retain section 404, with one another for the destination of the packet relayed from the packet reception section 401; and selects the optimum route among the plurality of route candidates.

When the route search/estimation scheduler 403 receives an instruction from the packet reception section 401 to search for a route, the route search/estimation scheduler 403 instructs the route search section 406 to conduct a route search to search for a route to the destination of the reception packet. Furthermore, when a route for transmitting the reception packet is selected by the route selection section 402, the route search/estimation scheduler 403 sets a predetermined time in a timer, and instructs the route estimation section 407 to conduct a route estimation to estimate the situation of a bandwidth of a route that will be used for the transmission of the reception packet. Every time the time set in the timer elapses, the route search/estimation scheduler 403 conducts a route estimation.

When the route search section 406 receives an instruction from the route search/estimation scheduler 403 to conduct a route search, the route search section 406 transmits a route search packet as a first control packet from the packet transmission section 409 to the network as a broadcast. Then, the route search section 406 receives a response packet in response to the first control packet via the packet reception section 401, acquires route candidates from the response packet (route request/route reply), and sends the route candidates to the route candidate retain section 404.

When the route candidate retain section 404 receives the route candidates from the route search section 406, the route candidate retain section 404 saves the route candidates and transmits it to the route compare section 408. FIG. 4B is a figure showing one example of the route candidates retained by the route candidate retain section 404. Referring FIG. 4B, for each of the route candidates, the route candidate retain section 404 has fields such as, final destination, next destination as a relay route, bandwidth information, delay information, priority (bandwidth), priority (delay), and option. An address of a reception terminal (e.g., D, J, and the like) is configured in the final destination field as a destination address of the transmission packet. An address of a relay terminal (e.g., B, E, K, J, and the like) to which the transmission packet is transmitted next is configured in the next destination field. Information regarding a bandwidth (e.g., 100, 50, 60, or 40 Mbps) which is between the transmission terminal and the reception terminal and which is calculated by using formula (1) is configured in the bandwidth information field. A delay time (e.g., 1, or 2 seconds), which is the time required for the transmission packet originated the transmission terminal to be received by the reception terminal, is configured in the delay information field.

When routes to the same final destination are selected, the priority (bandwidth) is a field for determining whether to prioritize the bandwidth information or the delay information. If the bandwidth information is to be prioritized, "1" is configured in the field, whereas if the delay information is to be prioritized, "2" is configured in the field. The priority (delay) is a field for determining whether to prioritize the bandwidth information or the delay information, and if the delay information is to be prioritized, "1" is configured in the field, whereas if the bandwidth information is to be prioritized, "2" is configured in the field. The option is a field in which an arbitrary item is configurable. For example, in the option field, a user may configure: validity/invalidity of each of the route candidates; or information regarding which of the bandwidth information of the delay information should be prioritized regardless of configured contents in the priority (bandwidth)/priority (delay) fields.

Furthermore, for each of the fields, the route candidates shown in FIG. 4B may include only either one of the bandwidth information or the delay information. If a route candidate includes only either one of the bandwidth information or the delay information, it will not be necessary to include both fields of the priority (bandwidth) and the priority (delay), since there is no need to determine which of either the bandwidth information or the delay information is to be prioritized. In addition, whether or not to include the option field can be arbitrarily determined depending on the system.

Based on the instruction from the route search/estimation scheduler 403 to conduct a route estimation, for each of the route candidates which are retained by the route candidate retain section 404 and which lead to the destination of the reception packet, the route estimation section 407 transmits a route estimation packet as a second control packet from the packet transmission section 409 to the network as a unicast. Then the route estimation section 407 receives a response packet in response to the second control packet via the packet reception section 401, acquires, from the response packet, state information indicating states of the bandwidth of each of the routes (route estimation request/route estimation reply), and transmits the state information to the route candidate retain section 404.

When the route candidate retain section 404 receives the state information of each of the routes from the route estimation section 407, the route candidate retain section 404 saves the state information of each of the routes, and transmits the state information to the route compare section 408.

The route compare section 408 receives, from the route candidate retain section 404, route candidates for the reception packet. When the route compare section 408 receives the state information of each of the route candidates, the route compare section 408 compares the state information of the respective routes, and, when a route change is necessary, notifies the route selection section 402. When a change of the route is instructed by the route compare section 408, the route selection section 402 changes the route to be selected.

Figure 5A:
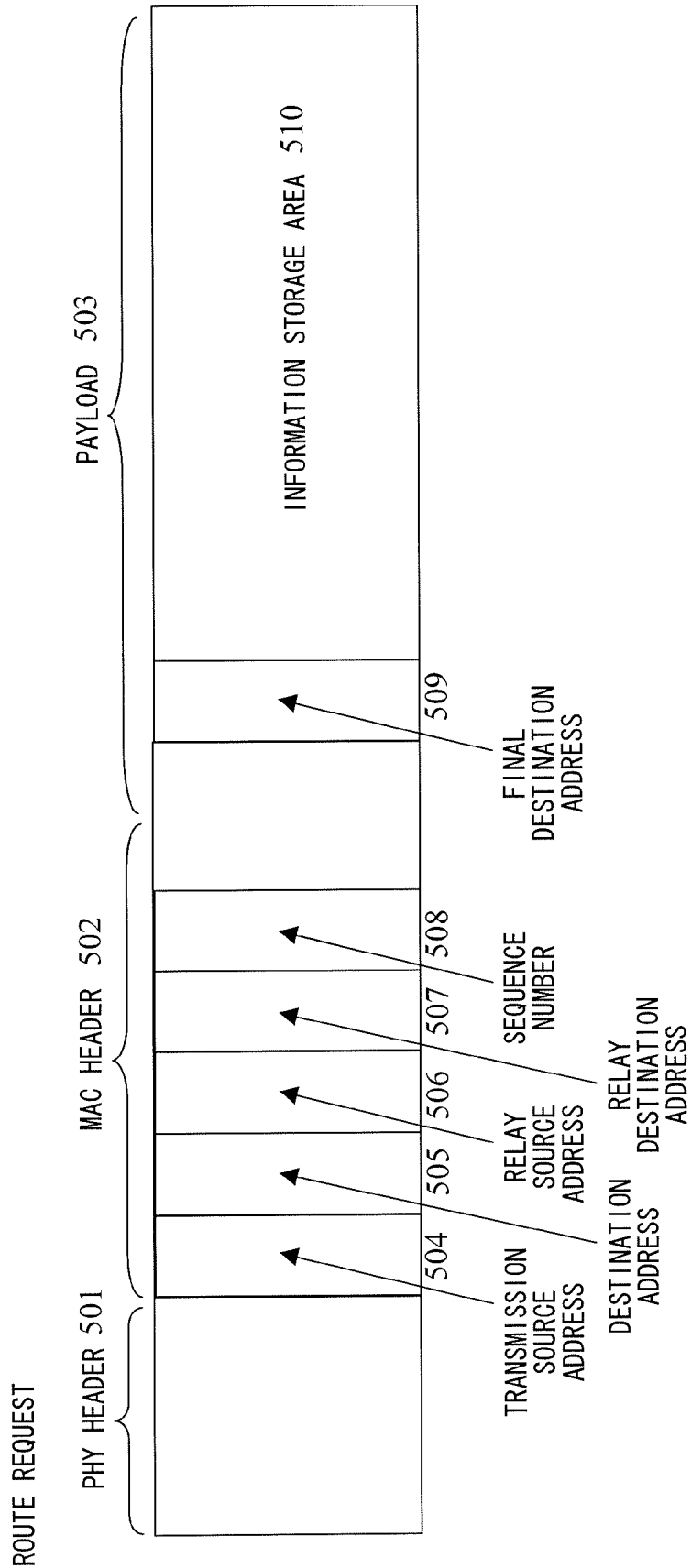
FIG. 5A is a figure representing a format of a packet for route searching (route request) used in embodiment 1 of the present invention.

FIGS. 5A-5D are figures representing formats of the route search packet. When the route search packet is used as a request packet which originates from the transmission terminal and which heads toward the reception terminal, the route search packet will be called a route request. FIG. 5A is a figure showing a packet format of the route request. In FIG. 5A, the route search packet includes a PHY header 501, an MAC header 502, and a payload 503. Modulation method information is stored in the PHY header 501. The MAC header 502 stores: fields representing a transmission source address 504, a destination address 505, a relay source address 506, and a relay destination address 507; and a sequence number 508 that is given to each transmission source terminal. The payload 503 includes a field 509 that indicates a final destination address of a route that is intended to be searched, and an information storage area 510 that stores route information to a final destination.

FIG. 5B is a figure showing one specific example of the route search packet. In FIG. 5B, in the route search packet transmitted from the transmission terminal A101, address A of the transmission terminal A101 is configured in the transmission source address 504, and "ALL", which indicates addresses (ff:ff:ff:ff:ff:ff) of all terminals, is configured in the destination address 505. Address A of the transmission terminal A101 is also configured in the relay source address 506, and "ALL", which indicates addresses (ff:ff:ff:ff:ff:ff) of all terminals, is also configured in the relay destination address 507. Thus, the route search packet is transmitted as a broadcast. After receiving this route search packet, the relay terminal B102 converts the relay source address 506 to address B of the relay terminal B102, and transmits the route search packet to the relay terminal C103. Furthermore, after receiving this route search packet, the relay terminal C103 converts the relay source address 506 to address C of the relay terminal C103, and transmits the route search packet to the reception terminal D104. However, when the route search packet arrives at the reception terminal D104 which is the final destination, the relay process of the route search packet is not conducted by the reception terminal D104.

When the route search packet is used as a reply packet which originates from the reception terminal and which heads toward the transmission terminal, the route search packet will be called a route reply. FIG. 5C is a figure representing a packet format of the route reply. Referring to FIG. 5C, the MAC header 502 of the route reply includes a route number 520 that is given to each of the final destinations, in addition to the fields 504-508 which similarly exist in the route request. In addition to the final destination address 509, the payload 503 includes: link information 521, 523, and 525, each of which representing information of a route between relay terminals that exist between the transmission source and the final destination; and relay terminal addresses 522 and 524 indicating which information, regarding routes between relay terminals, are represented by the link information 521, 523, and 525. The link information 521, 523, and 525, each indicates state information of a state of the bandwidth of a route between relay terminals that exist between the transmission source and the final destination.

Figure 5D:
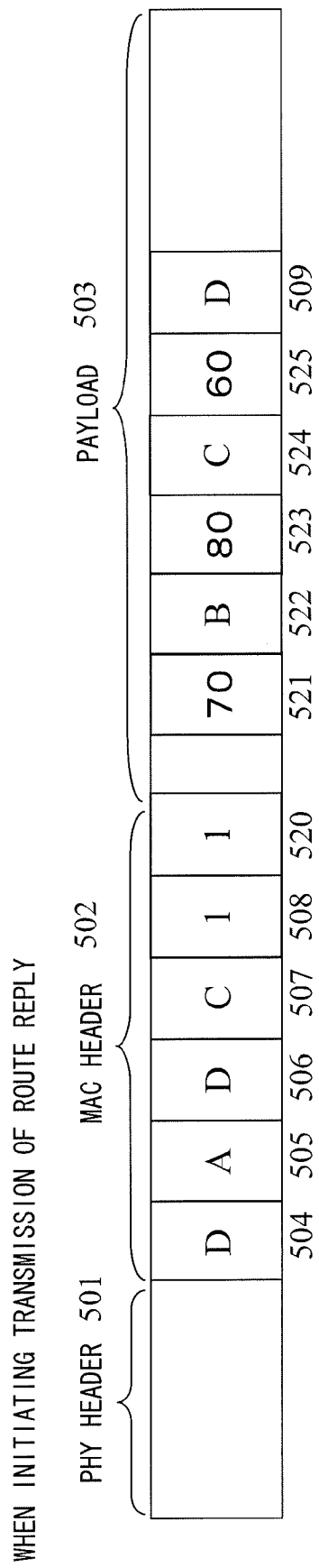
FIG. 5D is a figure representing one specific example of the packet for route searching (route reply) used in embodiment 1 of the present invention.

For example, FIG. 5D is a figure showing one specific example of the route reply. In FIG. 5D, when the route reply is sent back from the reception terminal D104 to the transmission terminal A101, address D of the reception terminal D104 is configured as the transmission source address 504, and address A of the transmission terminal A101 is configured as the destination address 505. The relay source address 506 and the relay destination address 507 are configured so as to follow an opposite route of a route from the transmission terminal A101 to the reception terminal D104. Here, address D of the reception terminal D104 is configured as the relay source address 506, and address C of the relay terminal C103 is configured as the relay destination address 507.

The link information 521, representing information between the transmission terminal A101 and the relay terminal B102, indicates that a state of the bandwidth is 70 Mbps. The link information 523, representing information between the relay terminal B102 and the relay terminal C103, indicates that a state of the bandwidth is 80 Mbps. The link information 525, representing information between the relay terminal C103 and the reception terminal D104, indicates that a state of the bandwidth is 60 Mbps. When the route search packet is used as the route request, these link information 521, 523, and 525, are written in an information storage area 610 by a relay destination terminal that has received the route request, as information indicating states of the bandwidth between the relay source and the relay destination. When the route search packet is used as the route reply, the route reply is transmitted through unicast.

Figure 6A:
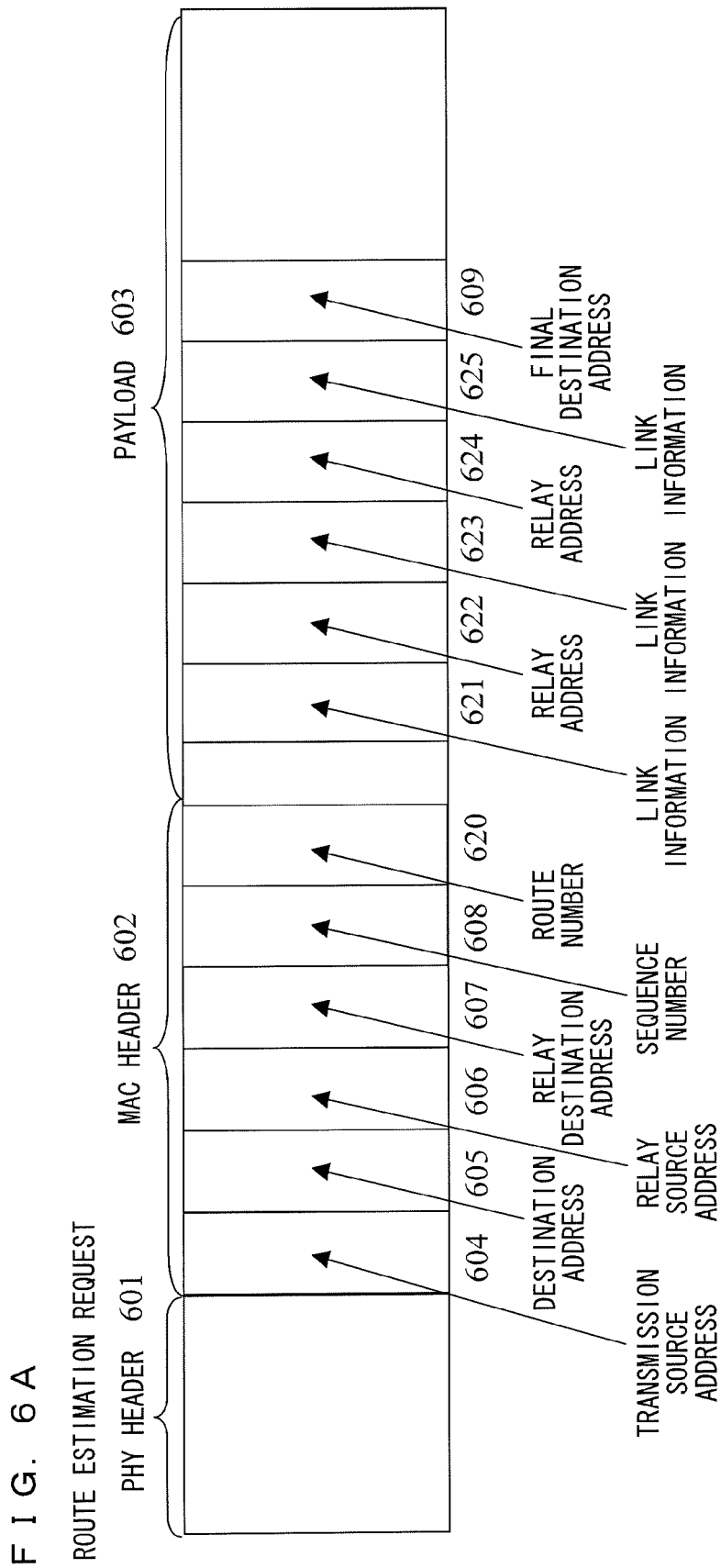
FIG. 6A is a figure representing a format of a packet for route estimation (route estimation request) used in embodiment 1 of the present invention.

FIGS. 6A-6D are figures representing formats of the route estimation packet. When the route estimation packet is used as a request packet, it will be called a route estimation request. FIG. 6A is a figure showing a packet format of the route estimation request. In FIG. 6A, the route estimation request includes a PHY header 601, a MAC header 602, and a payload 603, and has a configuration similar to the route reply shown in FIG. 5C and FIG. 5D. Thus, a route number 620 is added to the MAC header 602 of the route request, in addition to a transmission source address 604, a destination address 605, a relay source address 606, a relay destination address 607, and a sequence number 608. In addition to a final destination address 609, the payload 603 includes: link information 621, 623, and 625, each of which representing information of a route between relay terminals that exist between the transmission source and the final destination; and relay terminal addresses 622 and 624 indicating which information, regarding routes between relay terminals, are represented by the link information 621, 623, and 625. When each of the relay terminals receives the route estimation request, depending on the relay address included in the payload 603, each of the relay terminals reconfigures the relay destination address and the relay source address, which are included in the MAC header 602, and transmits the reconfigured addresses to the next relay terminal.

FIG. 6B is a figure showing one specific example of the route estimation request. In FIG. 6B, when the transmission is conducted from the transmission terminal A101 to the reception terminal D104, in the route estimation request, address A of the transmission terminal A101 is configured in the transmission source address 604, address D of the reception terminal D104 is configured in the destination address 605, address A of the transmission terminal A101 is configured in the relay source address 606, and address B of the relay terminal B102 is configured in the relay destination address 607. Thus, the route estimation request is transmitted through unicast. Furthermore, the route estimation request is transmitted to the reception terminal D104 sequentially through the relay terminal B102 and the relay terminal C103, by using the relay addresses 622 and 624. Every time the route estimation request is transmitted from a relay terminal to a relay terminal, a relay terminal among either one of the relay source and the relay destination writes state information indicating a state of the bandwidth of a route between the relay source and the relay destination, in the link information 621, 623, and 625.

Figure 6C:
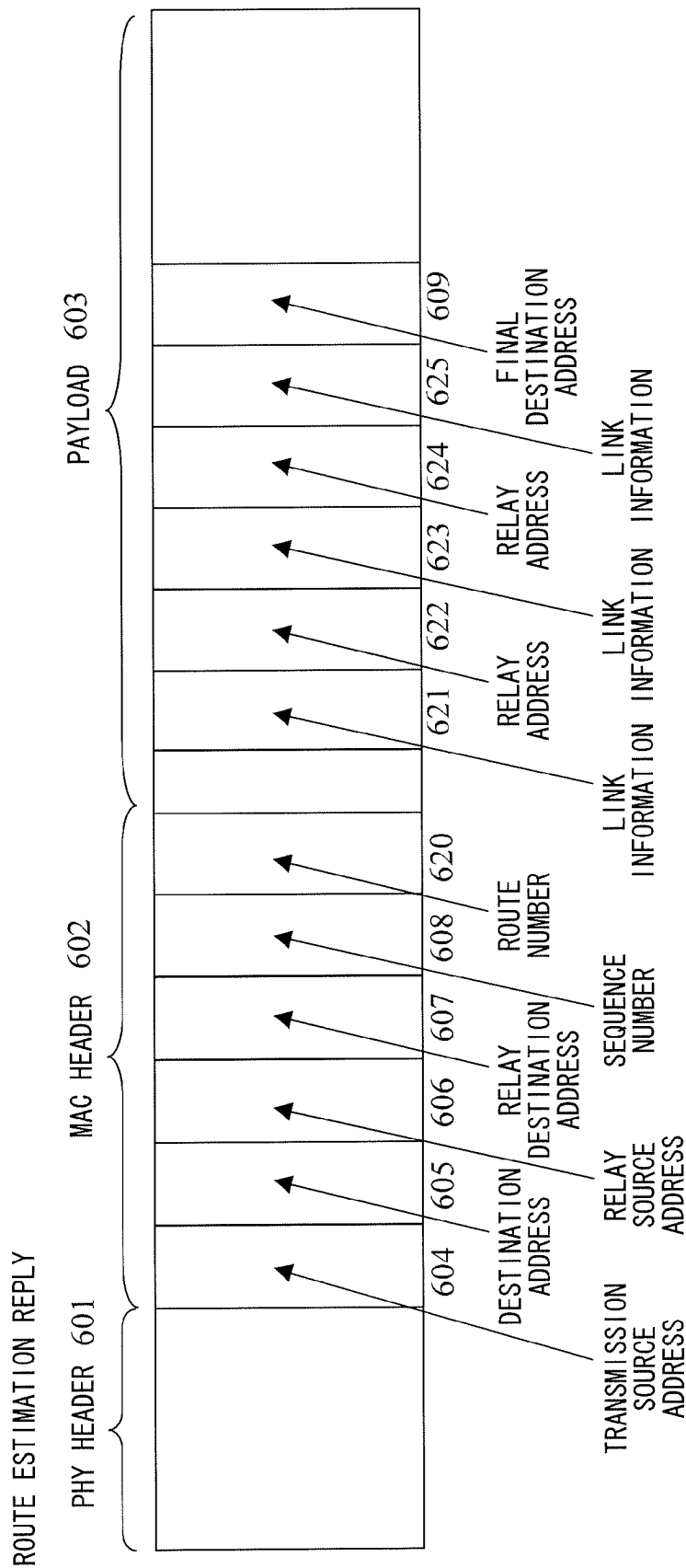
FIG. 6C is a figure representing a format of a packet for route estimation (route estimation reply) used in embodiment 1 of the present invention.
Figure 6D:
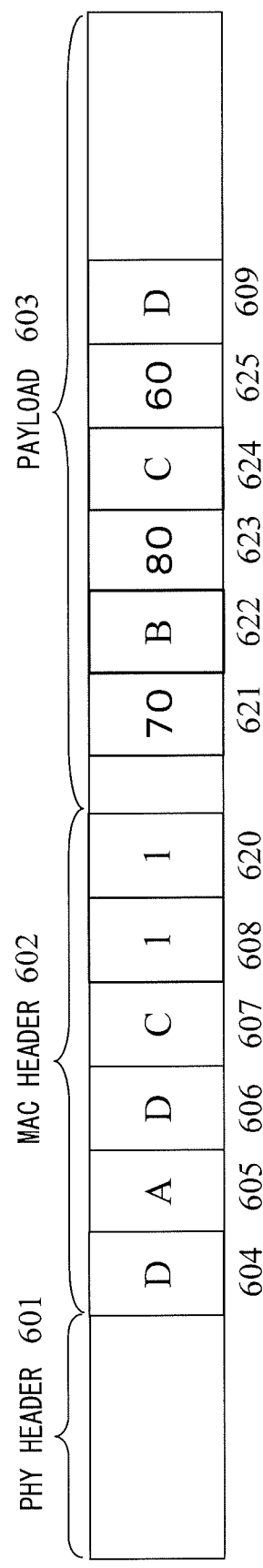
FIG. 6D is a figure representing one specific example of the packet for route estimation (route estimation reply) used in embodiment 1 of the present invention.

When the route estimation packet is used as a reply packet, it will be called a route estimation reply. FIG. 6C is a figure showing a packet format of the route estimation reply. In FIG. 6C, the format of the route estimation reply has a configuration that is similar to that of the route reply shown in FIG. 5C. Information stored in the route estimation reply is also similar to that of the route reply shown in FIG. 5C. Here, a state of the bandwidth indicated in the link information between the transmission terminal A101 and the relay terminal B102 is 70 Mbps, a state of the bandwidth indicated in the link information between the relay terminal B102 and the relay terminal C103 is 80 Mbps, and a state of the bandwidth indicated in the link information between the relay terminal C103 and the reception terminal D104 is 60 Mbps.

Since the route search packet is transmitted through broadcast, the link information has to be appended to the route search packet when the route search packet is received by a relay terminal which is a relay destination. On the other hand, since the route estimation packet is transmitted/received through unicast in both directions, the link information may be appended to the route estimation packet by a relay terminal which may be either a relay source or a relay destination. For example, if the link information is about an amount of power loss during a transmission from the transmission terminal A101 to the relay terminal B102, the relay terminal B102 that has received the route estimation request appends the link information. However, if the link information is information regarding which modulation method is used for a transmission from the transmission terminal A101 to the relay terminal B102, the transmission terminal A101 may append the link information upon receiving the route estimation reply.

Figure 7:
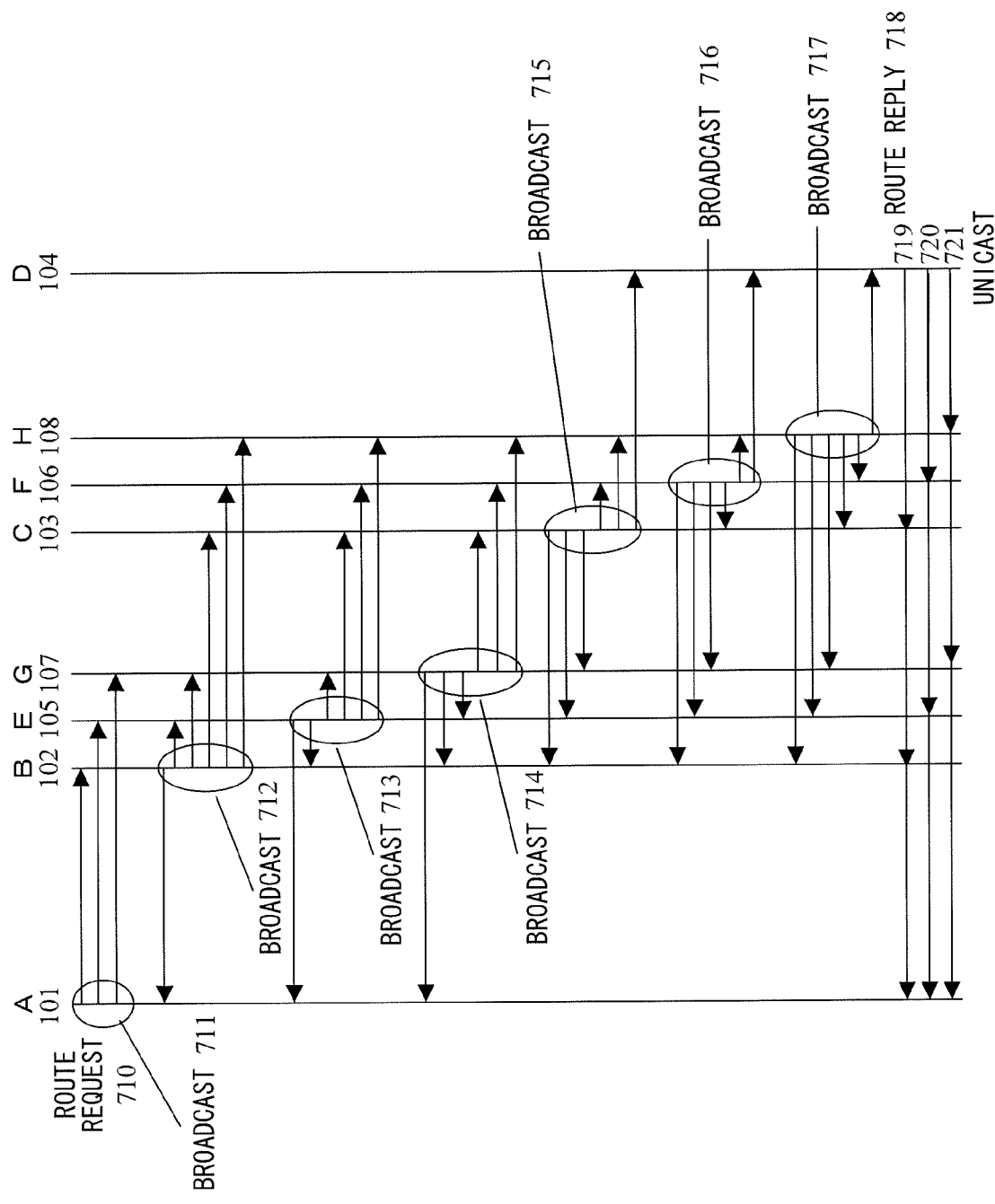
FIG. 7 is a sequence diagram when a route is being searched at a communication terminal according to embodiment 1 of the present invention.

FIG. 7 is a sequence diagram when a route search is conducted in embodiment 1 of the present invention. The route search is about finding out a route that has the finest state among a very large number of routes made by using links shown in FIG. 2. For an ad-hoc network, there are various methods to compare states of routes. However, in this embodiment, the bandwidth of a route is calculated by using the following formula, and the reception terminal D104 returns a route reply to a route that had the highest calculated value. Here, R1, R2, R3, . . . represents the bandwidth of each route.

[Math. 1]

$$R = \frac{1}{\frac{1}{R1} + \frac{1}{R2} + \frac{1}{R3} \dots} \quad \text{formula (1)}$$

First, the transmission terminal A101 transmits a route request 710 where a final destination therein is configured as the reception terminal D104, in a broadcast packet 711. The relay terminal B102, a relay terminal E105, and a relay terminal G107, which have received the broadcast packet 711, respectively appends each link information, and respectively transmit broadcast packets 712, 713, and 714. Here, although the broadcast packet 712 transmitted by the relay terminal E105 also arrives at the relay terminal B102, the relay terminal B102 does not conduct a relay transmission. This is because, in a case where the communication terminal D104 is the final destination, a route of transmission terminal A101→relay terminal E105→relay terminal B102 is not a route that has a fine state when compared to a route of transmission terminal A101→relay terminal B102 by using formula (1). A similar rule applies to the following packets. Such a way of control is effective in suppressing an occupation of the bandwidth caused by transmission of needless control packets.

Each of, the relay terminal C103, a relay terminal F106, and a relay terminal H108, which respectively received the broadcast packets 712, 713, and 714, appends respective link information thereto, and respectively transmits broadcast packets 715, 716, and 717. The reception terminal D104 that has received the broadcast packets 715, 716, and 717, does not conduct further relay transmissions. This is because the reception terminal D104 is the final destination terminal. By using the information of all the received route request packets, the reception terminal D104 calculates a route having a fine state (i.e., a route having a high value with respect to formula (1)), and responds to the transmission terminal A101 with a route reply 719 via the calculated route. The number of the responses in a form of route replies can be arbitrary configurable according to the network scale. The number of the responses is preferably configured such that a route having the finest state, among the very large number of routes that exist between the transmission source and the destination, is included in the route sent back in the route reply in any situation.

In the present embodiment, a route reply 718 is sent back in three unicast packets 719, 720, and 721. Each of the route replies is transmitted in a sequential relay of: a route of reception terminal D104→relay terminal C103→relay terminal B102→transmission terminal A101, which is a route opposite to the route searched between transmission terminal A101→reception terminal D104; a route of reception terminal D104→relay terminal F106→relay terminal E105→transmission terminal A101; or a route of reception terminal D104→relay terminal H108→relay terminal G107→transmission terminal A101. An operation of a data relay function at each terminal is initiated as a result of the route reply.

Figure 8:
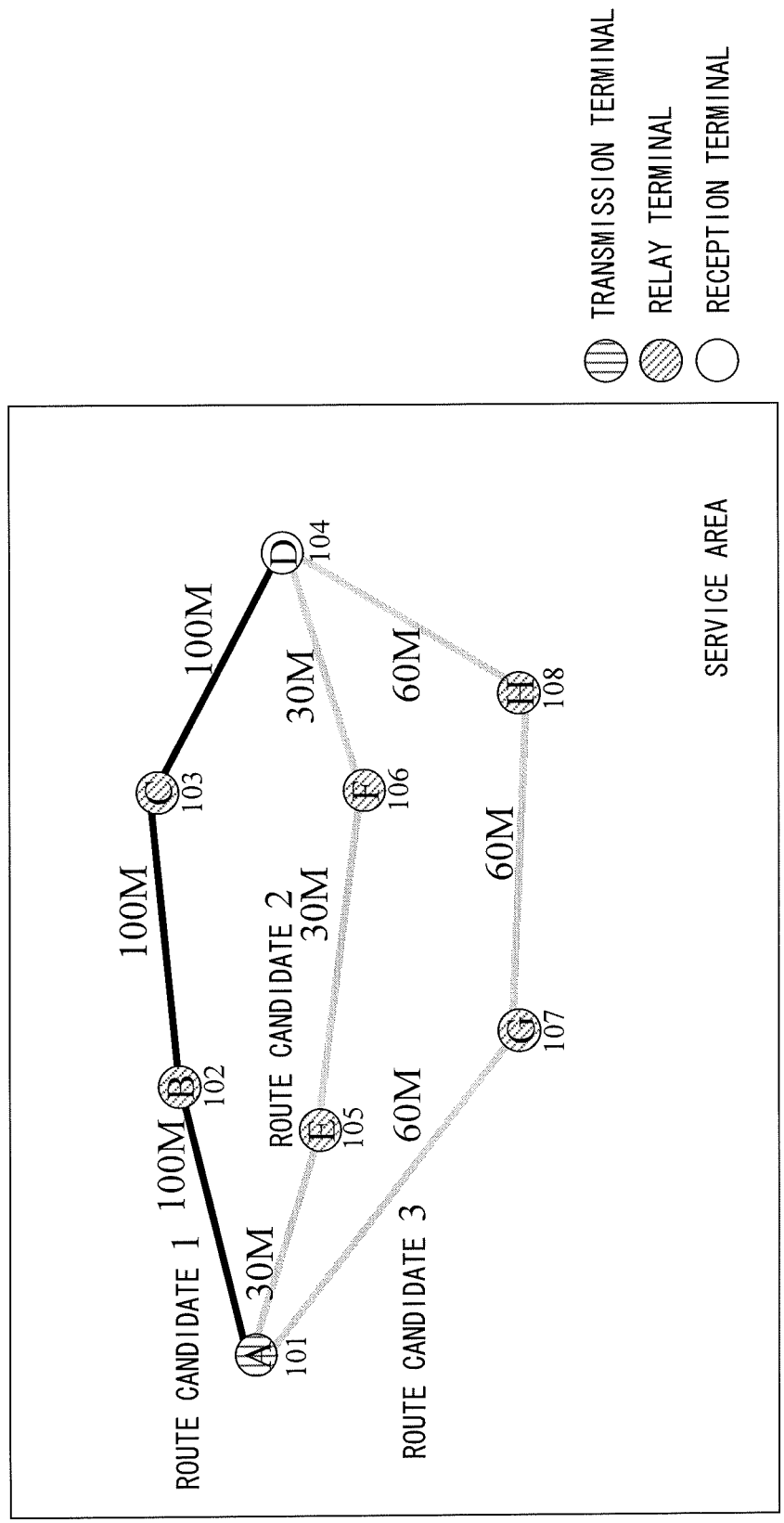
FIG. 8 is a figure showing a form of a network after the end of route search/configuration conducted using the route request/route reply.

FIG. 8 is a network diagram when search/configuration of a route is finished by the route request/route reply. In FIG. 8, a route candidate 1 is a route of transmission terminal A101→relay terminal B102→relay terminal C103→reception terminal D104. A route candidate 2 is a route of transmission terminal A101→relay terminal E105→relay terminal F106→reception terminal D104. A route candidate 3 is a route of transmission terminal A101→relay terminal G107→relay terminal H108→reception terminal D104. Furthermore, 100 Mbps between the transmission terminal A101 and the relay terminal B102 of the route candidate 1 indicates link information between the transmission terminal A101 and the relay terminal B102. Additionally, 100 Mbps between the relay terminal B102 and the relay terminal C103 indicates link information between the relay terminal B102 and the relay terminal C103. Still further, 100 Mbps between the relay terminal C103 and the reception terminal D104 indicates link information between the relay terminal C103 and the reception terminal D104. The same can be said for the route candidate 2 and the route candidate 3. If each of the link information is applied in formula (1), the bandwidth of each of the routes will be 33 Mbps for the route candidate 1, 10 Mbps for the route candidate 2, and 20 Mbps for the route candidate 3. Next, the route compare section 408 in the transmission terminal A101 mutually compares the bandwidths of the route candidate 1, the route candidate 2, and the route candidate 3. Then, the route selection section 402 selects the route candidate 1 as a route to the final destination D based on a comparison result.

Figure 9:
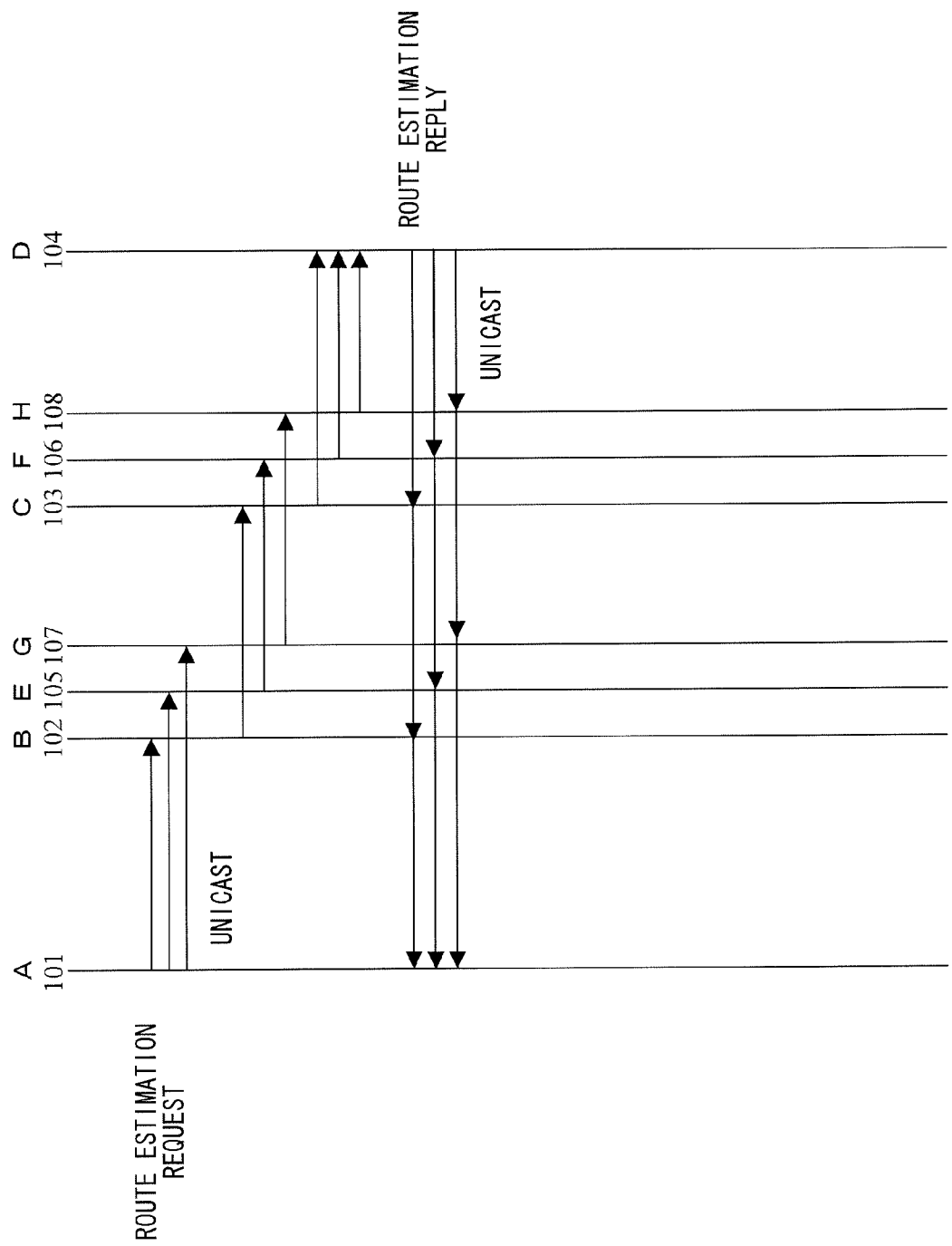
FIG. 9 is a sequence diagram when a route is being estimated at the communication terminal according to embodiment 1.

FIG. 9 is a sequence diagram when the route estimation is conducted for each of the route candidates shown in FIG. 8. In FIG. 9, the route estimation request is transmitted to each of the route candidates by using source routing. Thus, the route estimation request is transmitted from the transmission terminal A101 to the reception terminal D104 via not only the route candidate 1 that is configured from the transmission terminal A101 to the reception terminal D104, but also via the route candidate 2 and the route candidate 3. The unicast packet transmitted from each terminal has a bandwidth consumption that is extremely small when compared to the broadcast packet. By combining both the route search that uses the broadcast packet and the route estimation that uses the unicast packet, the transmission terminal A can suppress the bandwidth consumption and acquire a route having the finest state depending on a change in the situation. Furthermore, although the route estimation is periodically conducted for all route candidates in the present embodiment, the timing to conduct the route estimation, and on which route the route estimation is conducted can be changed depending on the situation.

Figure 10:
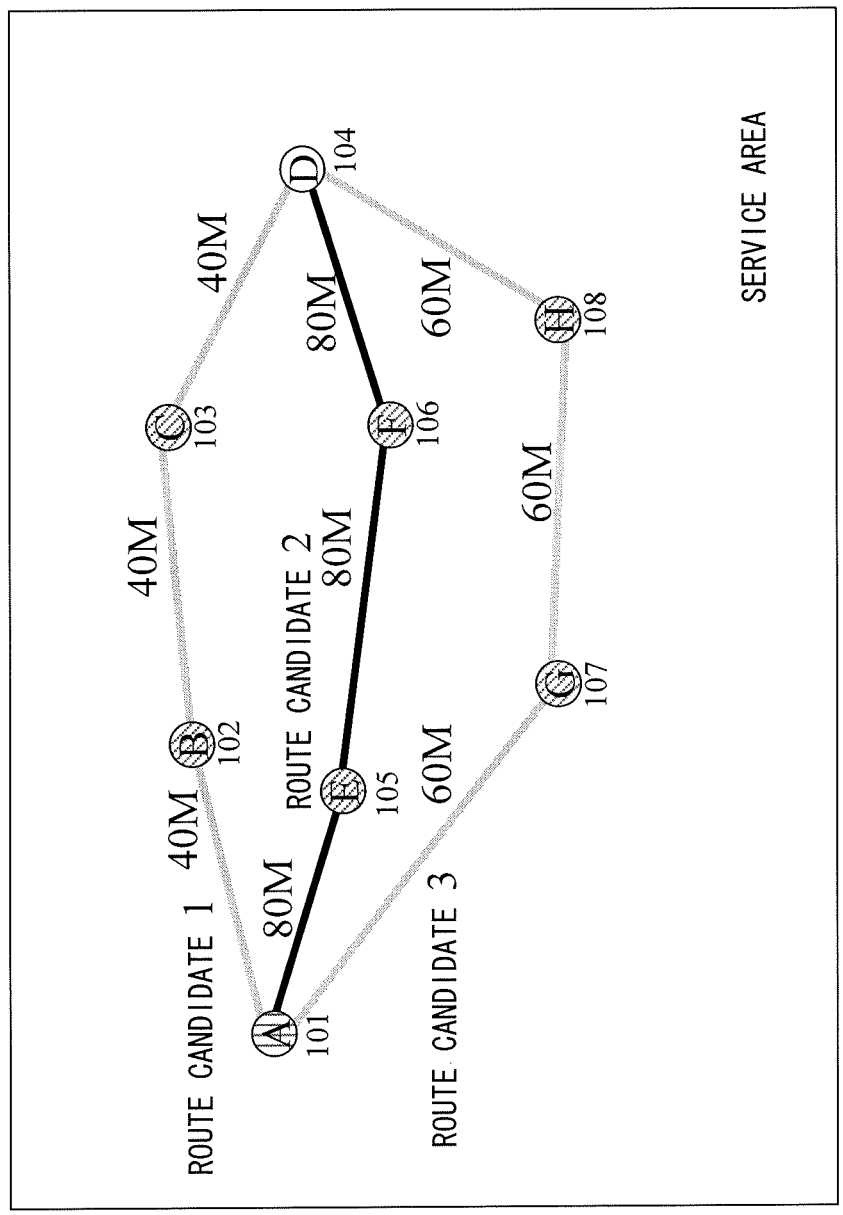
FIG. 10 is a figure showing a state of the network after a route estimation at time T1 at the communication terminal according to embodiment 1.
Figure 11:
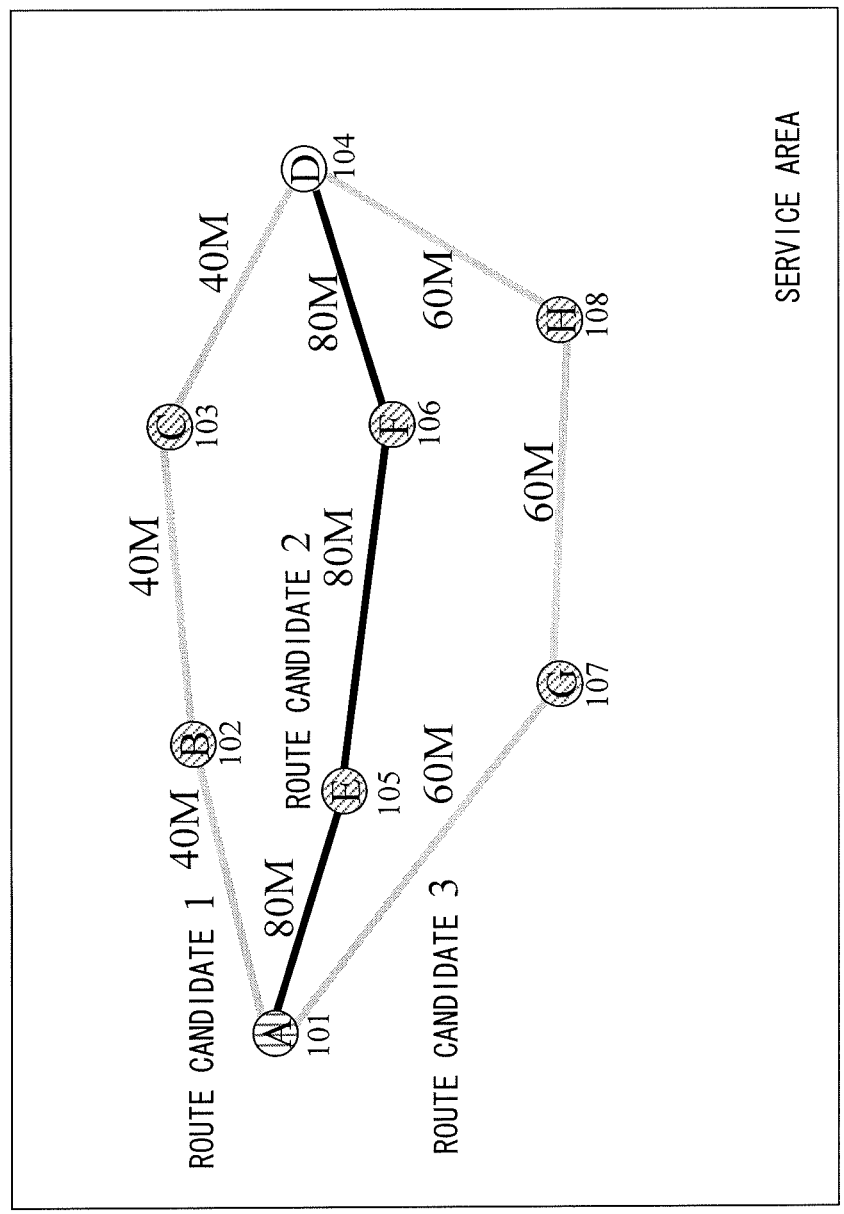
FIG. 11 is a figure showing a state of the network after a route estimation at time T2 at the communication terminal according to embodiment 1.
Figure 12:
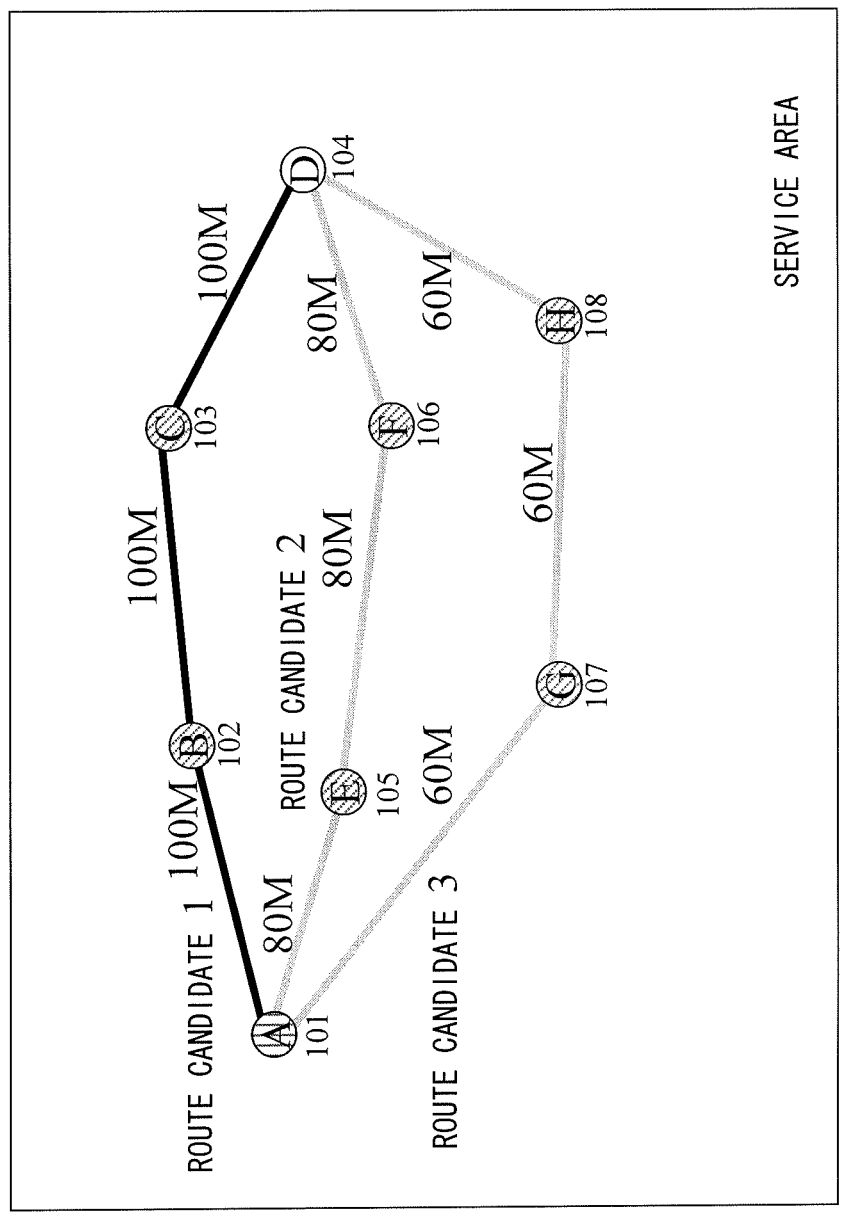
FIG. 12 is a figure showing a state of the network after a route estimation at time T3 at the communication terminal according to embodiment 1.

FIGS. 10-12 are state transition diagrams representing results obtained by periodical route estimations. FIG. 10 shows a result of conducting the first route estimation at a state resulting from elapsing of time T1 since an initiation of the communication. FIG. 11 shows a result of conducting the second route estimation at a state resulting from elapsing of time T2 since the initiation of the communication. FIG. 12 shows a result of conducting the third route estimation at a state resulting from elapsing of time T3 since the initiation of the communication. FIGS. 10-12 show examples in which priorities of the route candidates regarding the bandwidth are determined. Since the premise of the present embodiment is a usage in a PLC, even when the communication terminal is not mobile, a fluctuation of the bandwidth can occur when a power supply to a home electric appliance and the like is turned ON. A similar situation can occur even if the premise is a usage in wireless communication, when an ad-hoc network is form by communication terminals that have small mobility and when a shielding object emerges between communication terminals.

In FIG. 10, at time T1, when compared with the time when the route candidates have been searched (FIG. 8), the bandwidth of each link of the route candidate 1 has been degraded from 100 Mbps to 40 Mbps. In addition, the bandwidth of each link of the route candidate 2 has increased from 30 Mbps to 80 Mbps, while there is no change in the bandwidth of each link of the route candidate 3. An estimation result indicates that the bandwidths of each of the routes will be 13 Mbps for the route candidate 1, 27 Mbps for the route candidate 2 and 20 Mbps for the route candidate 3. Therefore, at time T1, the transmission terminal A101 selects the route candidate 2 and conducts the transmission.

In FIG. 11, at time T2, the estimation result has not been changed from time T1 (FIG. 10). Therefore, the transmission terminal A101 continuously selects the route candidate 2. In FIG. 12, at time T3, the bandwidth of each link of the route candidate 1 has returned from 40 Mbps to 100 Mbps, while there are no changes to the bandwidths of each link of the route candidate 2 and the route candidate 3 when compared to time T2. In this case, the bandwidths of each of the routes will be 33 Mbps for the route candidate 1, 27 Mbps for the route candidate 2, and 20 Mbps for the route candidate 3. Therefore, at time T3, the transmission terminal A101 selects the route candidate 1.

Figure 13:
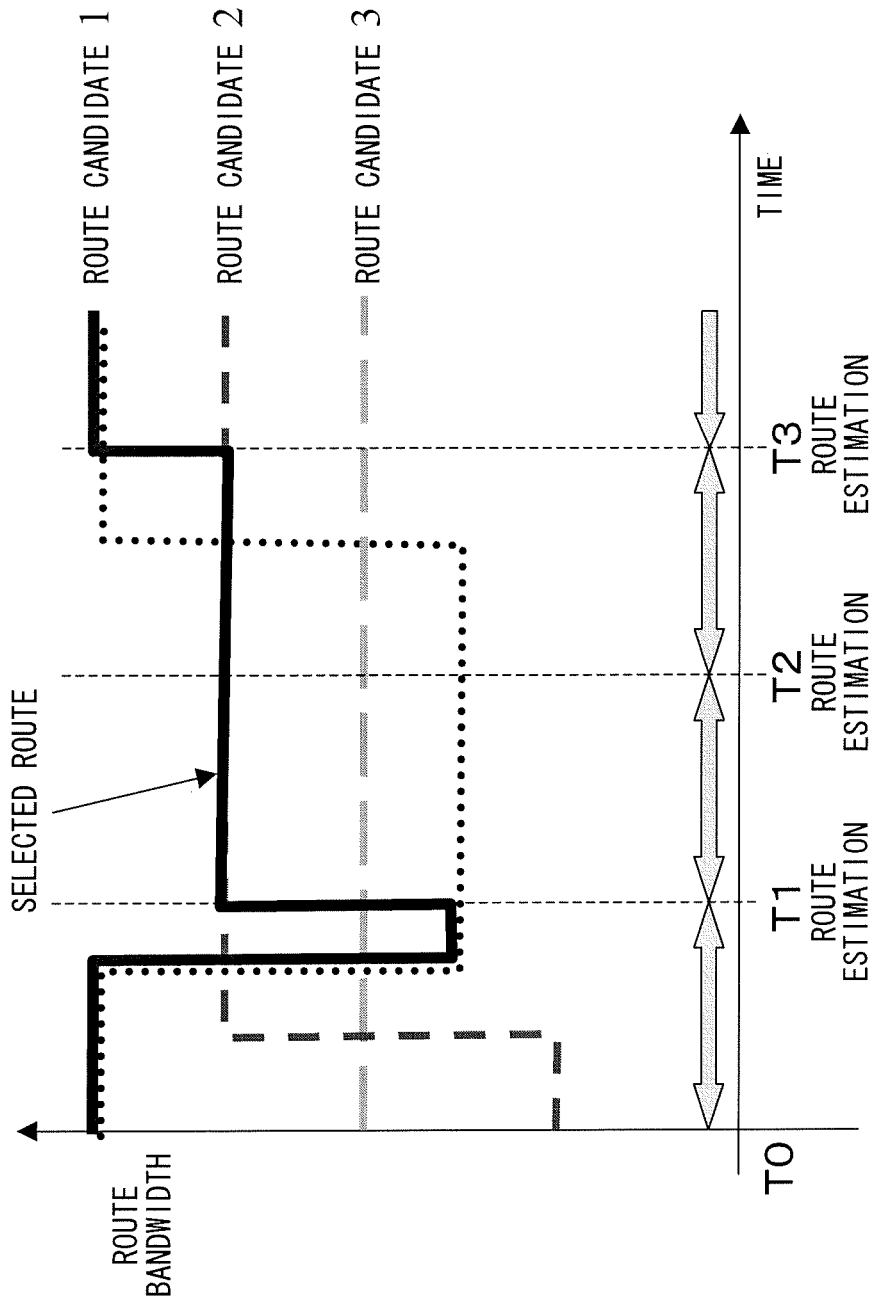
FIG. 13 is a route selection diagram of the communication terminal according to embodiment 1.

FIG. 13 is a route selection diagram representing a relationship between selected routes and bandwidth fluctuations of each of the route candidates 1 to 3 shown in FIG. 10 to FIG. 12. In FIG. 13, the bandwidth of the route candidate 1 and the bandwidth of the route candidate 2 have fluctuated between time T0 (i.e., when the routes were searched) and time T1. If the route search is conducted only when the communication is initiated, the route candidate 1 will be continuously used throughout the communication period. However, in the present embodiment, as a result of having the route estimation being conducted at time T1 which is during the communication, the selected route has been switched to the route candidate 2 which is a route having a fine state. In addition, the bandwidth of the route candidate 1 has fluctuated between time T2 and time T3. Even with such a change of the situation, the selected route is successfully restored to the route candidate 1 which is a route that has a finer state.

In a conventional protocol, when a route is disconnected, a route search is conducted once again in order to configure a new route. Thus, it is not possible to select a new route until a route is disconnected. Furthermore, in another conventional protocol, when the bandwidth of a route becomes lower than a threshold, the route has been switched to a second candidate route acquired by a route search conducted in advance. Thus, it is not possible to select a route that has the finest state at that moment. The reason why these protocols are conducted in such manners is to avoid conducting a route search as much as possible, since the route search is conducted by a continuous broadcasting (flooding), and will occupy a great amount of the bandwidth, resulting in a strain placed on the bandwidth originally intended to transmit data. On the other hand, in the present embodiment, it is possible to acquire a route having the finest state while avoiding an occupation of the bandwidth with a control packet, by transmitting a unicast packet through several route candidates.

Figure 14:
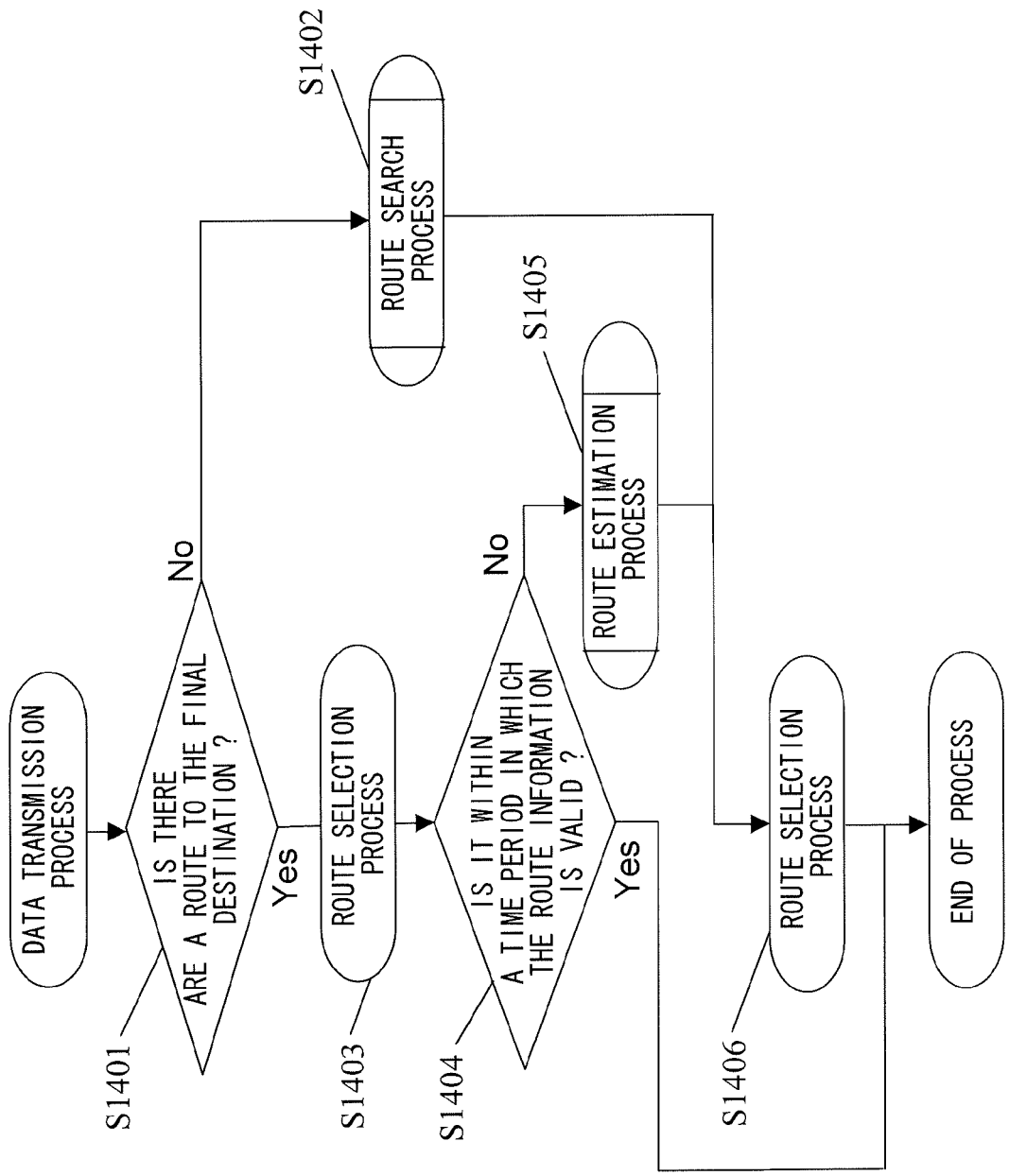
FIG. 14 is a flowchart representing a data transmission process at the communication terminal according to embodiment 1.

FIG. 14 is a figure showing a flowchart of a route selection process at the time of a data transmission conducted by a terminal device (the transmission terminal A101) according to embodiment 1 of the present invention. Referring to FIG. 14, the transmission terminal A101 refers the route candidate retain section 404, and confirms the presence or absence of a route to the final destination of the transmission packet (step S1401). When the route to the final destination of the transmission packet is not configured, the transmission terminal A101 conducts a route search process (step S1402). Details of the route search process will be described later. Next, the transmission terminal A101 conducts a route selection process, selects the optimum route based on the bandwidth information or the delay information (step S1406), and ends the process.

On the other hand, if it is confirmed that the route to the final destination of the transmission packet is configured, the transmission terminal A101 conducts a route selection process, and selects the optimum route based on the bandwidth information or the delay information (step S1403). Next, the transmission terminal A101 confirms whether or not the route is selected before elapsing of an expiration time period (i.e., timer T) (step S1404). If it is before elapsing of the expiration period (timer T), the transmission terminal A101 ends the process. On the other hand, if it is after elapsing of the expiration period (timer T), the transmission terminal A101 determines that the currently selected route is invalid, and executes a route estimation process (step S1405). Details of the route estimation process will be described later. Next, based on the estimated route, the transmission terminal A101 conducts a route selection process again, selects the optimum route (step S1406), and ends the process.

Figure 15:
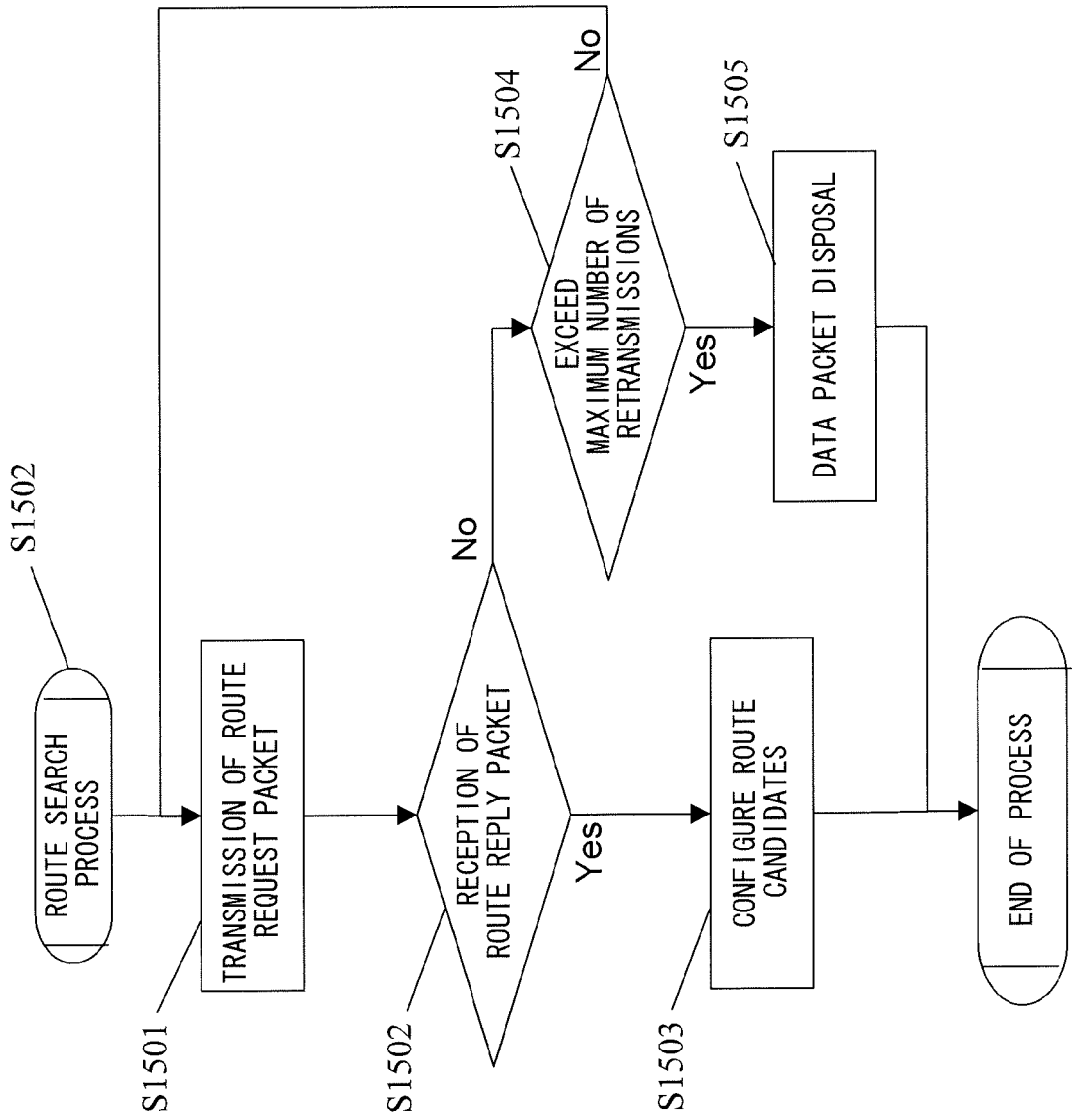
FIG. 15 is a flowchart representing a route search process at the communication terminal according to embodiment 1.

Details of the route search process will be described next. FIG. 15 is a flowchart for describing the details of the route search process at step S1402 in FIG. 14. Referring to FIG. 7 and FIG. 15, the transmission terminal A101 initiates the route search by transmitting the route request 710 through broadcast (step S1501). When a route reply packet 720 is received from the reception terminal D104 which is a final destination terminal within a predetermined time period (step S1502), the transmission terminal A101 configures route candidates based on information described in the route reply packet 720 (step S1503).

On the other hand, when the route reply packet 720 is not received, the transmission terminal A101 conducts a retransmission of the route request packet 710. The transmission terminal A101 repeatedly conducts the retransmission, and if the route reply packet 720 is not received even when the number of retransmissions conducted exceeds a maximum number of retransmissions (step S1504), disposes the data packet (step S1505). The transmission terminal A101 may continue disposing data packets that are destined to the same final destination for a certain period of time. This allows preventing a continuous route search process to be conducted for a final destination for which a route cannot be found, and preventing an increase of a bandwidth occupation rate of the route request packet 710.

Figure 16:
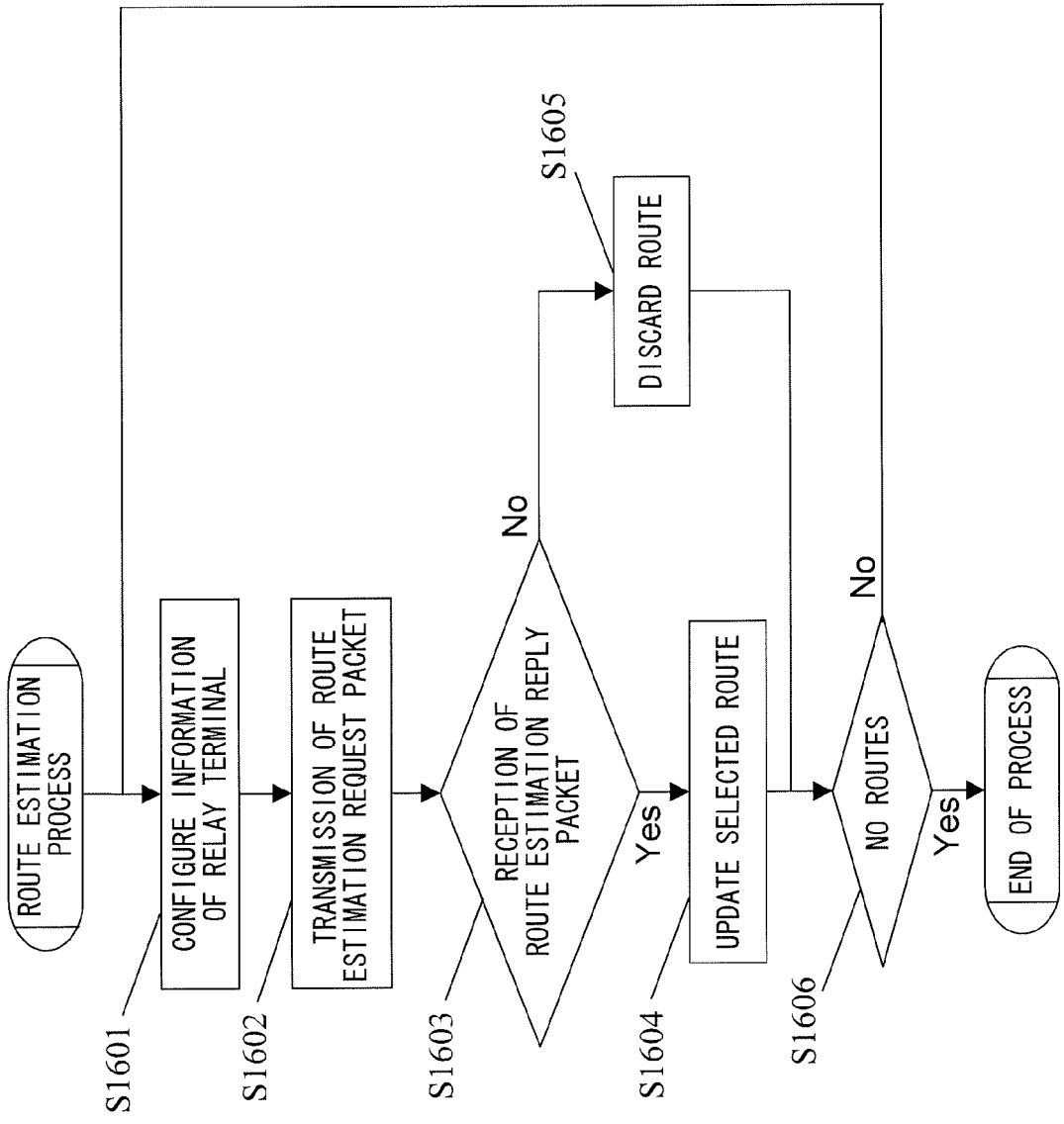
FIG. 16 is a flowchart representing a route estimation process at the communication terminal according to embodiment 1.

Details of the route estimation process will be described next. FIG. 16 is a flowchart for describing details of the route estimation process at step S1405 in FIG. 14. Referring to FIG. 16, the transmission terminal A101 determines that the currently selected route is invalid when the time in the timer T set by the route search/estimation scheduler 403 elapses, and conducts a re-estimation of the route. For the route candidates 1 to 3 that lead to the reception terminal D104 which is the final destination terminal, the transmission terminal A101 configures information regarding relay terminals in each of the routes (step S1601), and transmits a route estimation request packet through unicast (step S1602). If the route estimation reply packet is received (step S1603), the transmission terminal A101 selects a route having the finest state at that time among the route candidates 1 to 3, and updates the selected route (step S1604).

On the other hand, if the route estimation reply packet is not received, the transmission terminal A101 judges that the route has become incapable of communication and discards the route (step S1605). For example, if a route estimation reply packet in response to a route estimation request packet transmitted by using the route candidate 2 could not be received, the transmission terminal A101 discards the route candidate 2. If there are no more routes to the final destination as a result (step S1606), the route estimation process is ended and a route search process is conducted (step S1402 in FIG. 14). Having no more routes includes having only a route with an extremely deteriorate state after an update of the selected route. As long as a route exists, the transmission terminal A101 repeatedly conducts a similar process every time the time set in the timer elapses.

As described above, according to the present embodiment, the transmission terminal A101 broadcasts, prior to a communication of the data packet, the first control packet which is a route request and which is used for creating routes, and selects, in a descending order of the broadness of the bandwidth (or less delay time) and based on a response result of the route request, a predetermined number of routes that lead to the reception terminal D104. Since the route candidates are prepared in advance (e.g., the route candidates 1 to 3), and since, among the route candidates, a route having a fine state is selected for switching, broadcasting the route request used for creating routes can be limited to the one time before the communication, and it is possible to largely reduce the quantity of the control packets occupying the bandwidth. In a PLC, such a control is possible since it is highly likely that the communication state will return to a fine state after elapsing of the predetermined time, even if a communication state of a route temporarily deteriorates due to a large fluctuation of the communication state of the route as a result of a usage situation of the communication terminal.

A similar situation can occur, not only with the PLC, but if the premise is a usage in wireless communications, when an ad-hoc network is formed by communication terminals that have small motilities and when a shielding object emerges between communication terminals. Therefore, the present invention is also useful when applied to a network that uses a wireless communication. On the other hand, it is also useful when applied to a network that has a plurality of routes that have different standards, such as a case where communication through a route is conducted by 11 n wireless LAN standard while communication through another route is conducted by 11 b wireless LAN standard. Alternatively, it is also useful when applied to a network in which one of the routes is formed from a wireless communication while the other route if formed from a PLC.

Additionally, during the communication of the data packet in each predetermined time, the transmission terminal A unicasts increases and decreases of the bandwidth to the second control packet which is the route request packet and which is used to confirm each relay terminal included in the selected predetermined number of routes. With this, since the transmission terminal A unicasts the route request packet that is used to confirm increases and decreases of the bandwidth during the communication of the data packet, it is possible to suppress a usage amount of the control packet to a minimum, and to largely lower the ratio of the control packet occupying the bandwidth.

Furthermore, based on the response result of the route request packet, the transmission terminal A continues the communication of the data packet by switching to a route having the broadest bandwidth among the selected predetermined number of routes. With this, an occurrence of an interruption of the communication can be prevented, since switching to a route having the broadest bandwidth in the predetermined time unit is conducted, instead of continuing to use the route determined at the beginning and re-creating a communication route when the bandwidth is equal to or less than a predetermined threshold. As a result, the possibility of an interruption of the communication can be largely reduced even when used in a PLC in which an interruption of the communication cannot be predicted beforehand.

Embodiment 2

Embodiment 2 of the present invention will be described next. In embodiment 1, a case has been described where all the route candidates branch from the transmission terminal A101 and where the selected route is changed based on the route estimation. In embodiment 2, a case will be described where route candidates branch at a relay terminal and the selected route will be changed based on a bandwidth reduction notification.

FIG. 17 is a network diagram in which route candidates branch at a relay terminal according to embodiment 2 of the present invention. In FIG. 17: the route candidate 1 is transmission terminal A101→relay terminal E105→relay terminal C103→reception terminal D104; the route candidate 2 is transmission terminal A101→relay terminal E105→relay terminal F106→reception terminal D104; the route candidate 3 is transmission terminal A101→relay terminal G107→relay terminal H108→reception terminal D104; and suppose these three route candidates 1 to 3 are configured. Here, when information of every links are applied to formula (1), the bandwidths of each of the routes will be, 33 Mbps for the route candidate 1, 13 Mbps for the route candidate 2, and 20 Mbps for the route candidate 3. Therefore, the transmission terminal A101 selects the route candidate 1 as a route to the reception terminal D104 which is the final destination. In this network, the route branches out to the route candidate 1 and to the route candidate 2 at the relay terminal E105. Such a terminal like the relay terminal E105 which has two or more relay destination addresses for a single final destination terminal is called a route-branching terminal.

At this route-branching terminal, a route estimation request is transmitted to each relay destination. That is, only a single route estimation request for the route from the transmission terminal A101 to the relay terminal E105 is transmitted for the route candidate 1 and the route candidate 2. Furthermore, a single route estimation request for each of the route candidate 1 and the route candidate 2 is transmitted from the relay terminal E105.

Therefore, in the example shown in FIG. 17, a single route estimation request is transmitted from the transmission terminal A101 to the relay terminal E105 for the route candidate 1 and the route candidate 2. On the other hand, a route estimation request is transmitted from the transmission terminal A101 to the relay terminal G107 for the route candidate 3. When the relay terminal E105 receives the route estimation request from the transmission terminal A10, the relay terminal E105 transmits a route estimation request to the relay terminal C103 for the route candidate 1, and transmits a route estimation request to the relay terminal G107 for the route candidate 2.

Since route estimation requests for all the route candidates 1 to 3 arrive at the reception terminal D104 which is the final destination, route estimation replies for, each of the route candidates are sent back. As a result of conducting such an operation, it is possible to reduce the bandwidth consumption by the route estimation request. In a network like the PLC where the bandwidth is influenced by having a power supply of a home electric appliance being turned ON/OFF, it is highly possible that a specific link is overlappingly used by many route candidates, since a link that is likely to be influenced (e.g., in a vicinity of a television or a PC) and a link that is not likely to be influenced (e.g., in a vicinity of a bedroom) are predetermined. Thus, it is conceivable that such a method for bandwidth reduction will be effective.

As described above, when a route branching point of the route candidate 1 and the route candidate 2 is positioned at the relay terminal E105, the relay terminal E105 selects and switches to a route having the broadest bandwidth among the route candidate 1 and the route candidate 2, which go through the branching point. With this, the process of notifying (hereinafter, referred to as the bandwidth reduction notification) the transmission terminal A101, which is the transmission source, about the bandwidth used for the communication of the data packet being equal to or less than the predetermined value can be omitted. Therefore, processes of the system as a whole can be simplified.

Figure 18A:
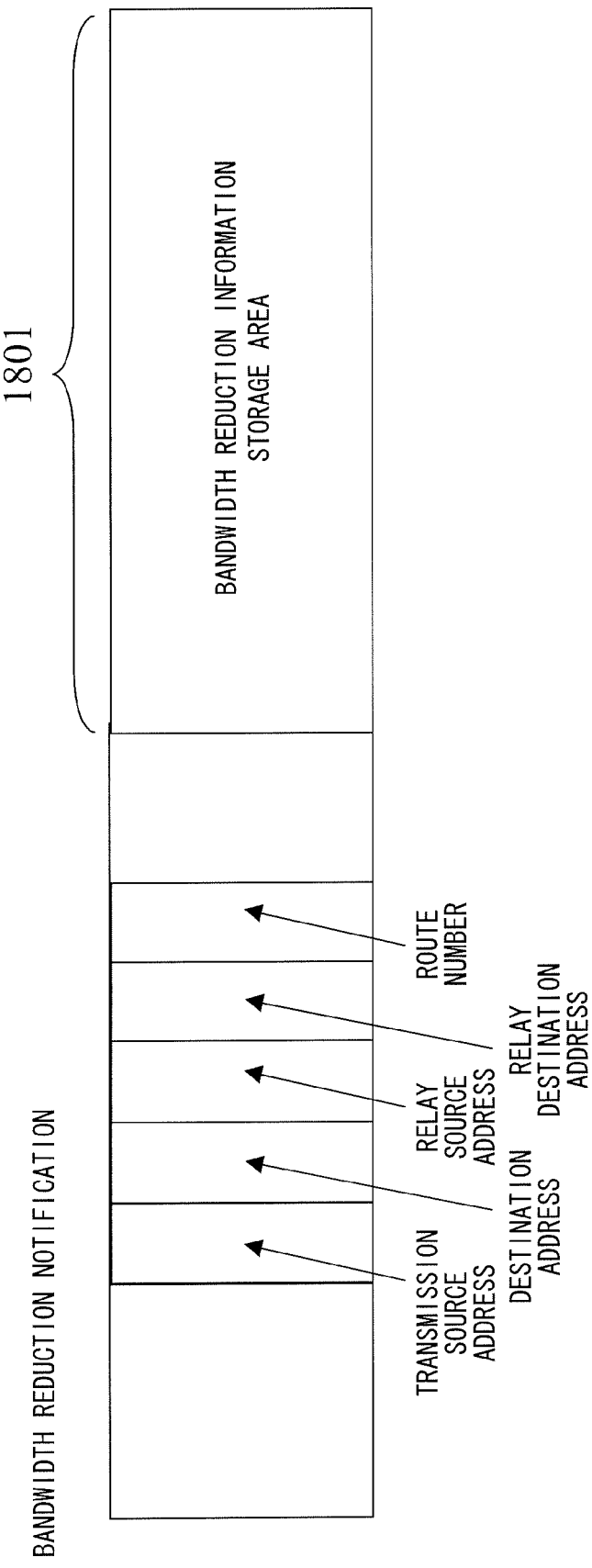
FIG. 18A is a figure representing a format of a bandwidth reduction notification packet used in embodiment 2 of the present invention.

FIG. 18A is a figure representing a packet format of the bandwidth reduction notification. FIG. 18B is a figure showing one specific example of the bandwidth reduction notification packet that is actually transmitted. The bandwidth reduction notification packet is a packet that instructs a change of the route without waiting for the next route estimation, when an extreme reduction of the bandwidth occurs to the route during communication. A change of the route may be conducted at the route-branching terminal (the relay terminal E105 in this example), or at the transmission source terminal (the transmission terminal A101 in this example). The bandwidth reduction notification packet is transmitted to an adjacent communication terminal, for example, when the bandwidth of a link adjacent to each of the communication terminals becomes lower than a predetermined threshold X mbps. Instead, the bandwidth reduction notification packet may be transmitted to an adjacent communication terminal when the bandwidth of a link adjacent to each of the communication terminals becomes equal to or lower than Y % of when the route has been estimated. Or else, the bandwidth reduction notification packet may be transmitted to an adjacent terminal when the bandwidth of a link adjacent to each of the communication terminals deteriorates equal to or beyond a level that is Z Mbps below the original bandwidth.

Referring to FIG. 18A and FIG. 18B, a header of the bandwidth reduction notification packet is identical to that of a normal packet, and a payload part of the bandwidth reduction notification packet stores a bandwidth reduction information 1801. The bandwidth reduction information 1801 includes addresses of the relay terminals and the information of the bandwidth between the terminals. For example, when a link between relay terminal C103—reception terminal D104 becomes 5 Mbps, addresses of the relay terminal C103 and the reception terminal D104, and "5" which is the bandwidth information of the link between the relay terminal C103 and the reception terminal D104, are stored (FIG. 18B). When the bandwidth reduction notification packet is received via the packet reception section 401, each of the communication terminals notifies that information to the route selection section 402, and a selection of the routes will be updated at the route selection section 402.

FIG. 19 is a state transition diagram when the relay terminal C103 in the network shown in FIG. 17 transmits a bandwidth reduction notification 2001. FIG. 19 shows a case where the relay terminal C103 transmits the bandwidth reduction notification 2001 to a relay terminal E106, as a result of the bandwidth of the link between relay terminal C103—reception terminal D104 becoming 5 Mbps which is lower than a threshold of 10 Mbps.

Figure 20:
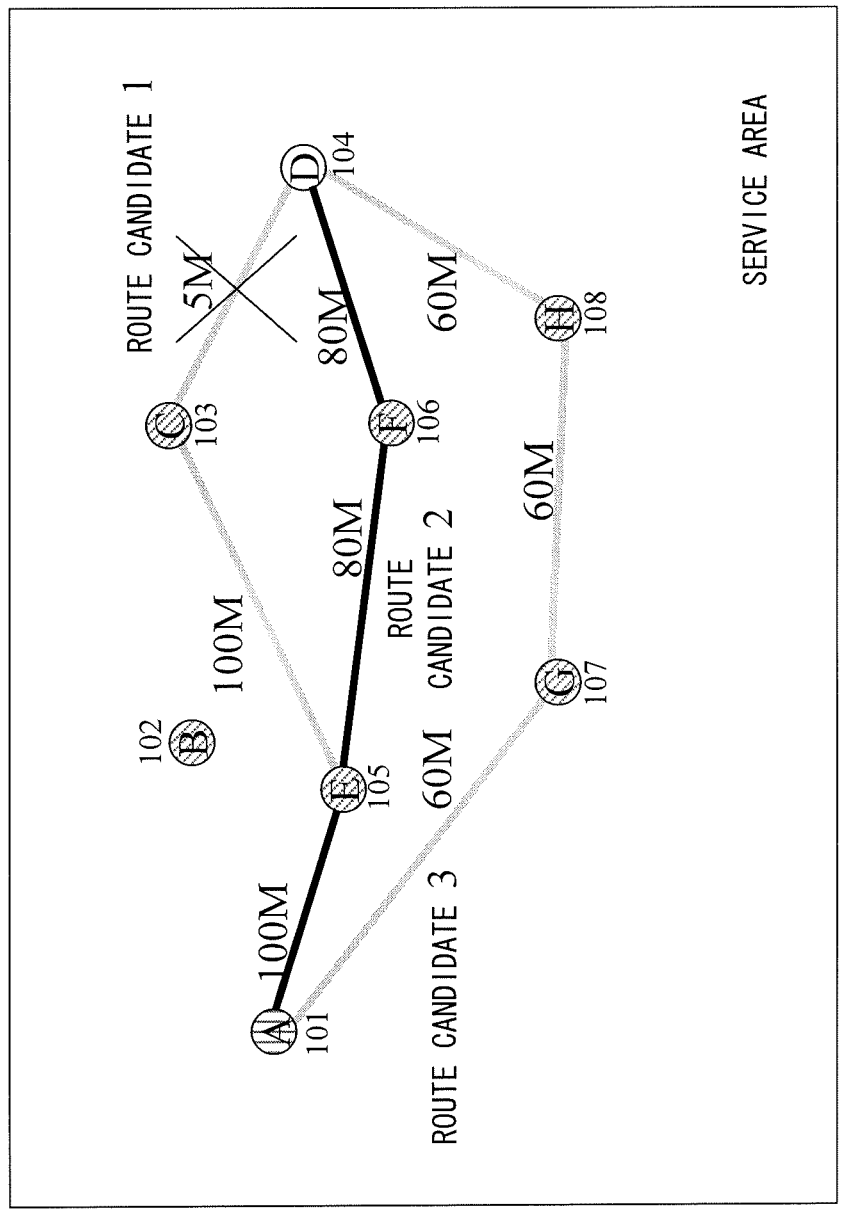
FIG. 20 is a figure showing a state of the network after transmitting the bandwidth reduction notification to the route-branching terminal according to embodiment 2.

FIG. 20 is a state transition diagram when the relay terminal E105 in the network diagram in FIG. 17 receives the bandwidth reduction notification 2001. Here, the relay terminal E105 is a route-branching terminal. FIG. 20 shows a case where the route-branching terminal E105 that has received the bandwidth reduction notification 2001 conducts the route estimation. The bandwidth of a route of the route candidate 1 from the relay terminal E105 to the reception terminal D104 is 4.8 Mbps. On the other hand, the bandwidth of a route of the route candidate 2 from the relay terminal E105 to the reception terminal D104 is 40 Mbps. Therefore, the relay terminal E105 selects the route candidate 2 which has a broader bandwidth. Furthermore, if the relay terminal E105 which is a route-branching terminal conducts a route selection from among its own branching routes, the bandwidth reduction notification does not have to be relayed to the transmission terminal A101.

Figure 21:
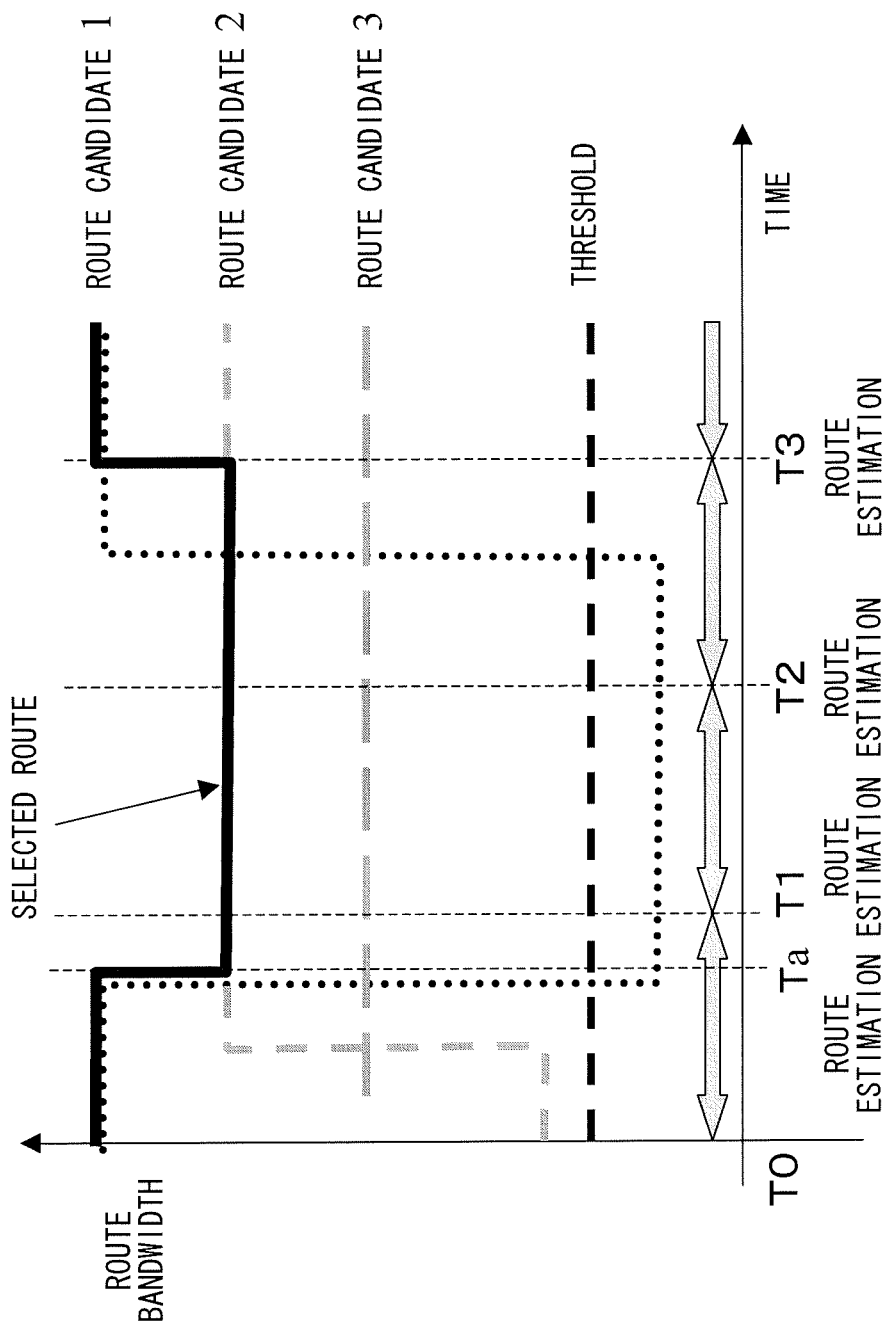
FIG. 21 is a route selection diagram when the bandwidth reduction notification is transmitted to the route-branching terminal according to embodiment 2.

FIG. 21 is a route selection diagram of situations represented in FIG. 19 and FIG. 20. It is obvious in FIG. 21 that, when the bandwidth of the currently selected route 1 becomes lower than the threshold, at this timing (Ta) of becoming lower than the threshold, a route estimation which is other than the route estimation conducted periodically (timing of T1, T2, and T3) is conducted, and a switching of the routes is conducted. In the example described above, the relay terminal E105 receives the bandwidth reduction notification, and switches the route from the route candidate 1 to the route candidate 2. As a result, it is possible to avoid a temporary degradation of the bandwidth that occurs when the bandwidth deteriorates extremely.

As described above, each of the communication terminals notifies the transmission terminal of an instance of the bandwidth between adjacent communication terminals becoming equal to or less than a predetermined value, when the instance occurs. With this, the transmission terminal and the route-branching terminal can instantaneously judge that the bandwidth of the selected route used for the communication of the data packet has become equal to or less than a predetermined threshold. Therefore, the transmission terminal and the route-branching terminal can switch to the route having the next broadest bandwidth among the selected route candidates, when the bandwidth of the selected route used for the communication of the data packet has become equal to or less than a predetermined threshold. As a result, interruptions of the communication can be eliminated.

Figure 22:
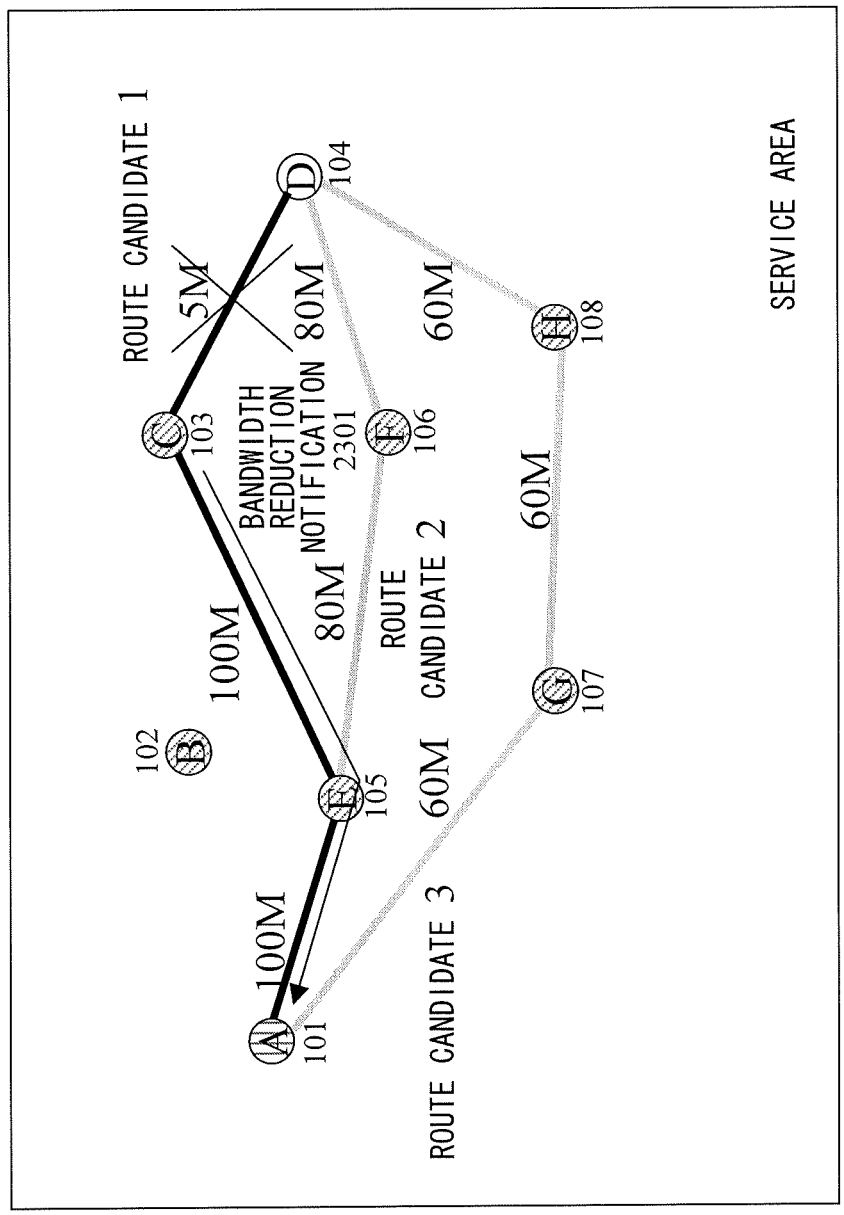
FIG. 22 is a figure showing a state of the network at the time of transmitting the bandwidth reduction notification to a transmission terminal according to embodiment 2.

FIG. 22 is a state transition diagram representing a case where, in the network diagram shown in FIG. 17, in response to a reduction of the bandwidth between the relay terminal C103 and the reception terminal D104, the relay terminal C103 transmits the bandwidth reduction notification 2001 to the relay terminal E105, and the relay terminal E105 transmits the bandwidth reduction notification 2001 to the transmission terminal A101. In FIG. 22, when the route estimation is conducted by the transmission terminal A101, unlike the case in FIG. 20 where the route estimation is conducted by the relay terminal E105 which is the route-branching terminal, the bandwidths of each of the route will be, 4.5 Mbps for the route candidate 1, 28.5 Mbps for the route candidate 2, and 20 Mbps for the route candidate 3. Therefore, the transmission terminal A101 selects the route candidate 2 which has the broadest bandwidth. A route selection diagram of this case will be similarly to that in FIG. 21.

Figure 23:
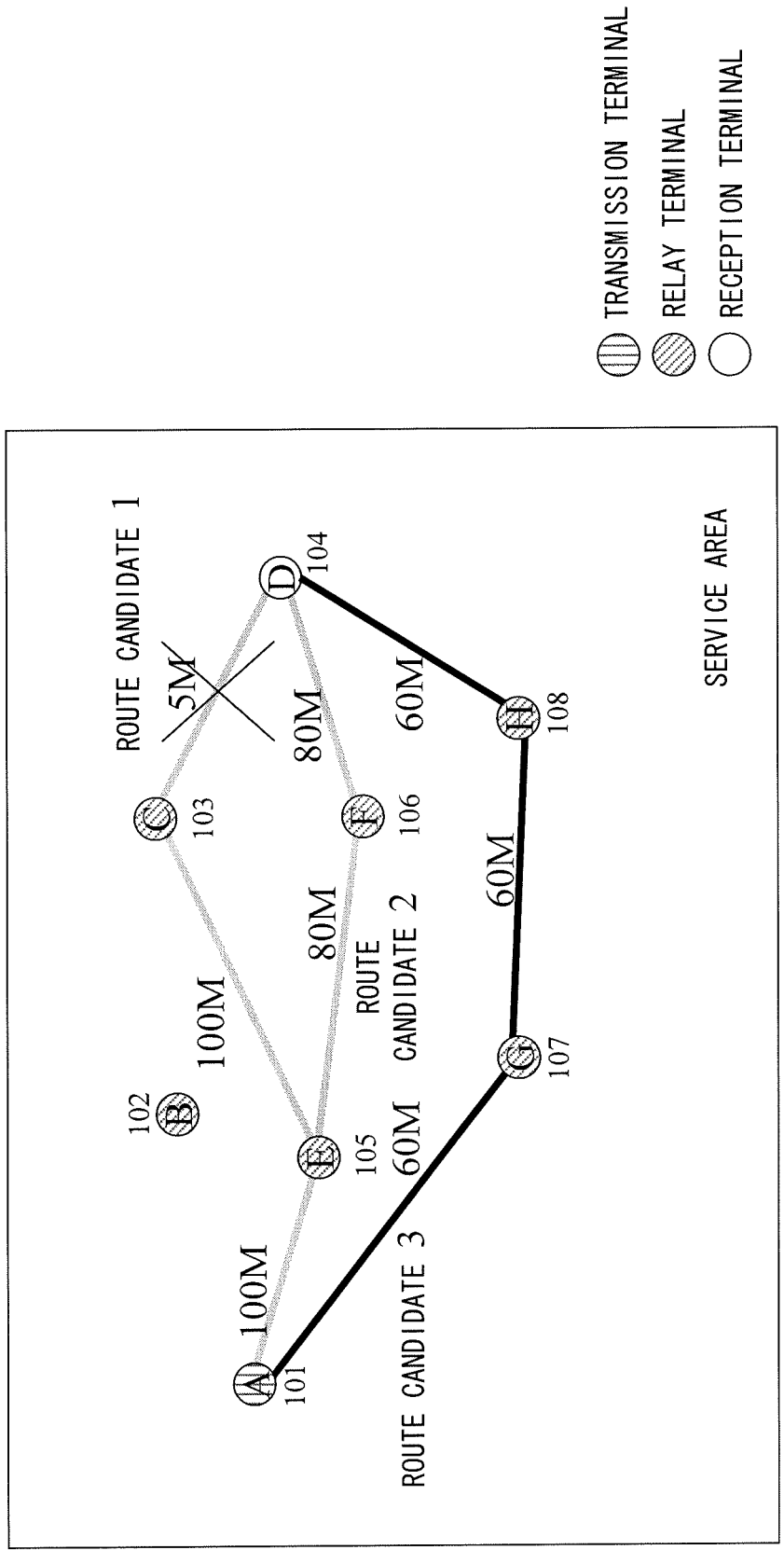
FIG. 23 is a figure showing a state of the network after transmitting the bandwidth reduction notification to the transmission terminal according to embodiment 2.

FIG. 23 is a state transition diagram representing a case where the transmission terminal A101 conducts a route selection without conducting a bandwidth estimation, after the bandwidth reduction notification 2001 is relayed to the transmission terminal A101. In FIG. 23, among the routes acquired in the previous route search/estimation without having a bandwidth estimation being conducted, the transmission terminal A101 selects, for example, the route candidate 3 which has the second finest bandwidth. Among data communications, there are communications that are better conducted in a bandwidth that is as broad as possible (e.g., file-transfer), and there are communications that are not desired to have an interruption of the communication even for just a moment, even if it means to sacrifice the broadness of the bandwidth to a certain degree (e.g., motion picture). When the route estimation is conducted, if the route (the route candidate 1) through which the bandwidth reduction notification 2001 has been sent is continuously used during a time period between when the route estimation packet is transmitted and when the route estimation packet is sent back, a degradation of the route occurs, even though it is for just a moment. If the communication is a communication that cannot allow such a degradation (e.g., the case of a motion picture), the second finest route can be selected without conducting a route estimation. With this, interruption of the communication can be prevented.

The transmission terminal A101 may use the second finest route while the route estimation packet is transmitted and the route reply packet is sent back. Since the route estimation request is a unicast packet unlike the route request which is transmitted by means of flooding, the route estimation request will not be an obstacle to a motion picture packet if the priorities are adjusted.

Figure 24:
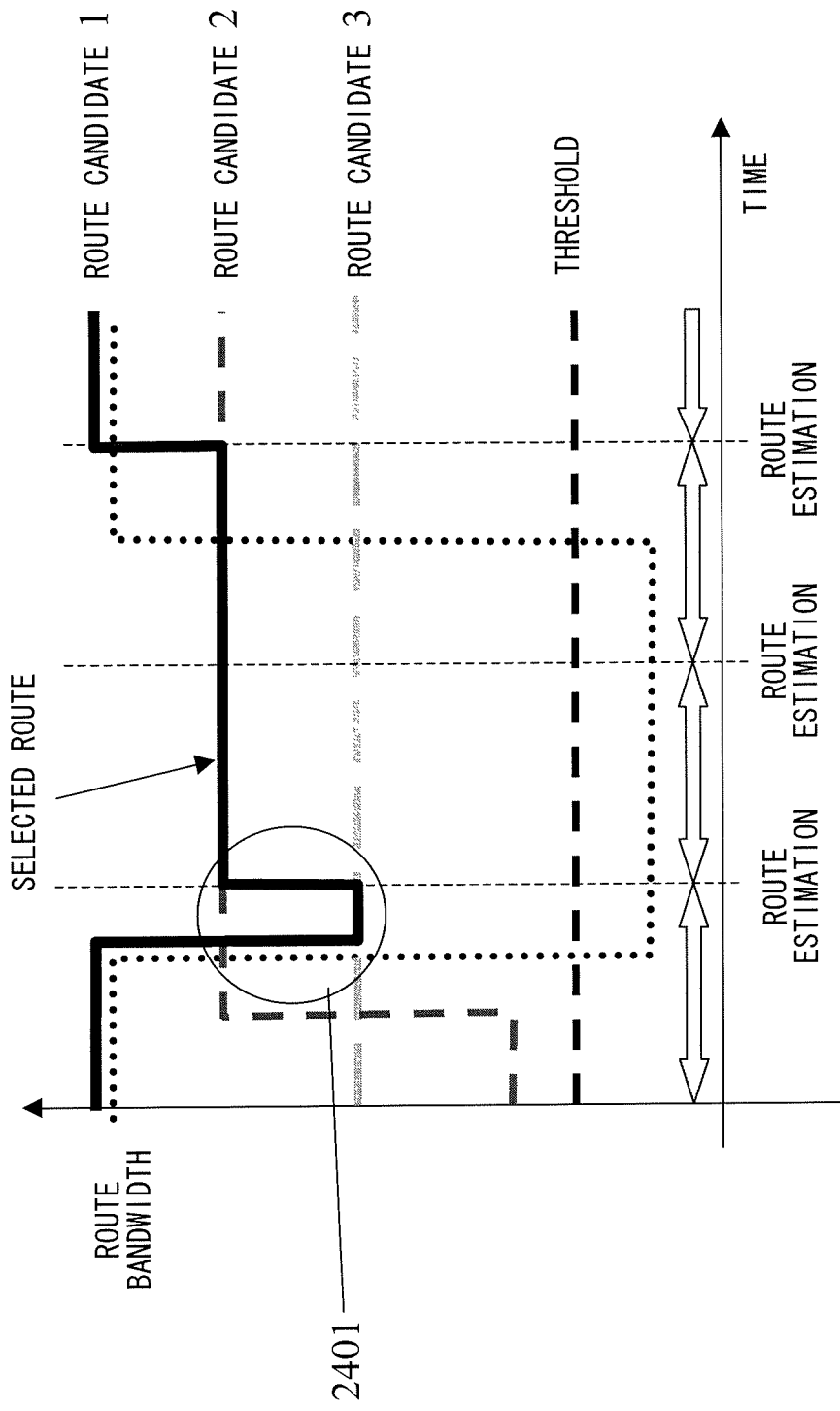
FIG. 24 is a route selection diagram when the bandwidth reduction notification is transmitted to the transmission terminal according to embodiment 2.

FIG. 24 is a route selection diagram when the route estimation is not conducted in FIG. 23. In FIG. 24, even when the route estimation is not conducted as shown by a reference sign 2401, although there is a temporary period during which a route having the finest route state cannot be selected, it is obvious that a route having the finest route state can be immediately selected by conducting the route estimation. Therefore, it is conceivable that sufficient operations can be conducted even if the route estimation is not conducted in response to a bandwidth reduction notification, if the route estimation period is adjusted.

Thus, even after switching to a route having the next broadest bandwidth among the route candidates during the current route estimation period, the transmission terminal and the route-branching terminal continue the communication by switching to a route having the broadest bandwidth at the next route estimation. Therefore, the quality of the communication can be highly maintained while eliminating interruptions of the communication, since the period of using the route having the second broadest bandwidth can be made shorter than the period of the route estimation.

FIG. 25 is a flowchart representing a process at a relay terminal according to embodiment 2. Referring to FIG. 25, first, each of the relay terminals judges whether a received packet is a route request (step S2501). If it is a route request, an relay terminal address (own terminal address) and link information between adjacent communication terminals are appended to the received route request (step S2502), and the route request is relay-transmitted to the next communication terminal (step S2503). On the other hand, if it is not a route request, each of the relay terminals judges whether the received packet is a route reply (step S2504). If it is a route reply, a route (route number) and route information (link information and the like) are configured by using information included in the route reply (step S2505), and the route reply is relay-transmitted to the next terminal.

Next, if the received packet is not a route reply, each of the relay terminals judges whether the received packet is a route estimation request (step S2506), and the received packet is a route estimation request, the link information is appended to the received packet. Furthermore, if the relay terminal is a route-branching terminal (step S2508), a route estimation process is conducted against each of the routes (step S1504). For example, in the example in FIG. 17, when the relay terminal E105 which is a route-branching terminal receives a route estimation request from the transmission terminal A101, the relay terminal E105 transmits a single route estimation request to each of the route candidate 1 and the route candidate 2, and conducts a route estimation on both the route candidate 1 and the route candidate 2. As shown in FIG. 17, when the relay terminal E105 is positioned at a route branching point of the route candidate 1 and the route candidate 2, the relay terminal E105 can select a route having the broadest bandwidth among the route candidate 1 and the route candidate 2, which go through the branching point, and can switch to the selected route. With this, processes of the system as a whole can be simplified.

On the other hand, if the received packet is not a route estimation request, each of the relay terminals judges whether it is a route estimation reply (step S2509). If it is a route estimation reply, each of the relay terminals updates the link information included in its own terminal (step S2510).

Next, if the received packet is not a route estimation reply, each of the relay terminals judges whether it is a bandwidth reduction notification (step S2511). If the received packet is a bandwidth reduction notification, the received bandwidth reduction notification is relay-transmitted to the transmission terminal side if the terminal itself is not a route-branching terminal (step S2512). On the other hand, if the relay terminal is a route-branching terminal, switching of the route is conducted if a state of another route retained within its own terminal is fine (step S2513: Yes), and the bandwidth reduction notification is discarded (step S2514). Conversely, if the state of the other route is not fine (step S2513: No), the received bandwidth reduction notification is relay-transmitted to the transmission side terminal. As shown above in FIG. 23 and FIG. 24, if the relay terminal E105 selects and switches to the route candidate 2 having the second broadest bandwidth, the process of notifying the transmission terminal A101 about the bandwidth used for the communication of the data packet becoming equal to or less than a predetermined threshold can be omitted. Therefore, processes of the system as a whole can be simplified.

If the received packet is a packet that is other than the above described packets, each of the relay terminals defines the received packet as a data packet that has to be relayed, and judges whether its own terminal has a route to a final destination for the received packet (step S2515). If its own terminal has a route to the final destination, a relay transmission of the received packet is conducted. On the other hand, if its own terminal does not have a route to the final destination, the received packet is discarded, and a route error packet is transmitted to the transmission terminal A101 (step S2516) in order to have a route search initiated.

As described above, according to the present embodiment, when the relay terminal E105 is positioned at the route branching point of the route candidate 1 and the route candidate 2, the relay terminal E105 can select and switch to the route having the broadest bandwidth among the route candidate 1 and the route candidate 2, which go through the branching point. As a result, the relay terminal E105 can omit the process of notifying the transmission terminal A101 about the bandwidth used for the communication of the data packet being equal to or less than the predetermined value. Therefore, processes of the system as a whole can be simplified.

Furthermore, the relay terminal C103 transmits the bandwidth reduction notification to the relay terminal E105 when the bandwidth between relay terminal C103—reception terminal D104 becomes equal to or less than the predetermined value. With this, the relay terminal E105 can instantaneously judge that the bandwidth of the selected route used for the communication of the data packet has become equal to or less than the predetermined threshold. Therefore, the relay terminal E105 can switch to the route having the second broadest bandwidth among the selected route candidates, when the bandwidth of the selected route used for the communication of the data packet has become equal to or less than the predetermined threshold. As a result, interruptions of the communication can be eliminated.

Thus, even after switching to a route having the second broadest bandwidth among the route candidates during the present route estimation period, the communication is continued by switching to a route having the broadest bandwidth at the next route estimation. Therefore, the quality of the communication can be highly maintained while eliminating interruptions of the communication, since the period of using the route having the second broadest bandwidth can be made shorter than the period of the route estimation.

Embodiment 3

Embodiment 3 will be described next. Described in embodiment 3 is a case where an asynchronous route estimation is conducted for each of the routes. In most cases, it is useless to conduct a bandwidth estimation of a route immediately after sending of a route reduction notification. Described in the present embodiment is a protocol in which timing of conducting the route estimation is changed by the transmission terminal in such a case.

Figure 26:
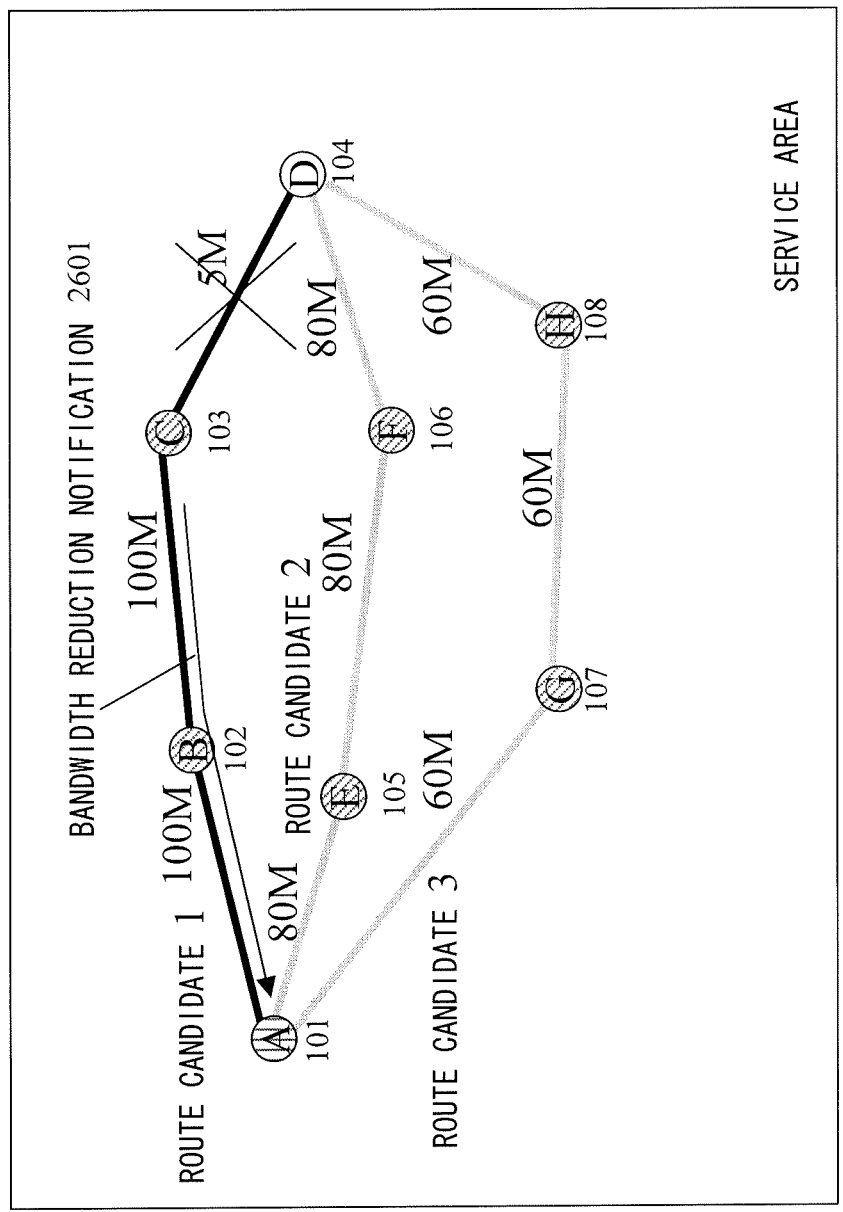
FIG. 26 is a figure showing a state of the network after a route estimation at time T4 at a communication terminal according to embodiment 3.
Figure 27:
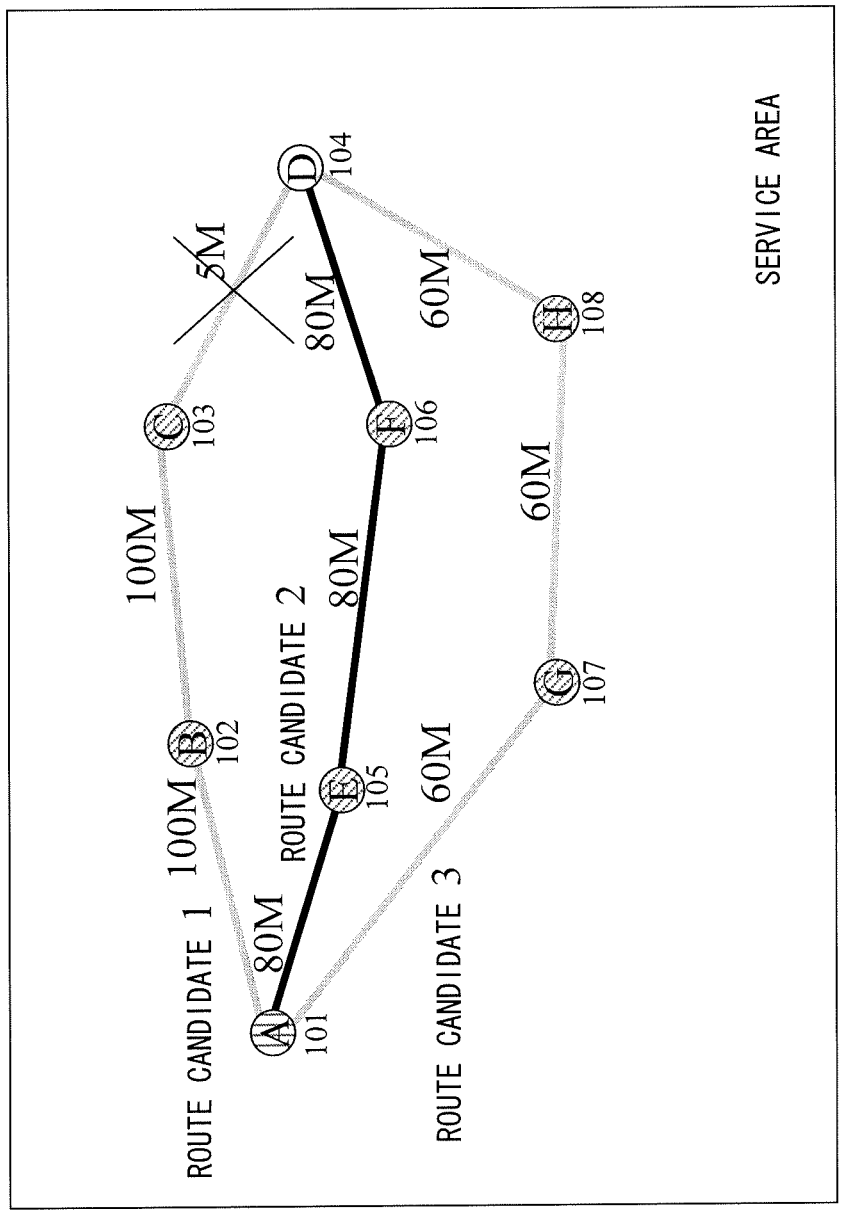
FIG. 27 is a figure showing a state of the network after a route estimation at time T5 at the communication terminal according to embodiment 3.
Figure 28:
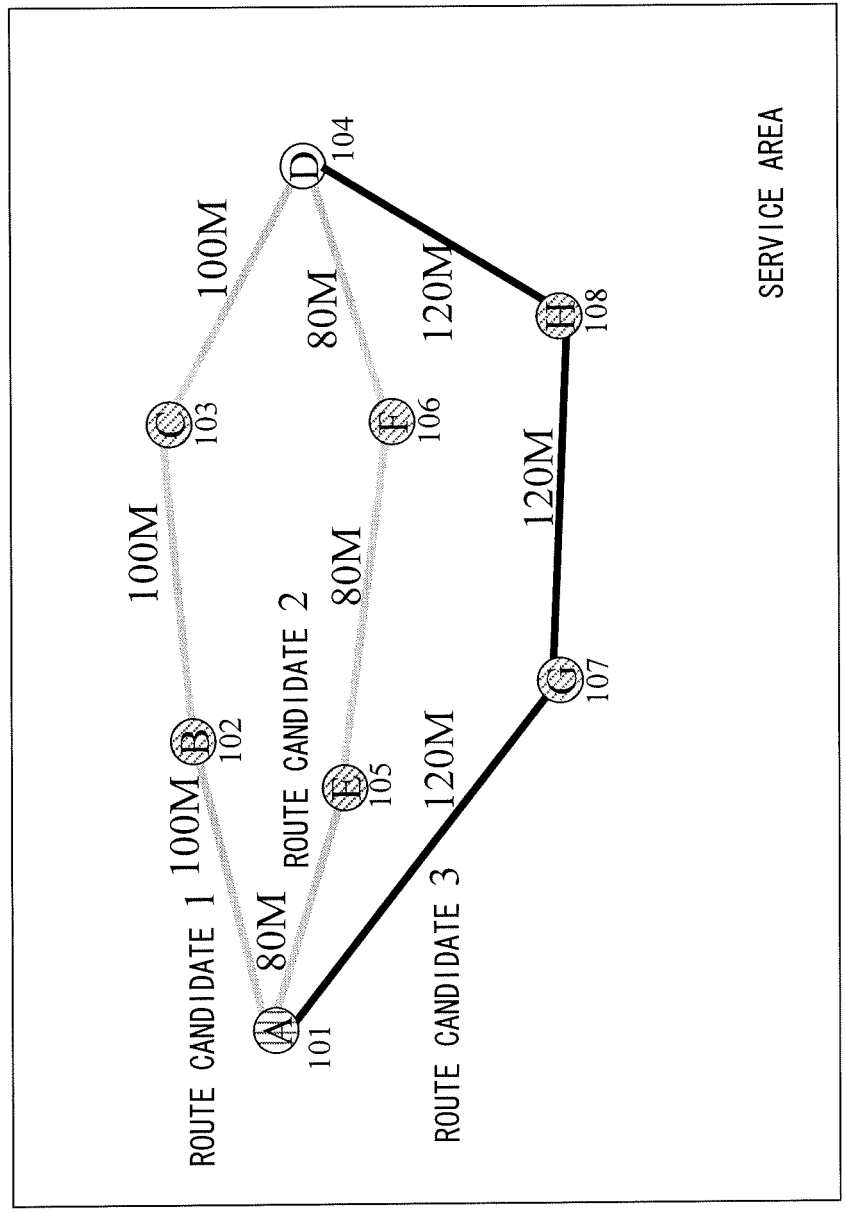
FIG. 28 is a figure showing a state of the network after a route estimation at time T6 at the communication terminal according to embodiment 3.

FIG. 26 to FIG. 28 are state transition diagrams showing a case in which, the bandwidth of the link between relay terminal C103—reception terminal D104 is reduced from the state in FIG. 8, and a bandwidth reduction notification has been transmitted by the relay terminal C103 to the transmission terminal A101. FIG. 26 shows a state at time T4 when the bandwidth reduction notification is transmitted from the relay terminal C103 to the transmission terminal A101. FIG. 27 shows a state at time T5 when the transmission terminal A101 has conducted the route estimation of the route candidate 3 after receiving the bandwidth reduction notification. FIG. 28 shows a state at time T6 when the transmission terminal A101 has conducted the next route estimation of the route candidate 3 after that of time T5.

In FIG. 26, the bandwidths of the routes are, 4.5 Mbps for the route candidate 1, 26.7 Mbps for the route candidate 2, and 20 Mbps for the route candidate 3. The transmission terminal A101 receives the bandwidth reduction notification from the relay terminal C103 via the relay terminal B102. With this, the transmission terminal A101 recognizes a reduction in the bandwidth of the link between relay terminal C103—reception terminal D104. At this timing T4, the transmission terminal A101 initiates route searches for all the routes. As a result, the route candidate 2 is acquired as the optimum route, and the route is switched from the route candidate 1 to the route candidate 2.

In FIG. 27, at time T5 which is timing of the next route estimation of the route candidate 3 and which is after reception the bandwidth reduction notification by the transmission terminal A101, the transmission terminal A101 conducts a transmission through the route candidate 2. Furthermore, in FIG. 28, if it is ascertained that the bandwidth of the route candidate 3 has increased at time T6 when the route estimation of the route candidate 3 is to be conducted, the transmission terminal A101 selects the route candidate 3. Since increases and decreases of the links along the selected route are ascertained through data transmission, the transmission terminal A101 may not necessarily have to conduct the route estimation for the selected route. In such a case, a bandwidth increase notification that indicates an increase of the bandwidth may be sent.

Figure 29:
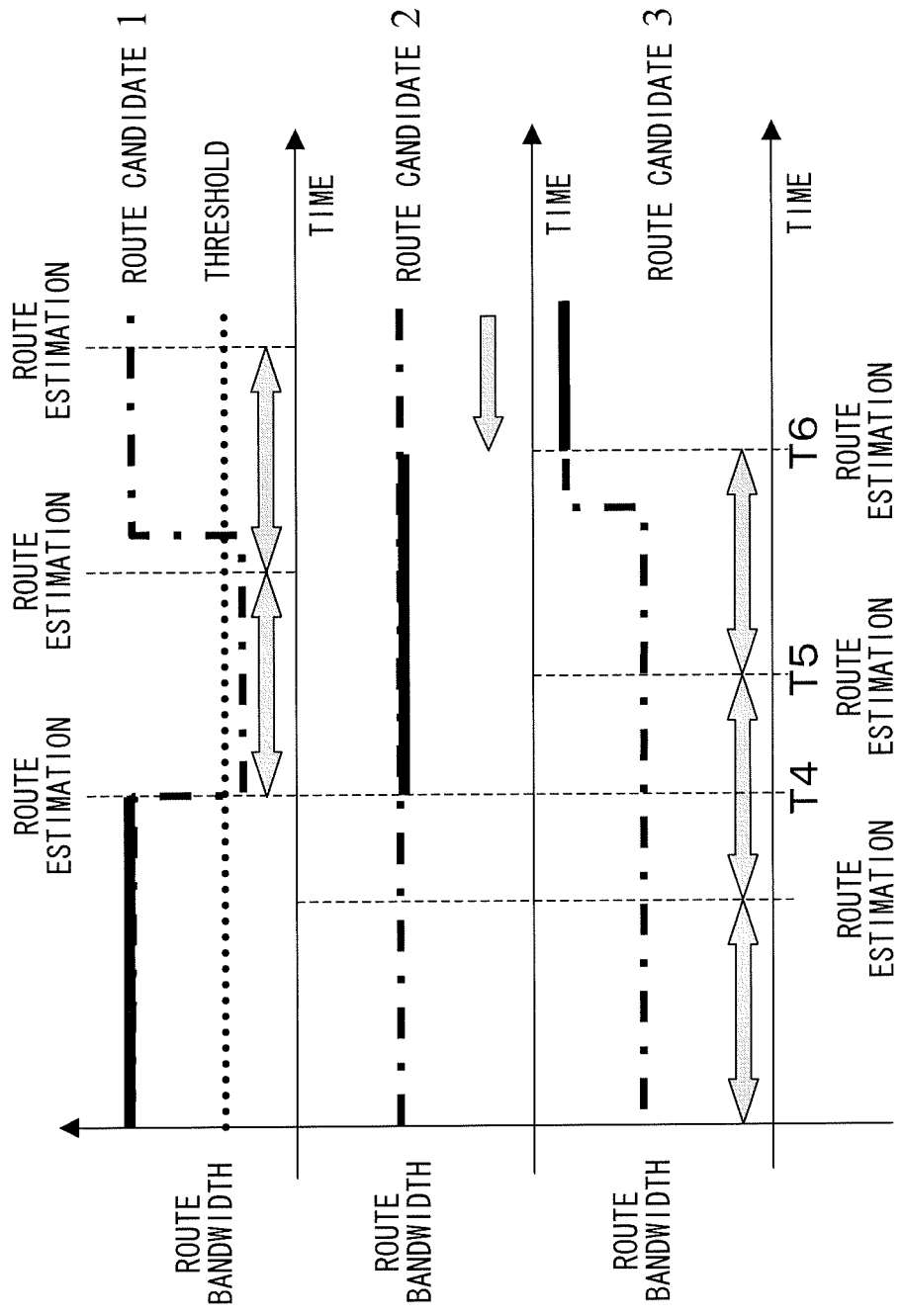
FIG. 29 is a route selection diagram in a case where a route estimation is conducted asynchronously at the communication terminal according to embodiment 3.

FIG. 29 is a route selection diagram during transition of states from FIG. 26 to FIG. 28. In FIG. 29, assume that the route candidate 1 is currently selected as the route. At this moment, the route estimation of the route candidate 1 is suspended. At the moment (time T4) when the transmission terminal A101 receives, in this state, a bandwidth reduction notification of the route candidate 1 which is the selected route, the transmission terminal A101 conducts route searches for all the routes. As a result of the route search at time T4, the transmission terminal A101 acquires the route candidate 2 as the optimum route, and updates the selected route from the route candidate 1 to the route candidate 2. Then, the transmission terminal A101 suspends the route estimation of the route candidate 2.

From the moment the route candidate 1 is not selected as the route, the transmission terminal A101 initiates a periodical route estimation of the route candidate 1 asynchronously to the timing when the route estimation of the route candidate 3 is conducted. Here, an interval between respective timings for conducting the route estimation of each of the route candidates is constant. When T6 which is the timing of the route estimation of the route candidate 3 arrives, the transmission terminal A101 conducts the route estimation of the route candidate 3. If it is ascertained that the bandwidth of the route candidate 3 has increased as a result, the transmission terminal A101 selects the route candidate 3. Similar to the route candidate 1, a timer setting of the periodical route estimation may be reset when a bandwidth reduction notification is received for the route candidate 3.

Therefore, the transmission terminal A101 switches the route to the route candidate 3 having the broadest bandwidth when T6, which is the time for the route estimation of the route candidate 3 that is other than the route candidate 2 used for the communication of the current data packet, elapses. With this, a route that has the broadest bandwidth at the timing when a predetermined period of each route has elapsed is selected. Therefore, time in which the communication is conducted at a state with the broadest bandwidth can be prolonged, since the communication is conducted using the route that has the broadest bandwidth. As a result, it is possible to maximally utilize the route having the broadest bandwidth throughout the whole communication.

Embodiment 4

Embodiment 4 will be described next. Unlike embodiment 3, in embodiment 4, a case will be described where an interval between the route estimations is not constant and is variable.

Figure 30:
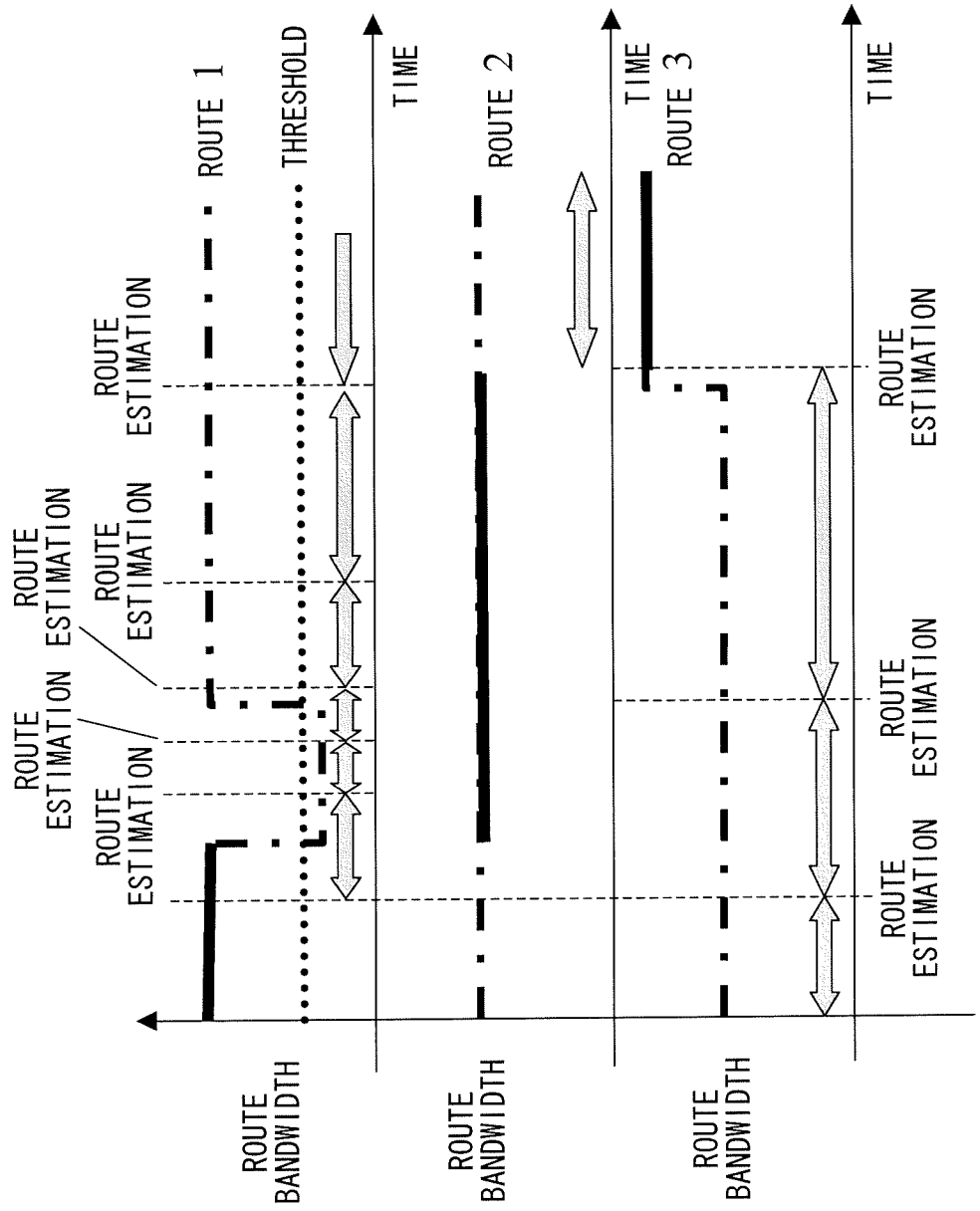
FIG. 30 is a route selection diagram in a case where a route estimation interval is varied at the communication terminal according to embodiment 3.

FIG. 30 is a route selection diagram in a case where the time interval for conducting the route estimation is varied. In a network like the PLC where the bandwidth is influenced by having a power supply of a home electric appliance being turned ON/OFF, a link that has a large bandwidth fluctuation and a link that has a small bandwidth fluctuation are predetermined. In order to suppress the amount of packets of the route estimations, it is preferable if the route estimation is conducted frequently for a link that has a large fluctuation, and if the route estimation is conducted with a long time interval for a link that has a small fluctuation. Therefore, by utilizing the bandwidth reduction notification, timing of the route estimation of each of the routes is changed, and a route having a fine bandwidth is selected while suppressing the consumption of the bandwidth by the control packet. Specifically, when the route estimation request is transmitted and the route estimation reply is sent back, the time set in a timer for the next route estimation request is doubled. On the other hand, when the bandwidth reduction notification is received, or when the route estimation result has largely varied from the previous route estimation, the time in the timer is set to a predetermined minimum value (initial value).

In FIG. 30, for the route candidate 1, if the bandwidth of the route candidate 1 is equal to or less than a predetermined threshold after having the route estimation being conducted, the interval for conducting the route estimation is set to the predetermined minimum value. Here, if the bandwidth of the route candidate 1 is equal to or less than the predetermined threshold, it can be estimated that the bandwidth of the route increases and decreases unstably. Therefore, the route candidate 1 is assumed as a route that have large increases and decreases of the bandwidth, and the interval for conducting the route estimation is set to the predetermined minimum value. With this, a route that has a possibility of a large bandwidth fluctuation can be discovered quickly, since increases and decreases of the bandwidth of the route candidate 1 can be frequently comprehended. As a result, for example, in a case of transmitting continuous data such as a motion picture, the communication can be stabilized by removing, from route options, a route that has a possibility of a large bandwidth fluctuation.

In FIG. 30, after a route estimation that immediately follows the route estimation that has caused the interval of the route candidate 1 to be set to the predetermined minimum value, the bandwidth of the route is still equal to or less than the predetermined value. In this case, the interval for the route estimation of the route candidate 1 is set to the predetermined minimum value again. Therefore, if the bandwidth of the route is equal to or less than the predetermined value even after a route estimation subsequent to the setting to the predetermined minimum value, not just the possibility of a large bandwidth fluctuation, but in fact, the route can be judged as one having a large bandwidth fluctuation. Thus, by only allowing the interval of the route estimation to be variable, a process of discovering an unstable route having a large bandwidth fluctuation can be conducted easily.

Furthermore, in FIG. 30, regarding the route candidate 1, the bandwidth that has once become equal to or less than the predetermined threshold recovers to a level that is more than the predetermined threshold. In this case, the interval for the route estimation of the route candidate 1 is gradually restored to the predetermined interval. Therefore, even though the constant interval of the route estimation might have been once set to the predetermined minimum value, if this is due to a temporary cause such as having a switch of a vacuum cleaner being turned on and if the bandwidth of the route did not become equal to or less than the predetermined value after subsequent route estimations, it is judged that the route is a route that has a small bandwidth fluctuation, and the interval is gradually restored to the predetermined interval. As a result, by only allowing the interval of the route estimation to be variable, it can be judged whether or not the route is an unstable route in which the bandwidth of the route largely increases and decreases; therefore, a process of judging the stability of the route can be conducted easily.

On the other hand, in FIG. 30, regarding the route candidate 3, since a route estimation reply is sent back in response to a route estimation request, the time set in a timer of the next route estimation request is doubled. Although this has been doubled in the present embodiment, it is not limited thereto.

As described above, according to the present embodiment, it is possible to conduct a route estimation that takes into consideration of fluctuation characteristics of a route.

Figure 31:
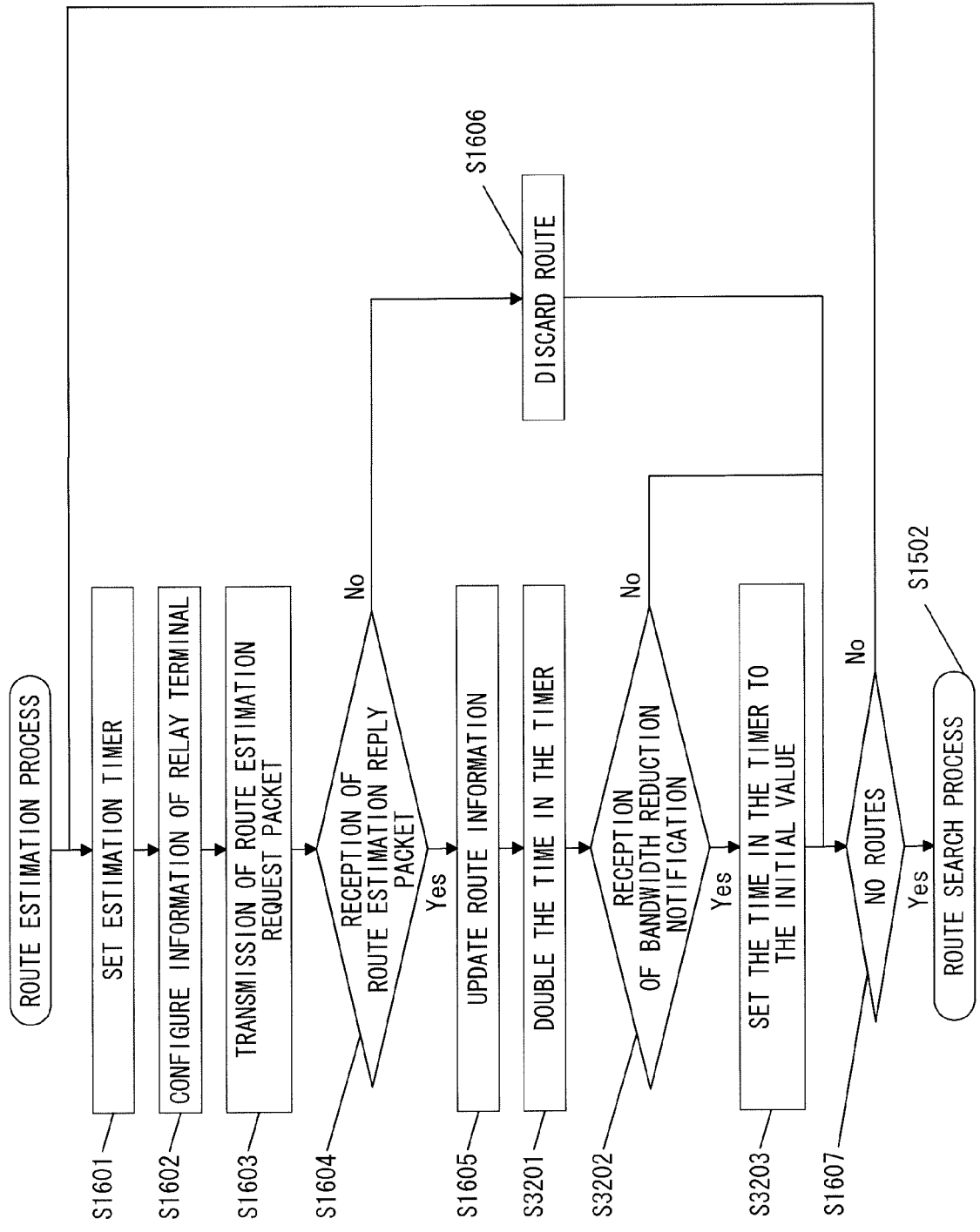
FIG. 31 is a flowchart representing a route estimation process at the communication terminal according to embodiment 3.

FIG. 31 shows a flowchart for a case where the timer of the route estimation is adjusted. Apart from the processes of conducting the route estimation in FIG. 17, a process of doubling the timer setting upon reception of a route estimation reply packet (step S3201), and a process of restoring the timer setting to the initial value (predetermined minimum value) (step S3203) upon reception of a bandwidth reduction notification (step S3202) are added.

Embodiment 5

Embodiment 5 will be described next. In embodiment 5, a case will be described where multiple transmission terminals exist for a single final destination terminal. When there are multiple transmission terminals for a single final destination terminal, it can be understood that a terminal that becomes a route-branching terminal exists if routes of the multiple transmission terminals were to be overlaid. At this route-branching terminal, a route reply can be sent back for each of the number of routes that is requested by respective communication terminals. Furthermore, it is not necessary to transmit a plurality of route replies, and only a route having a fine state may be transmitted.

Figure 32:
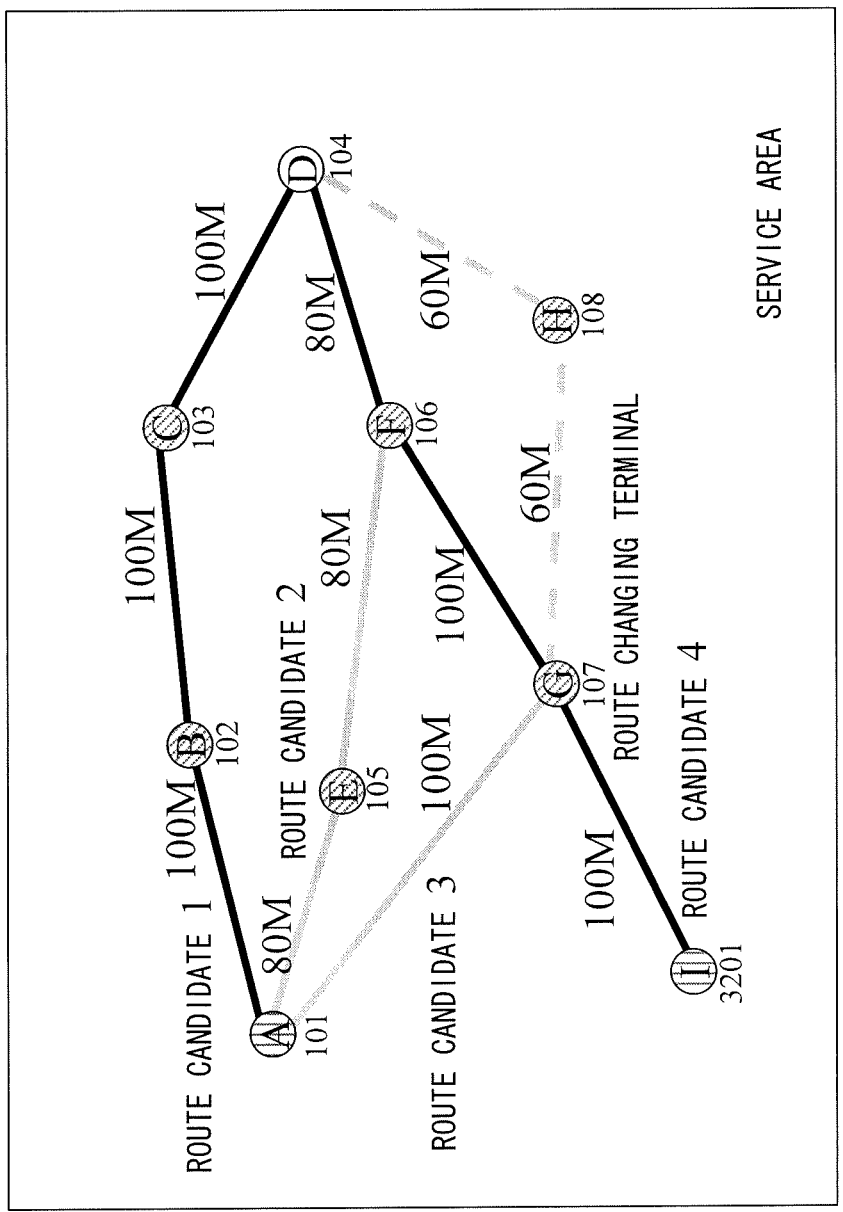
FIG. 32 is a network configuration diagram in embodiment 4.

FIG. 32 is a network diagram representing a case where a data transmission is initiated from a transmission terminal I3201 to the reception terminal D104 while a data transmission from the transmission terminal A101 to the reception terminal D104 which is a final destination is conducted. In FIG. 32, the transmission terminal A101 has acquired three routes similar to those in FIG. 8. Suppose the transmission terminal I3201, which is a transmission terminal that is different from the transmission terminal A101, requests a single route, and acquires a route of transmission terminal I3201→relay terminal G107→relay terminal F106→reception terminal D104 (route candidate 4). The bandwidth information of the links is as shown in FIG. 32. In this case, the relay terminal G107 has two route candidates which are the route candidate 3 (transmission terminal A101→relay terminal G107→relay terminal H108→reception terminal D104) and the route candidate 4, as routes that lead to the reception terminal D104 which is the final destination. Thus, in the example shown in FIG. 32, the relay terminal G107 is a route-branching terminal.

However, unlike the route-branching terminal described in FIG. 17, the relay terminal G107 only has to return one bandwidth information of the link for each of the transmission terminals (the transmission terminal A101 and the transmission terminal I3201). The relay terminal G107 sends back, to each of the transmission terminals, information of a route having a finer state among retained routes. Specifically, in FIG. 32, the route candidate 4 (relay terminal G107→relay terminal F106→reception terminal D104) has a finer state when compared to the route candidate 3 (relay terminal G107→relay terminal H108→reception terminal D104). Thus, the relay terminal G107 changes the route reply of the route candidate 3 with one part of the route candidate 4, such as transmission terminal A101→relay terminal G107→relay terminal F106→reception terminal D104, and sends it back to the transmission terminal A101.

FIG. 33A and FIG. 33B are figures showing route reply packets transmitted/received at the relay terminal G107. In FIG. 33A, in a route reply received by the relay terminal G107 from the relay terminal H108, the route candidate 3 is indicated as transmission terminal A101→relay terminal G107→relay terminal H108→reception terminal D104. On the other hand, referring to FIG. 33B, in a route reply transmitted by the relay terminal G107 to the transmission terminal A101, the route candidate 3 is changed to transmission terminal A101→relay terminal G107→relay terminal F106→reception terminal D104. In association with this, a link bandwidth (3301) between relay terminal G107—relay terminal H108 is changed to 60 Mbps, an address (3302) of the relay terminal H108 is changed to H, a link bandwidth (3303) between relay terminal H108—reception terminal D104 is changed to 60 Mbps, a link bandwidth (3311) between relay terminal G107—relay terminal F106 is changed to 100 Mbps, an address (3312) of the relay terminal F106 is changed to F, and a link bandwidth (3313) between relay terminal F106—reception terminal D104 is changed to 60 Mbps.

Figure 34:
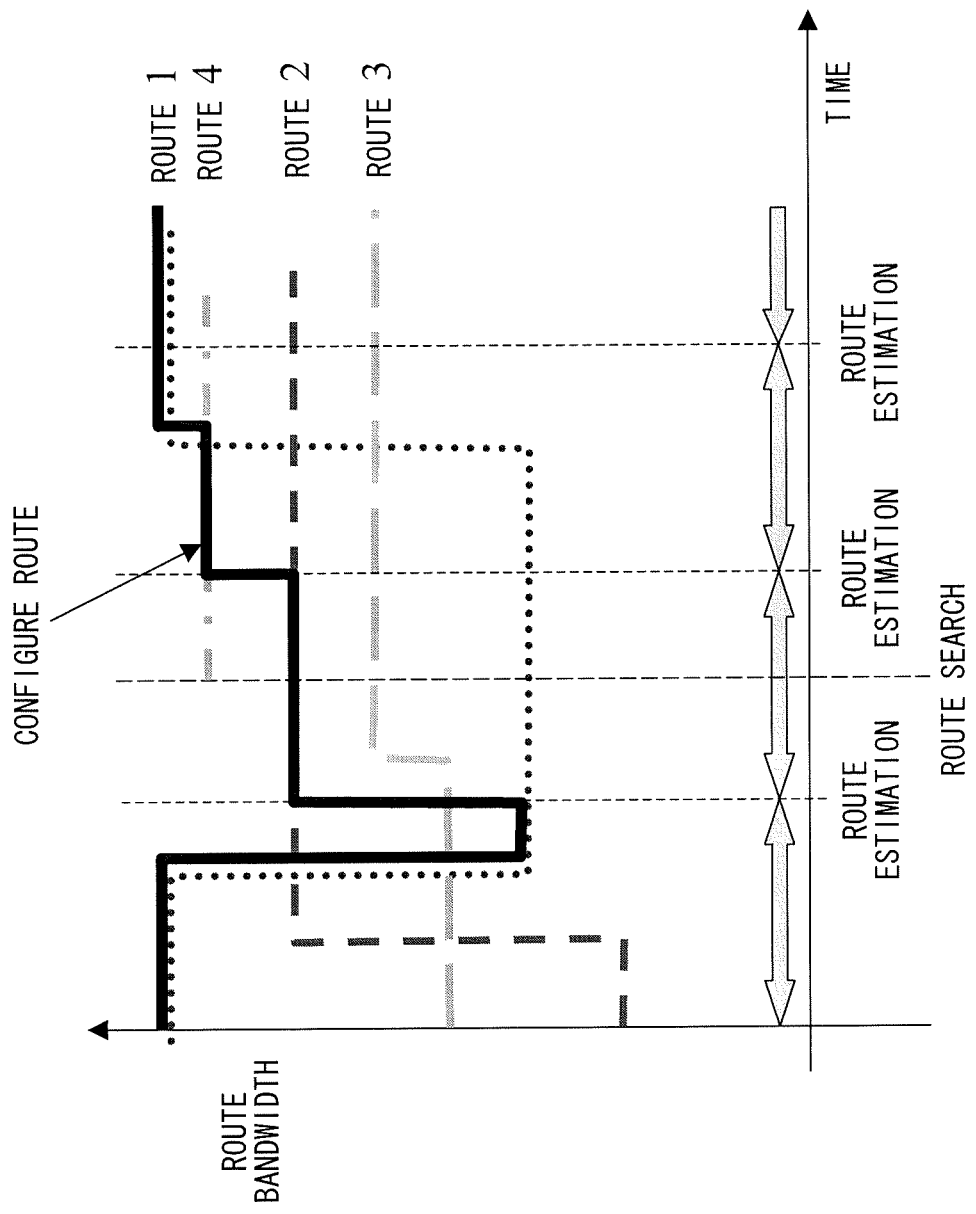
FIG. 34 is a route selection diagram of a communication terminal according to embodiment 4.
Figure 35A:
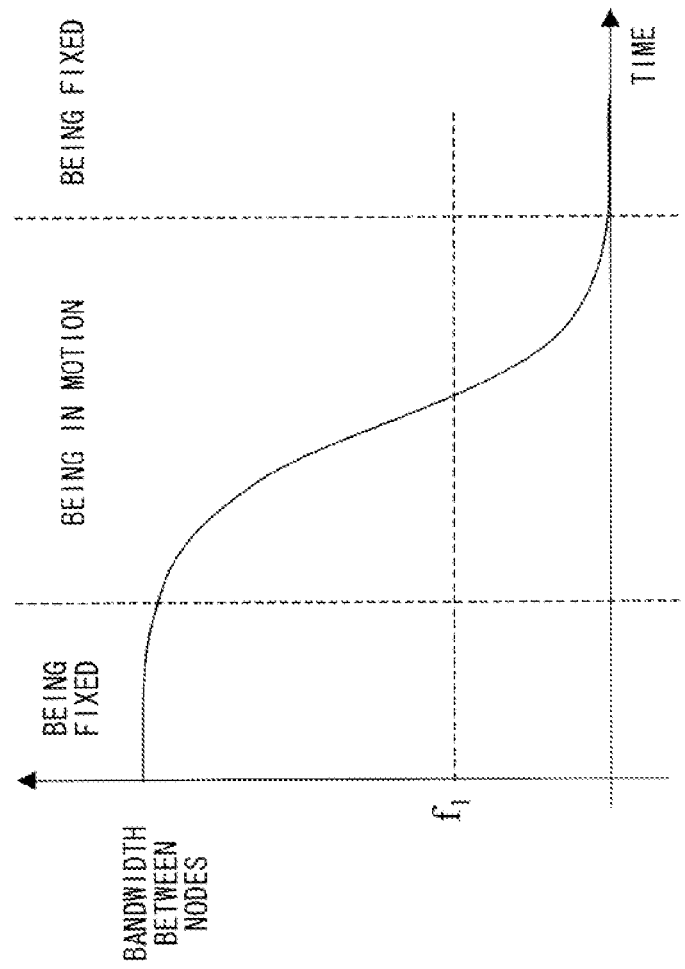
FIG. 35A is a figure showing a bandwidth fluctuation at a communication terminal that uses a conventional wireless communication.
Figure 35B:
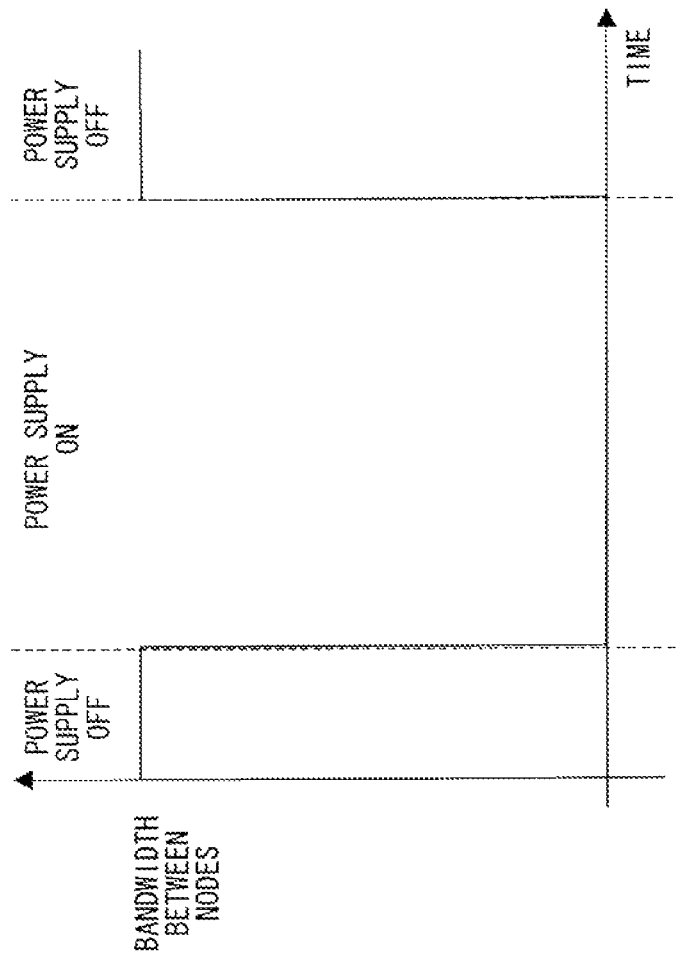
FIG. 35B is a figure showing a bandwidth fluctuation at a communication terminal that uses a conventional PLC.

FIG. 34 is a route selection diagram that corresponds to FIG. 33. In FIG. 34, the route candidate 4 is created when the transmission terminal I3201 conducts a route search. It is obvious that, when a route estimation subsequent to the creation of the route candidate 4 is conducted, the route candidate 4 is selected as a route to be used for the communication from the transmission terminal A101 to the reception terminal D104. It is obvious that the probability of selecting a finer route has improved as a result.

As described above, according to the present embodiment, if a new route is created between the relay terminal G107, which is included in the route candidate 3 that is one route among the route candidates 1 to 3, and the relay terminal F106, which is not included in the route candidate 3 together with the relay terminal G107; the transmission terminal A101 receives a notification that the route candidate 4 which leads to the transmission terminal A101 has been added. If the bandwidth of the added route candidate 4 is broader than the bandwidth of the route candidate 3, the transmission terminal A101 substitutes the route candidate 3 with the route candidate 4. As a result, a change in routes that have occurred after the start of the communication is also taken into consideration, enabling a route that has the broadest bandwidth to be selected. Therefore, the route candidate 4 can be obtained without re-broadcasting the route search packet while maintaining the route candidates 1 to 3 that are the predetermined number of routes selected in advance, and the route can updated to a route which bandwidth thereof is unlikely to be equal to or less than the predetermined threshold. Here, a case of having the new route candidate 4 being created between the relay terminal G107 and the relay terminal F106 is a case of having a route being created by the transmission terminal I3201, which is a transmission terminal different from the transmission terminal A101, leading to the reception terminal D104, which is transmission destination identical to that of the transmission terminal A101, via the relay terminal G107 and the relay terminal F106.

Additionally, the relay terminal G107 may notify the transmission terminal A101 about an instance of the bandwidth between the relay terminal G107 and the relay terminal F106 being equal to or less than the predetermined threshold, when the instance occurs. In this case, the transmission terminal A101 can restore the substitute route candidate 4 to the original route candidate 3. As a result, the number of the routes selected in advance can be maintained even after a reduction of the bandwidth of the route candidate 4, thus, the number of the routes can be secured as backups for switching, therefore, an occurrence of an interruption of the communication can be prevented.

INDUSTRIAL APPLICABILITY

With the present invention, a communication terminal, a communication method, and the like can be provided. When the present invention is applied in an ad-hoc network or the like which uses an electrical power line, a route having the finest state can be secured while suppressing a bandwidth that is consumed by a transmission of a control packet at a low level.

| Reference Signs List | |
|---|---|
| 101 to 108, 3201 | communication terminal |
| 109 | service area of ad-hoc network |
| 110 to 112 | coverage area |
| 301 | memory |
| 302 | CPU |
| 303 | network interface |
| 401 | packet reception section |
| 402 | route selection section |
| 403 | route search/estimation scheduler |
| 404 | route candidate retain section |
| 406 | route search section |
| 407 | route estimation section |
| 408 | route compare section |
| 409 | packet transmission section |

The invention claimed is:

1. A communication terminal included in an ad-hoc network, the communication terminal comprising:

a communication section that communicates a data packet to a reception terminal via at least one relay terminal; and a control section, which broadcasts, prior to a communication of the data packet, a first control packet that is used for creating routes that lead to the reception terminal, and which selects, in a descending order of broadness of bandwidth or in an ascending order of delay time and based on a response result of the first control packet, a plurality of routes that lead to the reception terminal as route candidates, and which unicasts, at predetermined time intervals during the communication of the data packet, a second control packet that is used to confirm, via all or some of the route candidates, a change of a communication state to the reception terminal; selects, based on a response result of the second control packet which includes information on the bandwidth or the delay time in the route candidates between a communication terminal to the reception terminal, a route, among the route candidates through which the response result of the second control packet has been obtained, that has the broadest communication bandwidth or the smallest delay time; switches a route used by the communication of the data packet to the selected route; and continues the communication of the data packet.

2. The communication terminal according to claim 1, further comprising:

a route candidate retain section configured to retain the plurality of route candidates selected based on the response result of the first control packet, wherein the control section unicasts the second control packet to each of the plurality of route candidates retained in the route candidate retain section.

3. The communication terminal according to claim 1, wherein the control section obtains the response result of the second control packet by receiving, via the route candidate through which the communication terminal has unicasted the second control packet, the response result of the second control packet that the reception terminal has transmitted to the communication terminal.

4. The communication terminal according to claim 1, wherein the ad-hoc network is connected by using a PLC.

5. The communication terminal according to claim 1, wherein the control section continues the communication of the data packet by switching, based on the response result of the second control packet which includes information on the bandwidth or the delay time in the route candidates between the communication terminal to the reception terminal, a route used by the communication of the data packet to a route, among the route candidates through which the response result of the second control packet has been obtained, that has the broadest communication bandwidth, and conducts, when the bandwidth of the route that is used for the communication of the data packet is equal to or less than a predetermined value within the predetermined time interval, switching to a route having the next broadest bandwidth among the selected plurality of route candidates.

6. The communication terminal according to claim 5, wherein the communication section receives, from a relay terminal included in the route that is used for the communication of the data packet, a bandwidth reduction notification which notifies that at least one part of the bandwidth of the route used for the communication is equal to or less than a predetermined value; and the control section judges, when the bandwidth reduction notification is received via the communication section, that the bandwidth of the route used in the communication of the data packet is equal to or less than a predetermined value, based on the bandwidth reduction notification.

7. The communication terminal according to claim 5, wherein the control section: unicasts, after switching to the route having the next broadest bandwidth among the selected plurality of route candidates, the second control packet to each relay terminal included in the selected plurality of route candidates within a current predetermined time interval; selects, based on the response result of the second control packet, a route which is used in a next predetermined time interval and which has the broadest bandwidth among the plurality of route candidates; and continues, at the start of said next predetermined time interval, the communication of the data packet by switching to the selected route having the broadest bandwidth.

8. The communication terminal according to claim 1, wherein the predetermined time intervals are set for every selected plurality of route candidates, and the predetermined time intervals set for every selected plurality of route candidates are asynchronous to each other.

9. The communication terminal according to claim 8, wherein when a route used for a communication of the data packet is defined as a first route, the control section switches, when a bandwidth of a second route which is other than the first route is ascertained to be broader than that of the first route after elapsing of a predetermined time of the second route, the route used for the communication of the data packet to the second route after elapsing of the predetermined time of the second route.

10. The communication terminal according to claim 1, wherein the control section continues the communication of the data packet by switching, based on the response result of the second control packet which includes information on the bandwidth or the delay time in the route candidates between the communication terminal to the reception terminal, a route used by the communication of the data packet to a route, among the route candidates through which the response result of the second control packet has been obtained, that has the broadest communication bandwidth, the communication section receives, from a first relay terminal that is included in one route among the selected plurality of route candidates, a notification which notifies, in a case where a new route is created between the first relay terminal and a second relay terminal that have not been included in the one route, about additional routes for the one route that leads to the reception terminal, and the control section replaces the one route with a substitute one route having the broadest bandwidth among the additional routes for the one route.

11. The communication terminal according to claim 10, wherein the case where a new route is created between the first relay terminal and a second relay terminal that have not been included in the one route, is a case where another communication terminal, as a transmission source, creates a route to a transmission destination, which is identical to the reception terminal, via the first relay terminal and the second relay terminal.

12. The communication terminal according to claim 10, wherein:

the communication section receives a bandwidth reduction notification that notifies about an instance of a bandwidth between the first relay terminal and the second relay terminal becoming equal to or less than a predetermined value, when the instance occurs; and the control section restores, when the bandwidth reduction notification is received via the communication section, the one route to its original from the substitute one route.

13. The communication terminal according to claim 1, wherein the control section continues the communication of the data packet by switching, based on the response result of the second control packet which includes information on the bandwidth or the delay time in the route candidates between the communication terminal to the reception terminal, a route used by the communication of the data packet to a route, among the route candidates through which the response result of the second control packet has been obtained, that has the broadest communication bandwidth, and when a bandwidth of a route among either one of the selected plurality of route candidates becomes equal to or less than a predetermined value, the control section sets the predetermined time interval for unicasting the second control packet of the route to a predetermined minimum time interval.

14. The communication terminal according to claim 13, wherein for the route in which the predetermined time interval thereof for unicasting the second control packet is set to the predetermined minimum time interval, when the bandwidth of the route has not become equal to or less than the predetermined value in subsequent predetermined time intervals, the control section gradually restores the predetermined time interval.

15. The communication terminal according to claim 13, wherein for the route in which the predetermined time interval thereof for unicasting the second control packet is set to the predetermined minimum time interval, when the bandwidth of the route has become equal to or less than the predetermined value also in subsequent predetermined time intervals, the control section sets the predetermined time interval to the predetermined minimum time interval again.

16. A communication terminal which is included in an ad-hoc network and which relays a data packet between a transmission terminal and a reception terminal, the transmission terminal selecting, as route candidates, a plurality of routes that lead to the reception terminal in a descending order of broadness of bandwidth or in an ascending order of delay time, the communication terminal comprising:

a communication section that communicates the data packet; and a control section, which judges, at predetermined time intervals during the communication of the data packet, whether or not the communication terminal is positioned at a branching point of two or more routes among the selected plurality of route candidates based on a control packet unicasted to the plurality of route candidates, and which selects, when the communication terminal is positioned at the branching point of two or more routes among the selected plurality of route candidates and when a bandwidth used for the communication of the data packet has become equal to or less than a predetermined value, the route that has the broadest communication bandwidth or the smallest delay time among other route candidates that go through the branching point, and which switches the route used for the communication of the data packet.

17. The communication terminal according to claim 16, wherein when the communication terminal is positioned at the branching point of two or more routes among the selected plurality of route candidates, the control packet is unicasted from the communication terminal to the communication terminal positioned at the branching point, and the communication terminal that has received the control packet transmits the control packet to each of the plurality of route candidates that lead to the reception terminal.

18. A communication method conducted by a communication terminal included in an ad-hoc network, the communication method comprising the steps of:
   communicating a data packet to a reception terminal via at least one relay terminal;
   broadcasting, prior to the communicating of the data packet, a first control packet used for creating routes that lead to the reception terminal;
   selecting, in a descending order of broadness of bandwidth or in an ascending order of delay time and based on a response result of the first control packet, a plurality of routes that lead to the reception terminal as route candidates;
   unicasting, at predetermined time intervals during the communicating of the data packet, a second control packet that is used to confirm, via all or some of the route candidates, a change of a communication state to the reception terminal; and
   continuing the communicating of the data packet by selecting, based on a response result of the second control packet which includes information on the bandwidth or the delay time in the route candidates between a communication terminal to the reception terminal, among the route candidates through which the response result of the second control packet has been obtained, that has the broadest communication bandwidth or the smallest delay time, and by switching a route used by the communicating of the data packet to the selected route.

19. A communication method conducted by a communication terminal which is included in an ad-hoc network and which relays a data packet between a transmission terminal and a reception terminal, the transmission terminal selecting, as route candidates, a plurality of routes that lead to the reception terminal in a descending order of broadness of bandwidth or in an ascending order of delay time, the communication method comprising the steps of:
   communicating the data packet;
   judging, at predetermined time intervals during the communicating of the data packet, whether or not the communication terminal is positioned at a branching point of two or more routes among the selected plurality of route candidates based on a control packet unicasted to the route candidates; and
   switching the route used for the communicating of the data packet after selecting, when the communication terminal is positioned at the branching point of two or more routes among the selected plurality of route candidates and when a bandwidth used for the communicating of the data packet has become equal to or less than a predetermined value, the route that has the broadest communication bandwidth or the smallest delay time among other route candidates that go through the branching point.

* * * * *